United States Patent [19]
Dean

[11] Patent Number: 5,544,342
[45] Date of Patent: Aug. 6, 1996

[54] SYSTEM AND METHOD FOR PREFETCHING INFORMATION IN A PROCESSING SYSTEM

[75] Inventor: Mark E. Dean, Austin, Tex.

[73] Assignee: International Business Machines Corporation, Armonk, N.Y.

[21] Appl. No.: 501,244

[22] Filed: Jul. 10, 1995

Related U.S. Application Data

[63] Continuation of Ser. No. 85,602, Jun. 30, 1993, abandoned.

[51] Int. Cl.⁶ .................................................. G06F 12/08
[52] U.S. Cl. ............... 395/446; 364/243.41; 364/243.45; 364/243.44; 364/DIG. 1
[58] Field of Search ..................................... 395/800, 375, 395/446

[56] References Cited

U.S. PATENT DOCUMENTS

| | | | |
|---|---|---|---|
| 4,714,994 | 12/1987 | Oklobdzija | 395/375 |
| 4,791,557 | 12/1988 | Angel | 395/375 |
| 4,847,753 | 7/1989 | Matsuo | 395/800 |
| 4,943,908 | 7/1990 | Emma et al. | 364/200 |
| 4,980,823 | 12/1990 | Liu | 364/200 |
| 5,355,478 | 10/1994 | Brady | 395/600 |
| 5,369,753 | 11/1994 | Tipley | 395/425 |
| 5,390,318 | 2/1995 | Ramakrishnan | 395/425 |

FOREIGN PATENT DOCUMENTS

| | | |
|---|---|---|
| 0428149A | 5/1991 | European Pat. Off. . |
| 0567355A | 4/1993 | European Pat. Off. . |

OTHER PUBLICATIONS

Computer System Laboratory, Stanford University, Stanford, CA 94305, "STRIP: A Self–Timed RISC Processor", Technical Report No. CSL–TR–92–543, Jul. 1992, Mark Edward Dean.

Computer Systems Laboratory, Stanford University, Stanford, CA 94305, "STRIP: A Self–Timed RISC Processor", Oct. 1992, Mark Edward Dean.

Certificate of Copyright Registration dated May 20, 1993.

IBM Technical Disclosure Bulletin, vol. 27, No. 5, Oct. 1984, pp. 3001–3002, "History Overflow Mechanism".

IBM Technical Disclosure Bulletin, vol. 33, No. 7, Dec. 1990, pp. 460–461, "Confirmed Prefetching Using a Modified Decode History Table".

IBM Technical Disclosure Bulletin, vol. 29, No. 10, Mar. 1987, pp. 4524–4526, "Mechanism for Recording Prefetching History in BHT".

IBM Technical Disclosure Bulletin, vol. 28, No. 8, Jan. 1986, pp. 3510–3511, "Prefetching Using a Pageable Branch History Table".

IBM Technical Disclosure Bulletin, vol. 28, No. 4, Sep. 1985, p. 1737, "Using a Small Cache to Hedge for a BHT".

IBM Technical Disclosure Bulletin, vol. 25, No. 4, Sep. 1982, pp. 2128–2129, "Target Prefetch Table".

Research Disclosure, Mar. 1990, No. 311, "Prefetching TM Targets to Resolve Branches Early".

Primary Examiner—Eric Coleman
Attorney, Agent, or Firm—Michael A. Davis, Jr.

[57] ABSTRACT

A method and system are provided for prefetching information in a processing system. A first memory has multiple first locations. At least one of the first locations stores information including an address of a different first location, the different first location having been referenced in the first memory after a previous reference to the one first location. A second memory has at least one second location storing information from the one first location, including the address. Information is prefetched to the second memory from the address of the first memory, in response to a reference to the second location.

20 Claims, 36 Drawing Sheets

OPERATIONS:
- IF - INSTRUCTION FETCH
- RF - REGISTER FETCH AND INSTRUCTION DECODE
- ALU - ALU OPERATION
- MEM - DATA MEMORY ACCESS
- WB - REGISTER WRITE-BACK

| ENCODING | | | | | | | |
|---|---|---|---|---|---|---|---|
| SINGLE-RAIL | 0 | 1 | 0 | 1 | 1 | 0 | 1 |
| 4-PHASE DUAL-RAIL | 01 00 | 10 00 | 01 00 | 10 00 | 10 00 | 01 00 | 10 00 |
| TRANSITION SIGNALING | 00 | 10 | 11 | 01 | 11 | 10 | 00 |
| LEDR | 00 | 10 | 00 | 10 | 11 | 01 | 11 |
SPACER TOKEN
PARITY OF CODE INDICATES PHASE
MULTIPLE CODES FOR SINGLE VALUE
FIG. 6
PRIOR ART
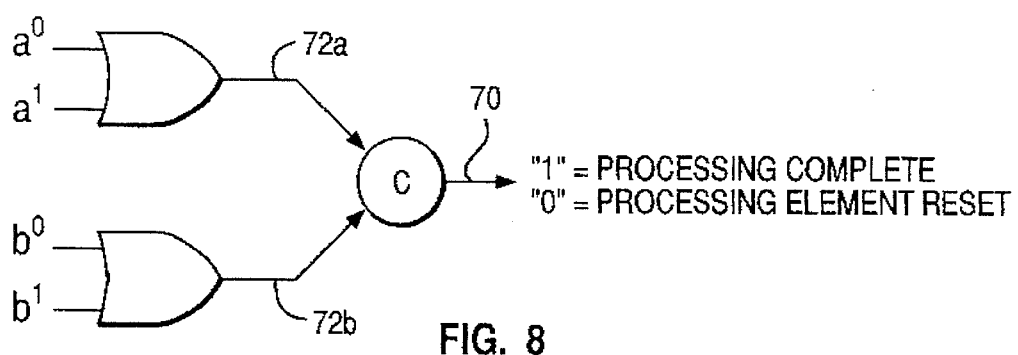
"1" = PROCESSING COMPLETE
"0" = PROCESSING ELEMENT RESET
FIG. 8
PRIOR ART
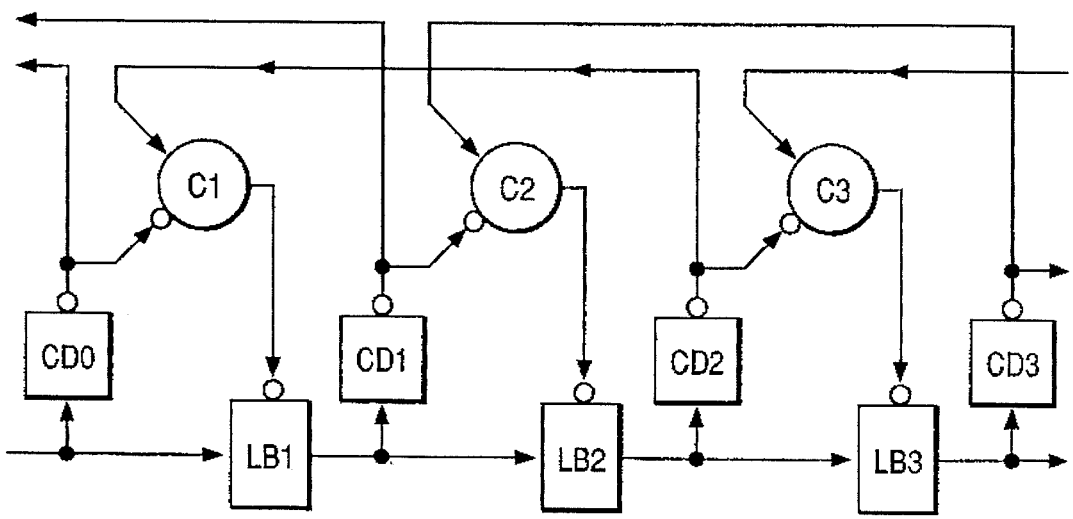
CD - Completion Detector
LB - Logic Block
C - Muller C-element
FIG. 9
PRIOR ART

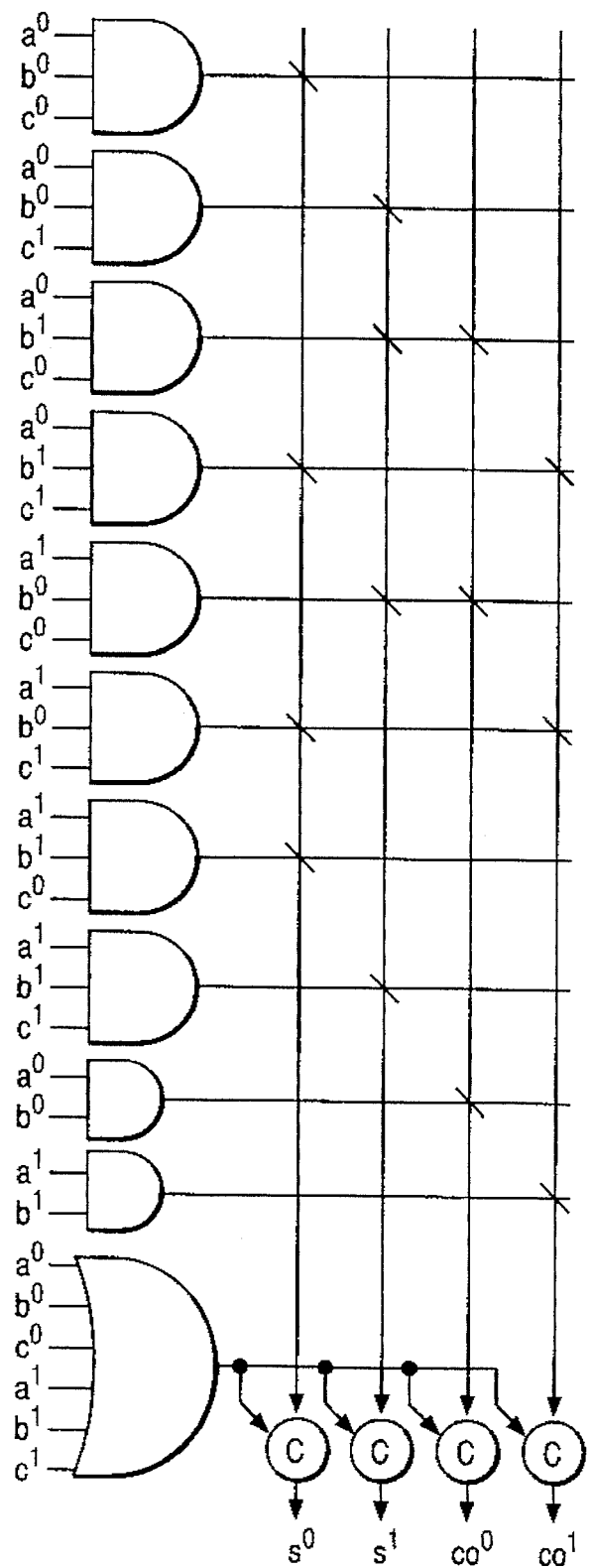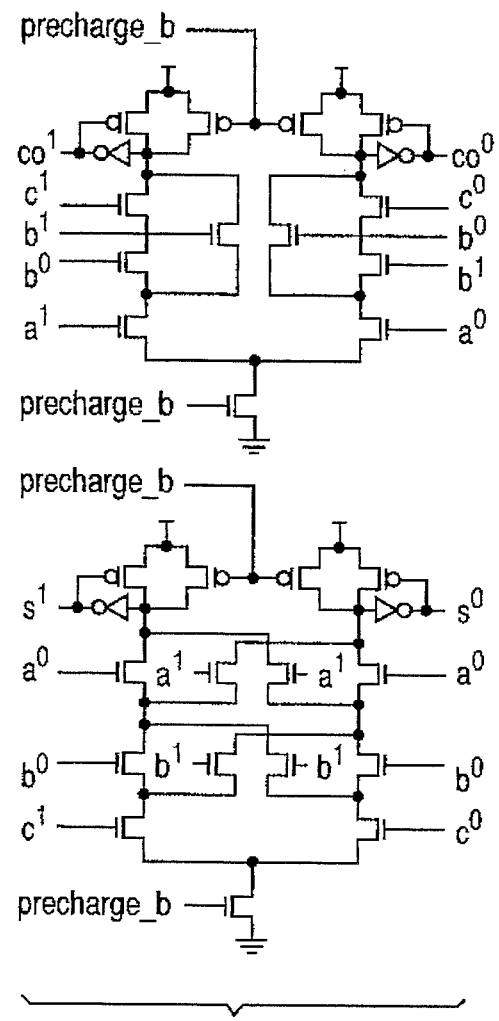
FIG. 7b
PRIOR ART
FIG. 7a
PRIOR ART

WWL = WRITE WORD LINE
RWL = READ WORD LINE
WBL = WRITE BIT LINE
RBL = READ BIT LINE

IFn = Instruction Fetch n
CM0 = Zero-Level Cache Miss Cycle
PF1 = First Cycle in Prefetch Operation
PF2 = Second Cycle in Prefetch Operation WWL = WRITE WORD LINE
RWL = READ WORD LINE
WBL = WRITE BIT LINE
RBL = READ BIT LINE $$go = (ab + acin + bcin)'$$
$$bg = (gi'(Pi' + gj'))'$$
$$wg = (gi + Pigj)'$$

MEMORY

| 0 1 2 | 4 5 | 9 10 | 14 15 | 31 |
|---|---|---|---|---|
| 10 | OP | SRC1 | DEST/SRC2 | Byte Offset |

BRANCH

| 0 1 2 | 4 5 | 9 10 | 14 15 | 16 | 31 |
|---|---|---|---|---|---|
| 00 | OP | SRC1 | SRC2 | Sq | Word Displ. |

COMPUTE

| 0 1 2 | 4 5 | 9 10 | 14 15 | 19 20 | 31 |
|---|---|---|---|---|---|
| 01 | OP | SRC1 | SRC2 | DEST | Compute Function |

COMPUTE IMMEDIATE

| 0 1 2 | 4 5 | 9 10 | 14 15 | 31 |
|---|---|---|---|---|
| 11 | OP | SRC1 | DEST | Immediate Field |

SRC1, SRC2 = source specifiers for Register File read-ports.
DEST = destination specifier for Register File write-port.
OP = operation specifier within instruction group.
Sq = squashing specifier for branch prediction
Byte Offset = load/store offset from SRC1
Word Displ. = branch displacement from PC
Compute Func. = encoded computation
Immed. Field = immediate data field

FIG. 49

| 0 | 7 8 | 15 16 | 23 24 | 31 |
|---|---|---|---|---|
| U u O o | d D f F | E E E E e v V m M i I s S | | |
| Byte 0 | Byte 1 | Byte 2 | Byte 3 | |

FIG. 50

SYSTEM AND METHOD FOR PREFETCHING INFORMATION IN A PROCESSING SYSTEM

CROSS-REFERENCES TO RELATED APPLICATIONS

This is a continuation of application Ser. No. 08/085,602 filed Jun. 30, 1993 now abandoned. This patent application is related to U.S. patent application Ser. No. 08/299,035, entitled System and Method for Dynamically Sequencing Operation of a Self-timed Processing System, by M. E. Dean, filed Aug. 31, 1994, which is a continuation of U.S. patent application Ser. No. 08/085,539, entitled System and Method for Self-timed Processing, by M. E. Dean, filed Jun. 30, 1993, now abandoned.

TECHNICAL FIELD

This patent application relates in general to systems for processing information and in particular to a method and system for prefetching information in a processing system.

BACKGROUND OF THE INVENTION

An important factor limiting a processor's performance is the memory system. To increase the processor's performance, the memory system preferably has low latency and a high bandwidth. Cost-per-bit is also a factor in determining the practical memory system size and performance. Some previous techniques attempt to reduce the effective memory system access time by adding queues, FIFOs, buffers, and special memory structures. Such previous techniques can result in significantly increased cost, size or complexity.

For reducing the average memory system access time, access times are reduced to one or more levels in the memory hierarchy. The memory subsystem closest to the processor has the largest affect on the average access time and is usually constrained to work in a integer number of processor cycles. This first level in the memory hierarchy is usually a first-level cache.

Processors can include internal first-level caches whose sizes are functions of the available semiconductor area. The speed-size-miss ratio tradeoff for very small caches (less than 1K bytes) can result in inefficient operation due to high miss-rates and total miss-penalties. Accordingly, the first-level caches normally are as large as possible and use the fastest available RAMs. Internal first-level caches normally are at least 16K bytes in total size, and external first-level caches can be as large as 2M bytes.

Many processors are sequenced at a rate comparable to the access time of the first-level cache. This streamlines the cache access and reduces the complexity of information control within the pipeline. A disadvantage of large first-level caches is that their access times are greater than the optimum processing rates of the other pipelined functional units. Accordingly, one technique for decreasing a memory system's average access time involves pipelining the first-level caches.

Pipelining the first-level caches can double their average throughput and reduce their effective access time in half. Nevertheless, cache pipelining adds complexity to the cache structures and increases the pipeline depth of the processor. Increasing the pipeline depth can increase the processing penalty for a mispredicted branch instruction and data conflicts following a load operation. If branch and load delay slots are scheduled by a compiler, then increasing the pipeline depth can increase the number of delay slots to be filled with useful instructions. Previous techniques fail to achieve the average access time of pipelined caches without increasing pipeline depth and CPI.

Thus, a need has arisen for a method and system for prefetching information in a processing system, in which a memory system has relatively low latency and high bandwidth. Also, a need has arisen for a method and system for prefetching information in a processing system, in which a memory system's performance is increased without significantly increasing cost, size and complexity. Further, a need has arisen for a method and system for prefetching information in a processing system, in which the speed-size-miss ratio tradeoff for very small caches does not result in inefficient operation due to high miss-rates and total miss-penalties. Moreover, a need has arisen for a method and system for prefetching information in a processing system, in which access times of a memory system are not greater than the optimum processing rates of other pipelined functional units. Finally, a need has arisen for a method and system for prefetching information in a processing system, in which a memory system's average access time is decreased without significantly increasing pipeling depth and CPI.

SUMMARY OF THE INVENTION

In a method and system for prefetching information in a processing system, a first memory has multiple first locations. At least one of the first locations stores information including an address of a different first location, the different first location having been referenced in the first memory after a previous reference to the one first location. A second memory has at least one second location storing information from the one first location, including the address. Information is prefetched to the second memory from the address of the first memory, in response to a reference to the second location.

It is a technical advantage of the present invention that a memory system has relatively low latency and high bandwidth.

It is another technical advantage of the present invention that a memory system's performance is increased without significantly increasing cost, size and complexity.

It is a further technical advantage of the present invention that the speed-size-miss ratio tradeoff for very small caches does not result in inefficient operation due to high miss-rates and total miss-penalties.

In another technical advantage of the present invention, access times of a memory system are not greater than the optimum processing rates of other pipelined functional units.

In a further technical advantage of the present invention, a memory system's average access time is decreased without significantly increasing pipeling depth and CPI.

BRIEF DESCRIPTION OF THE DRAWINGS

An exemplary embodiment of the present invention and its advantages are better understood by referring to the following descriptions and accompanying drawings, in which:

FIG. 6 is an illustration of exemplary data streams for a single-rail encoding scheme and for three dual-rail encoding schemes;

FIGS. 7a–b are schematic electrical circuit diagrams of self-timed dual-rail full-adders using PLA-like and DCVSL structures;

FIG. 8 is a block diagram of a conventional two-input dual-rail completion detector;

FIG. 9 is a block diagram of a conventional asynchronous pipeline structure;

FIG. 49 is an illustration of the STRiP (MIPS-X) instruction formats;

FIG. 50 is an illustration of the Processor Status Word (PSW);

DETAILED DESCRIPTION

Figure 1:
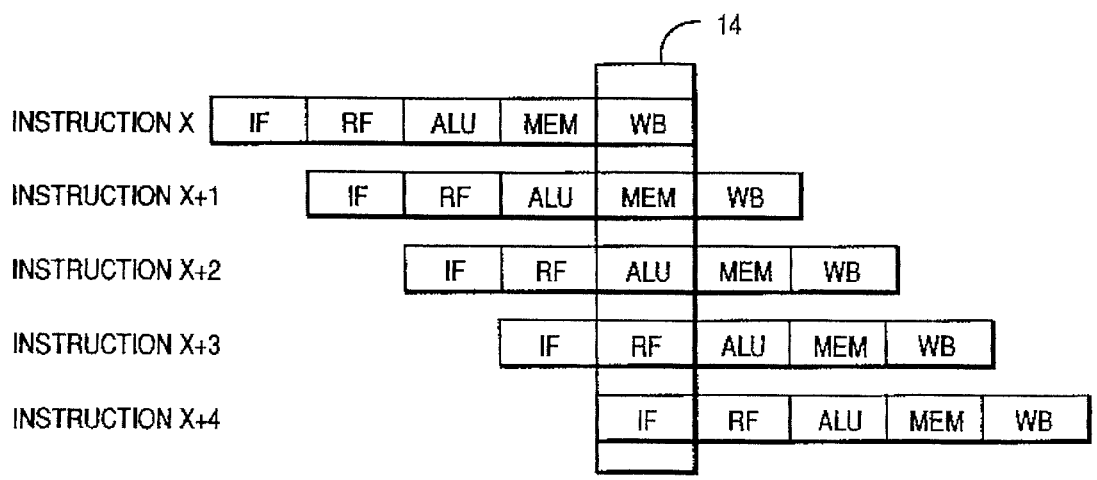
FIG. 1 is an illustration of a timing template for a general five-stage RISC pipeline.
Figure 56:
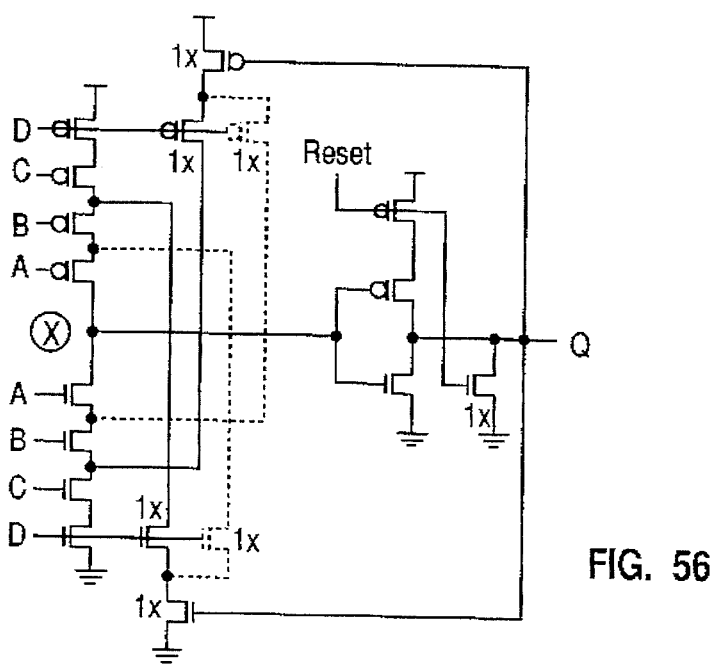
FIG. 56 is a schematic electrical circuit diagram of a 4-input dynamic C-element with charge-sharing reduction circuitry.

An exemplary embodiment of the present invention and its advantages are better understood by referring to FIGS. 1–56 of the drawings, like numerals being used for like and corresponding parts of the accompanying drawings.

The ever-increasing processing power needed by commercial applications calls for computer systems that fully exploit the capabilities offered by VLSI technologies. Many architectures and logic structures help reduce the execution times of these applications. But even with the most advanced architectural methods, there is significantly more potential performance available within existing semiconductor technologies. System and processor performance is sacrificed because of the worst-case design constraints required for synchronous operation. Self-timed sequencing of a processor's pipeline, together with an enhanced memory system and asynchronous external interface, significantly improve the operational efficiency of the processor complex.

Increasing a processor's execution rate is a key element for increasing a computer system's performance. A processor s performance can be measured as the time required to execute a set of instructions. The following formula for CPU time gives the key elements controlling processor performance:

CPU time = Clock Cycle Time * CPI * Instruction Count

The three elements determining processor performance are: the period of each processor clock cycle (Clock Cycle Time), the number of cycles-per-instruction (CPI), and the number of instructions required to process the targeted information (Instruction Count). Many architectures attempt to reduce the cycle time of the processor, reduce its CPI, and reduce the number of instructions for running an application.

Many processor architectures use pipelining. Pipelining divides each instruction into independent operations, thereby allowing parallel execution with other instructions. By allowing parallel execution of multiple instructions, pipelining uses an application's available instruction-level parallelism, thereby reducing the total cycles for executing that application.

Moreover superscalar and superpipelined architectures use instruction-level parallelism, providing a compromise between cycle time and CPI. Superscalar and superpipelined architectures can provide approximately the same level of performance; 30–40% more than a basic scalar architecture. Nevertheless, independent of their architecture, processors are frequently constrained by the same sequencing paradigm; synchronous operation.

Synchronous processor design and operation are based on a global synchronizing clock. External data transfers are based on the same global clock. Synchronous operation streamlines the processor's design by reducing hazard-free logic structures, thereby reducing the size and complexity of combinational logic. Unfortunately, synchronous operation also restricts the processor to a worst-case operating frequency in order to operate under all possible conditions.

Since the clock frequency for a synchronous processor is substantially constant, its execution rate is substantially independent of the operating conditions. Nevertheless, the potential speed of the processor varies according to environmental conditions (e.g. voltage and temperature), semiconductor process, and pipeline operations. For reliable operation, the clock frequency of a synchronous processor is slower than the operating rate required under worst-case conditions. This results in a reduced utilization of the technologies' performance when the processor operates under normal conditions. Accordingly, synchronous operation provides ease of implementation while restricting the processor's ability to fully use the potential performance of the semiconductor technologies.

To reduce synchronous operating constraints, numerous asynchronous or self-timed logic structures and design styles have been development. Some of these techniques have been applied to processor design. Self-timed processor design is a discipline of digital design in which the sequencing control of the processor's pipeline is distributed over the elements which form that pipeline. By comparison, a synchronous processor operates based on a central global clock, with all pipeline elements processing in lock-step.

Self-timed digital systems provide several advantages: operation which tracks the processor's environment (voltage and temperature) and process, adaptive and efficient external asynchronous interfaces and a wider and more reliable operating range. Preferably, a self-timed processor provides the system with all its available semiconductor performance and allows efficient data transfer independent of the individual operating rates of the communicating devices. Advantageously, the pipeline sequencing technique of the preferred embodiment achieves the implementation size, simplicity, and design ease of a synchronous pipeline with the adaptive operation (to environmental conditions, process parameters, and application types), wide operating range, and interfacing efficiency of self-timed structures.

Previous techniques have failed to achieve these advantages. Since they require variable encodings to support completion detection, previous self-timed systems typically require complex logic structuhave included completion detection and communication overhead for sequencing have reduced the efficiency of the pipeline.

Because of these constraints, previous self-timed processor implementations have not been extensively used. Nevertheless, by using the operational characteristics of a processor pipeline structure, self-timed pipeline operation is greatly streamlined according to the preferred embodiment. By using a synchronous structure with a self-adjusting clock, the complexity and overhead of previous asynchronous structures are reduced while providing adaptive operation, a wide operating range, and self-timed external interfaces.

STRiP is a self-timed RISC processor architecture of the preferred embodiment that achieves the logic simplicity and sequencing efficiency of synchronous structures, together with adaptive operation, efficient asynchronous interfaces, and wide operating range of asynchronous structures. The STRiP implementation includes two primary elements. The first element is a self-timed synchronous-pipeline sequencing technique called dynamic clocking.

Dynamic clocking is a pipeline sequencing technique described as a self-timed, synchronous structure. All pipelined functional units sequence in lock-step in response to a global sequencing signal. The global sequencing signal's period adapts on a cycle-by-cycle basis to the environmental conditions, process parameters, and pending pipeline operations. The global sequencing signal, or "clock", also stops and waits for completion of operations (e.g. external memory and I/O transfers) with external dependencies (indeterminate delays). Dynamic clocking supports a fully asynchronous external interface. A primary goal of dynamic clocking is to provide processor and system designers with a sequencing and interface technique which uses synchronous design tools and logic elements while providing the interface efficiency and performance available through self-timing.

Three key features of dynamic clocking are listed below.

1. Dynamic clocking generates a global sequencing signal (clock) which adjusts on a cycle-by-cycle basis to the pending pipeline operations. The cycle time of a dynamically clocked pipeline varies according to the critical pipeline operation for each cycle. This substantially removes the synchronous design constraint of a static clock frequency based on a single critical logic path. Frequently, such a single critical logic path is seldom used in a pipeline, so the pipeline's sequencing rate is unnecessarily slow:

2. Dynamic clocking generates a global sequencing signal which adjusts to changes in environmental conditions (e.g. voltage and temperature) and process. Dynamic clocking allows the processor to use substantially all the available semiconductor performance. By comparison, synchronous design constraints force the processor to operate based on worst-case conditions, independent of the actual operating conditions.

3. Dynamic clocking supports a fully asynchronous external interface with reduced synchronization overheads and metastable conditions (during data transfers). No external input or output clocks are used. Such fully asynchronous interface allows interconnection of devices independent of their operating rates or access times. Each device is allowed to operate and communicate at an optimum rate.

Since dynamic clocking allows a processor (independent of architecture) to fully use the available semiconductor performance and efficiently communicate with connected devices, system performance is greatly improved. A dynamically clocked RISC processor can operate 100% faster than a corresponding synchronous processor, both built with the same semiconductor technology.

Dynamic clocking sequences the pipelined functional units in lock-step, but adjusts each sequencing period in response to the present environment, process, and pipelined operations. This lock-step operation allows conventional synchronous logic structures to be used. Each cycle's period is determined in advance, thereby reducing self-timed sequencing overhehds.

A dynamically clocked processor of the preferred embodiment uses a synchronous pipeline structure sequenced by a self-adjusting global clock. A dynamic clock generator is integrated on the processor chip, allowing it to track changes in temperature, voltage, and process. It also inputs feedback information from the pipeline, and it adjusts the clock's period in response to the pending pipeline operations. To support a fully asynchronous external interface, the dynamic clock generator stops the clock signal until external dependencies are resolved. Dynamic clocking reduces the complexity and overheads of previous self-timed structures. It also provides adaptive pipeline sequencing and an efficient external interface for interconnecting devices independent of their respective operating rates.

To increase the performance of a self-timed pipeline, the memory system access time is removed from the critical logic path. One approach to this problem is to pipeline the first-level caches. This decreases the effective access time of the caches but increases the pipeline depth, resulting in increased branch and load penalties.

By comparison, the preferred embodiment includes small, low-latency caches, called zero-level caches, between the CPU and the first-level caches. To reduce the miss rate frequently associated with small caches (less than 256 bytes), the preferred embodiment uses an adaptive prefetching technique called predictive prefetching. Predictive prefetching uses a history of references to predict future data and instruction references. The combination of zero-level caching and predictive prefetching reduces the memory system latency and removes the memory system from the critical logic paths of the processor.

To understand the performance shortcomings of previous processors, it is important to understand the basic elements of high performance processor design. In connection with FIGS. 1–9, the discussion hereinbelow reviews the structural elements for determining performance levels in modern processors. It also describes two elements of pipeline operation, namely pipeline sequencing and memory system design.

In connection with FIGS. 10–26, the discussion hereinbelow provides detailed descriptions of specific logic structures for improving pipeline sequencing and memory system performance.

In connection with FIGS. 27–48, the discussion hereinbelow provides detailed descriptions of basic structures for an efficient STRiP implementation and gives processor performance measurements and comparisons with performance parameters of a corresponding synchronous design. Finally, the discussion hereinbelow concludes with possible enhancements to the self-timed organization.

FIGS. 1–9 provide a basis for understanding the architectural and structural improvements in processor design discussed further hereinbelow in connection with FIGS. 10–26. FIGS. 1–9 are directed to two primary elements of pipeline operation, namely pipeline sequencing and memory system design. Both elements significantly affect and often limit the performance of previous processors. In connection with FIGS. 1–9, the discussion hereinbelow presents design and processing constraints for both of these primary elements of processor design, discussing the proposed logic structures and how they improve performance within existing semiconductor technologies.

Processor performance is measured in many different ways. Essentially, the computer that performs the same amount of work in the least time is the fastest. The processing time of the central-processing unit (CPU) can be used as the processor performance measure (excluding waiting for I/O responses). As discussed hereinabove, processor performance can be expressed by the following formula:

$$\text{CPU time} = \text{Clock cycle time} * \text{CPI} * \text{Instruction Count}$$

This formula shows how processor performance is a function of three major elements. One element, clock cycle time, can be divided into two components: the number of gates in the critical logic path and the gate delay of the semiconductor technology. The techniques for improving the characteristics of each performance component are interdependent, making it difficult to isolate and improve one characteristic without degrading the other characteristics.

Instruction count is controlled by the instruction set architecture (CISC, RISC, VLIW) and the compiler technology. The processor's CPI is controlled by the processor's hardware organization, but is also affected by the instruction set architecture. The semiconductor technology, as well as hardware organization, control the cycle time, or sequencing rate, of the processor.

By increasing functionality of instructions, CISC and VLIW architectures decrease the instruction count, but increase the CPI and cycle time. RISC architectures reduce the CPI, and normally the cycle time, but increase the instruction count by streamlining the instruction set. Advances in VLSI technology allow significant decreases in cycle times, providing speedups regardless of the processor architecture. However, hardware organization affects utilization of the available semiconductor performance.

Many processors use a hardware organization called pipelining which increases performance by overlapping the execution steps of different instructions. To pipeline instructions, the various steps of instruction execution are performed by independent functional units or pipe stages. To execute an instruction, the processor passes it from one pipe stage to the next pipe stage until all required operations are performed. The pipe stages are separated by registers or latches. At any given moment, several instructions are in progress, each occupying a different pipe stage.

FIG. 1 is an illustration of a timing template for a general five-stage RISC pipeline. FIG. 1 shows how each instruction X, X+1, X+2, X+3, and X+4, overlaps the operations of other instructions in the RISC pipeline. Each line segment represents one pipeline cycle. For example, enclosure 14 includes operations for one pipeline cycle. Pipelining reduces the average number of cycles for executing an instruction without significantly increasing the processor cycle time. Compared to a non-pipelined design, pipelining significantly improves processor performance.

Other hardware organizations attempt to increase performance by further exploiting instruction-level parallelism. Superpipelining can be used to segment the pipe stages into smaller and faster units, thereby increasing the number of pipe stages and reducing the processor's cycle time. Nevertheless; superpipelining increases the cycle penalties from branch and load hazards, resulting in a higher CPI.

Superscalar processors attempt to exploit fine-grain instruction parallelism by using multiple, independently-pipelined functional units, thereby allowing multiple instructions to be issued per cycle. Even though superscalar architecture provides significant potential for high processing rates, there are key problems in the exploitation of low-level parallelism by a superscalar organization: detecting data and control dependencies, resolving these dependencies, and scheduling the order of instruction execution. Static and dynamic code scheduling techniques are used to optimize the available parallelism and resolve these dependencies. Although superscalar processors reduce the effective CPI, the processor's cycle time is increased by the complexity of instruction scheduling and register bypassing, and by the increase in signal loading.

Existing applications have a limited amount of instruction-level parallelism. A CPI improvement of 30%–40% is achieved for a dual-issue superscalar processor with in-order issue and out-of-order completion. Superpipelining and superscalar techniques are comparable ways of exploiting instruction-level parallelism. If instruction scheduling is limited to a single basic block, many pipeline machines exploit a significant amount of the instruction-level parallelism, even without parallel instruction issue or higher degrees of pipelining. Accordingly, a need has arisen for alternative hardware organizations to increase the processor performance without significantly increasing its complexity.

Preferably, processor performance is improved by reducing its cycle time without affecting the instruction count or CPI. One approach to reducing the processor's cycle time is to increase the pipeline sequencing efficiency. Previous processor sequencing techniques are constrained, and they limit the performance extracted from the semiconductor technologies. Another approach to reducing the processor s cycle time is to improve the performance of the constraining functional elements. For example, many computer systems, the memory subsystem performance substantially affects, and in many cases limits, the processor's performance.

The discussion hereinbelow describes a technique for improving processor performance without significantly changing the pipeline organization of a processor. The discussion hereinbelow further describes the proposed structural enhancements.

For instruction execution through a pipeline of functional units, the processor and system design adhere to a strict pipeline sequencing technique. A sequencing technique is defined by the way it connects sequence and time. This discussion describes two pipeline sequencing methods: synchronous and asynchronous (i.e. self-timed). Synchronous systems are widely used, primarily because of their design simplicity. Such systems use a single signal (or set of signals) called clocks to relate sequence to time. Nevertheless, synchronous systems have significant limitations, which are augmented as semiconductor technologies scale down and chips become larger.

A self-timed system is a viable alternative to synchronous systems. A self-timed system connects sequence and time within each logic element rather than through a global clock. Connected properly, self-timed elements achieve correct sequential operation with relative insensitivity to element and wire delays. Nevertheless, the design complexities and sequencing overheads of previous self-timed systems have limited their use.

This discussion describes the constraints of synchronous and self-timed systems and further describes an alternative sequencing technique for combining the advantages of both. According to synchronous sequencing techniques, the processor responds to a global synchronizing signal or clock to connect the properties of sequence and time. The transitions of the clock signal define the moments at which processor state changes can occur. The period of the clock signal provides a time reference for the latency and wire delay of the connected clocked elements. Difficulties relating to the design, optimization, modification, and reliable operation or synchronous processors arise from binding the sequencing and timing constraints of the processor's functional elements.

Figure 2:
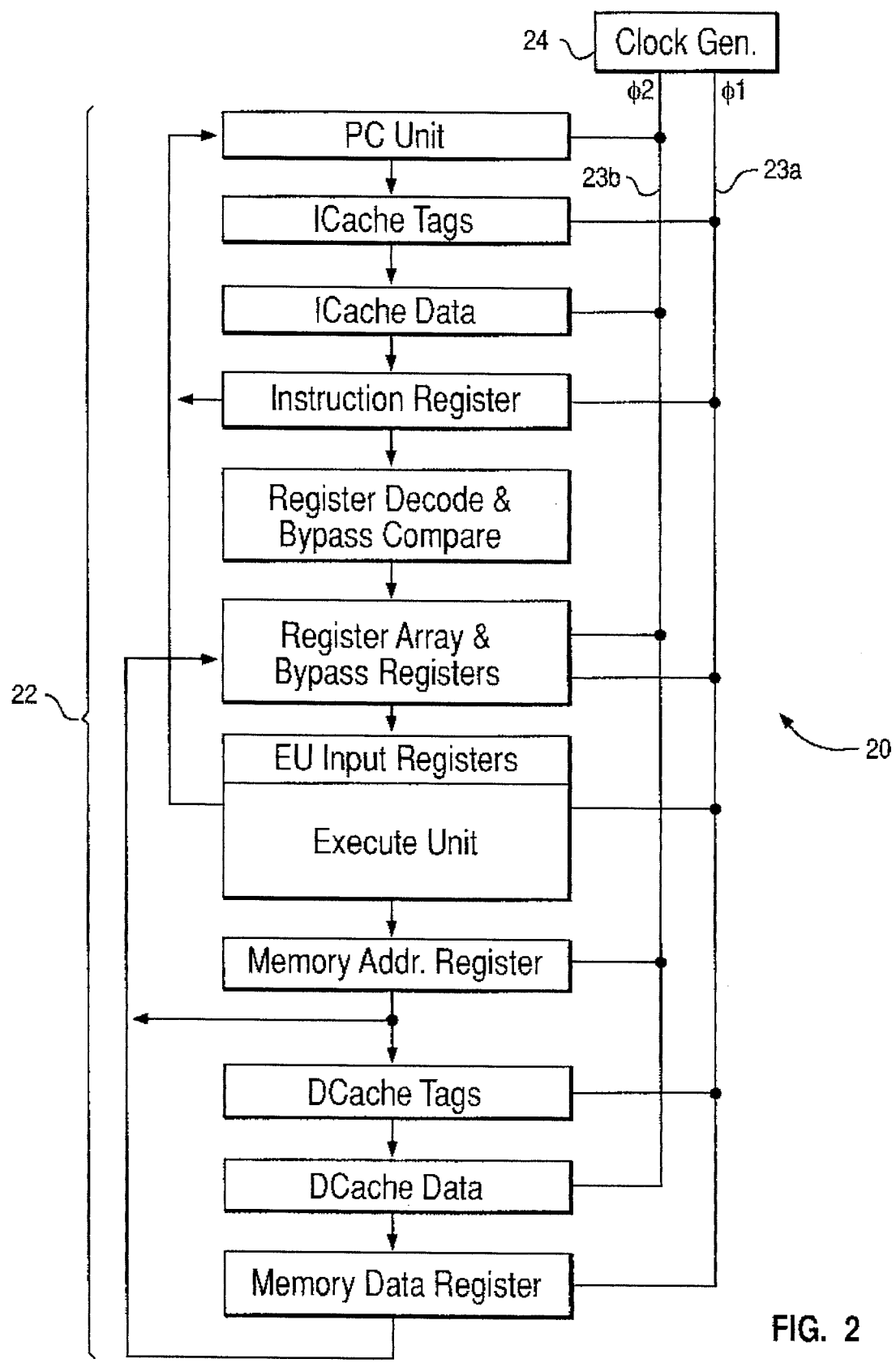
FIG. 2 is a block diagram of an exemplary synchronous RISC processor.

FIG. 2 is a block diagram of an exemplary synchronous RISC processor indicated generally at 20. Processor 20 includes a set 22 of functional units connected through a pipeline structure. All functional unit operations are initiated by transitions of signals on clock lines 23a–b output by a clock generator 24. Latencies or access times of functional unit operations are less than one or multiple clock periods. To provide a finer time resolution, the clock signals are divided into phases $\phi 1$ and $\phi 2$. Phases $\phi 1$ and $\phi 2$ are non-overlapping to avoid two-sided timing constraints. Two-sided timing constraints refer to the minimum and maximum delay imposed on the functional units by a single-phase clocking structure. A multi-phase, non-overlapping approach avoids minimum delay requirements.

Figure 3:
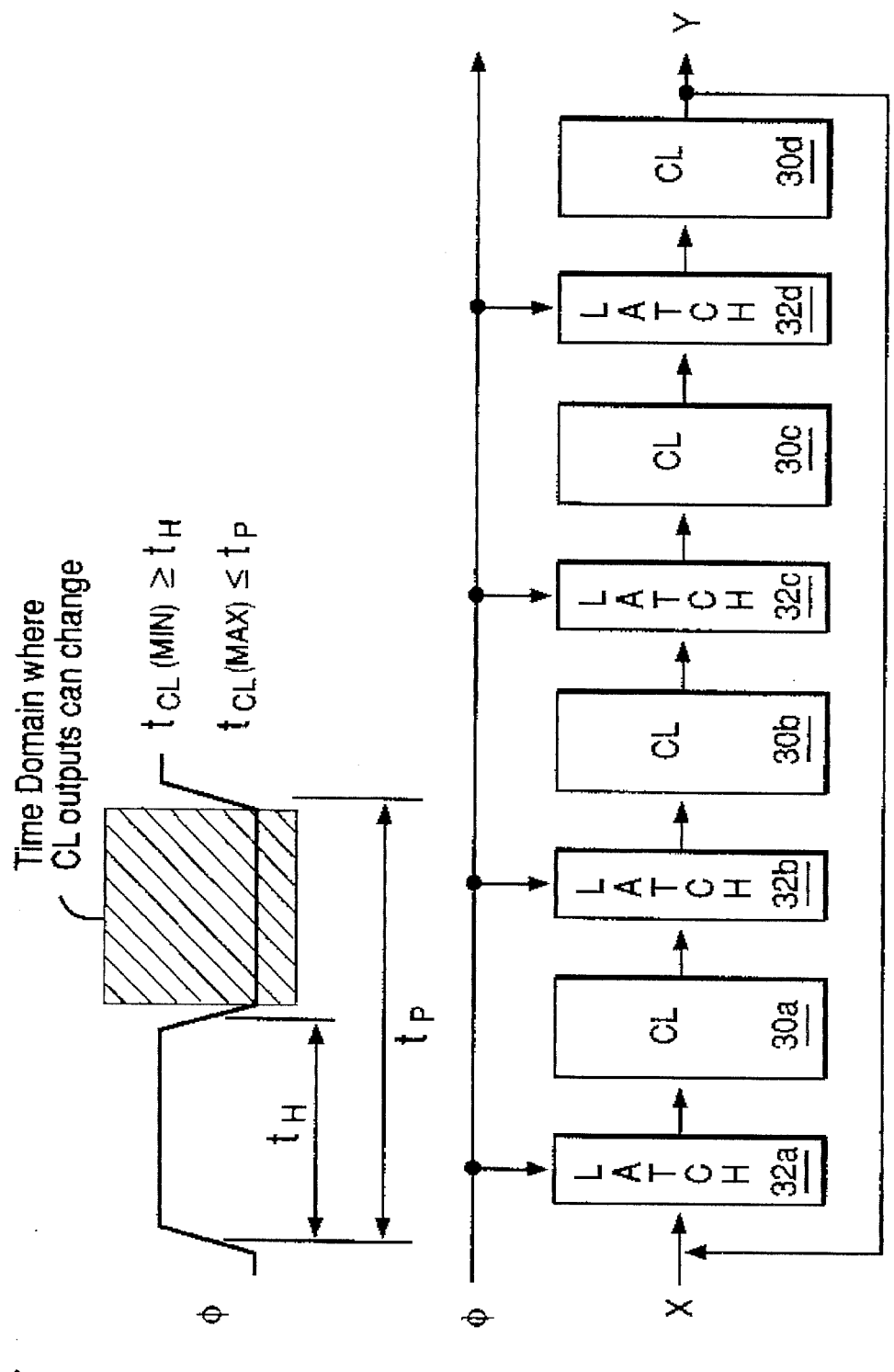
FIG. 3 is an illustration of a single-phase clock waveform and pipeline.
Figure 4:
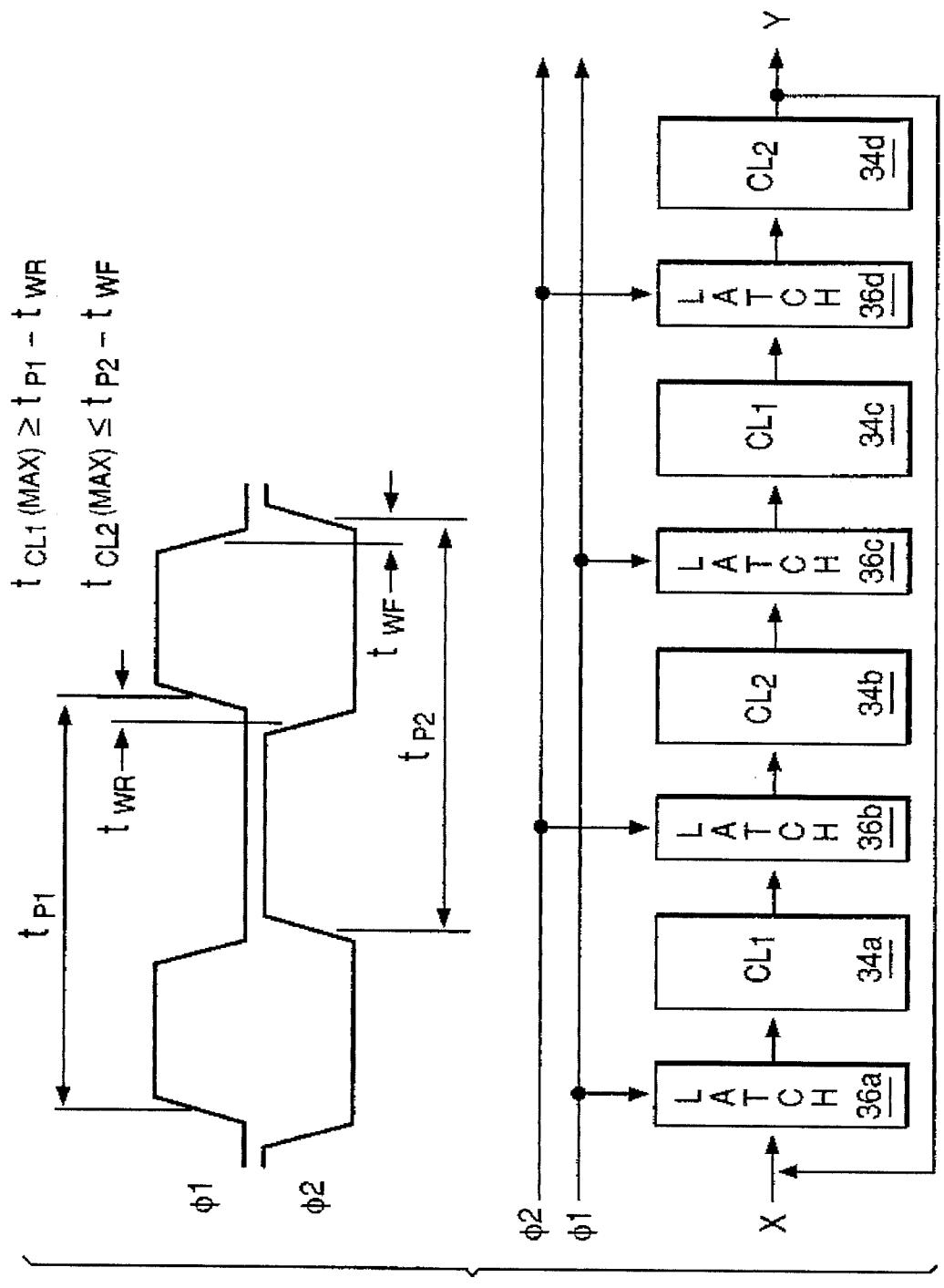
FIG. 4 is an illustration of a multi-phase clock waveform and pipeline.

FIG. 3 is an illustration of a single-phase clock waveform and pipeline. FIG. 4 is an illustration of a multi-phase clock waveform and pipeline. FIG. 3 shows a clock $\phi$ connected in a single-phase pipeline and further shows the combinational logic CL delay constraints. FIG. 4 shows clocks, $\phi_1$ and $\phi_2$, connected in a multi-phase pipeline and further shows the combinational logic, $CL_1$ and $CL_2$, delay constraints. Nevertheless, the use of multi-phase, non-overlapping clock structures is more difficult as clock frequencies and chip size increase because of the relative increase in clock skew.

Referring to FIG. 3, the pipeline's functional units are combinational logic blocks 30a–d separated by storage elements 32a–d. Referring to FIG. 4, the pipeline's functional units are combinational logic blocks 34a–d separated by storage elements 36a–d. The number of storage elements depends on the processing latency and the synchronization point between adjacent functional units.

A synchronous pipeline structure has three important consequences on the functional units' logical design: it assures deterministic behavior if the physical aspects of the design are also correct; it avoids a need for combinational logic to be free of transients (static or dynamic hazards) on its outputs; and it ensures that the storage-dependence or history-dependence of the system is entirely within the clocked storage elements, thereby simplifying the design process, maintenance, and testing of the system.

These synchronous design characteristics are primary advantages of synchronous digital systems. Combinational logic in a synchronous data path or control unit (e.g. finite-state machine) need not be free of logic hazards, thereby simplifying its implementation. Tools are available for aiding the design of logic for synchronous machines. Also, the period of the synchronous system's global clock can be statically altered to match the processing requirements of functional units. If a functional unit is slower than expected, the system can still function at a slower clock rate. The global clock also assures a substantially constant operating rate. The computation time of a synchronous system for a given operation is always substantially the same and always yields substantially the same result. These attributes allow synchronous processor implementations to be straightforward and area efficient.

Although synchronous processor implementations are effective, testable, and usually scalable, they fail to fully use the base technology's available performance. For example, CMOS process technologies allow commercial microprocessors and systems to operate at external clock rates exceeding 60MHz. Nevertheless, CMOS process technologies could produce significantly more performance if synchronous design constraints were not imposed. Since the clock period is static, the processor's operating frequency is established according to worst-case operating conditions. Such a clocking technique fails to adapt to the system's operating environment. Accordingly, a primary performance limiting constraint of a synchronous processor is the processor's operation assuming worst-case environmental conditions (temperature and supply voltage) and worst-case process.

Notably, CMOS component data books frequently provide signal latencies and functional operating frequencies for best case, nominal, and worst-case operating conditions. For example, TABLE 1 lists operating condition categories for military and commercial CMOS devices.

TABLE 1

Operating Condition Categories for Military and Commercial CMOS devices.

| Environmental Parameters | Environmental Conditions | | | |
|---|---|---|---|---|
| | Best Case | Nominal | Worst-Case | Units |
| Commercial: | | | | |
| Supply Voltage, VCC | 5.25 | 5.00 | 4.75 | Volts |
| Operating free-air Temperature, TA | 0 | 25 | 70 | °C. |
| Military: | | | | |
| Supply Voltage, VCC | 5.50 | 5.00 | 4.50 | Volts |
| Operating free-air Temperature, TA | −55 | 25 | 125 | °C. |

Figure 5A:
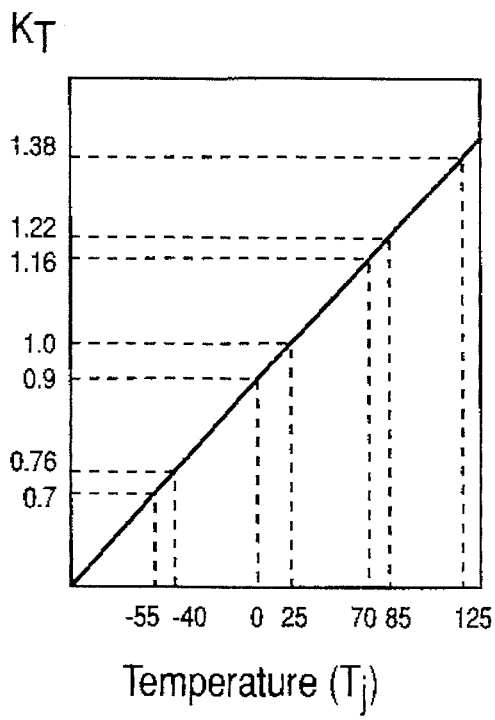
FIGS. 5a–b are graphs of propagation delay as a function of temperature, voltage, and process.
Figure 5B:
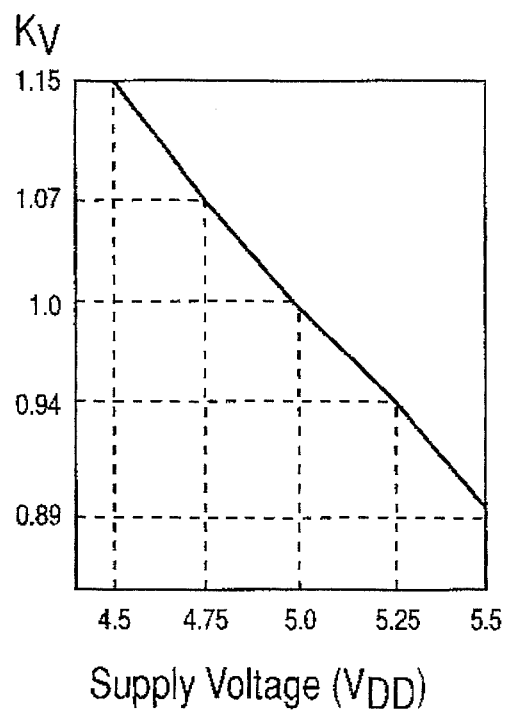

FIGS. 5a–b are graphs of propagation delay as a function of temperature, voltage, and process. The graphs of FIGS. 5a–b show the relation of VLSI circuit speeds to process and environmental (temperature, voltage) parameters. In FIGS. 5a–b, $t_{WC} = K_P * K_T * K_V * t_{nom} = K_{WC} * t_{nom}$ $t_{WC}$=worst-case processing latency or the synchronous pipeline clock period $t_{nom}$=nominal processing latency or the optimal average sequencing time $K_T$=worst-case temperature degradation factor $K_V$=worst-case supply voltage degradation factor $K_P$=worst-case process degradation factor =1.5

$K_{WC}$=1.862 for commercial voltage and temperature ranges

Frequently, manufacturers attempt to compensate for process variations by sorting VLSI components into groups, or bin-splits according to the components' operating frequencies under worst-case conditions. The components are sorted in response to frequency deterministic tests on each VLSI component during manufacturing. For example, processors and support components can be sorted into three frequency groups; 50 MHz, 40 MHz, and 33 MHz. The percent performance increase between such adjacent frequency groups is 25% and 21%, respectively. The frequency tests are discrete and start at the highest discrete operating frequency and work downward, so that the actual worst-case operating frequency of each component is unknown. A component failing the 50 MHz test, but passing the 40 MHz test, might actually operate reliably at 45 MHz. Operation of such a component at 40 MHz results in a loss in potential operating performance of 12.5%. Many system designers are aware of this performance loss but are unable to safely exploit any available component performance above the specified limit.

In another design constraint of synchronous processor implementations the sequencing efficiency of the structure is limited by critical logic paths among the pipelined functional units. The sequencing of a pipeline structure is frequently limited by one critical logic path. In many cases, that critical logic path's frequency-of-use is low.

For example, the most critical pipeline logic path might be a Compare-and-Branch operation. Nevertheless, this operation might only be used approximately 15% of the time. The next most critical logic path might be an Add operation having approximately six fewer gate delays or 12.5% less logic delay than the most critical pipeline path. This would result in a 10% lost in performance (0.85×0.125) over an optimally clocked or asynchronous structure. Accordingly, a synchronous processor normally operates at a rate slower than necessary for most logical operations.

Although the wire delay for the interconnection of local devices can be insignificant with respect to circuit speeds, a wire that traverses an entire integrated circuit (IC) can have significant delay. This decreases the efficiency of a global synchronizing signal or clock distributed over the entire chip area. The global clock signal wire delays can cause clock skews which are compensated either by reducing the functional unit latencies or by increasing the time between phases of a multi-phase clocking scheme. Since critical-path functional units are optimized initially, the clock period is lengthened to support any clock skew in the global clock signal.

One way to avoid clock skew and infrequently used critical-path dependencies is to divide the processor into processing units, each independently sequenced by a local clock. This results in a locally synchronous, globally asynchronous processor structure. A problem with this approach is the difficulty in synchronizing data transfer between two processing units. Since the synchronization overhead can be significant, the functional unit is carefully partitioned into processing units. Preferably, the synchronization process substantially avoids prolonged metastable conditions which might cause unreliable processor operation. Because of the synchronization overhead and potential for metastable conditions, it might be desirable to partition the processing units so that their functional delays are some multiple of a global clock period. This approach, while not optimum, substantially avoids the problem of synchronization.

A significant problem with synchronous structures at the system level is that elements can be constructed using a variety of technologies and architectures. Such elements operate at a common clock rate or at an integer division of that clock rate. For example, a RISC processor implemented using a 0.8 um CMOS process operates synchronously with a floating point unit (FPU) implemented using a 1.2 um BiCMOS process and a direct memory access (DMA) controller implemented using a 1.6 um CMOS process. The optimal operating frequency of each of these components might be different.

The problem is compounded by the fact that many synchronous system elements are inherently asynchronous. Examples of such elements include caches built using discrete SRAMs, system memory built using DRAMs, and channel interface units or switches which connect to primarily asynchronous buses. This combination of technologies, structures, and interfaces results in a trade-off of efficient individual element operation for synchronous operation among all elements. In many cases, without synchronous operation among connected devices, the communication overhead between devices is unacceptable, and metastable conditions are unavoidable. These types of synchronous digital system constraints operate to limit a designer's ability to fully use the available performance potential of semiconductor technologies.

With alternatives to a synchronous system structure more performance potential of semiconductor technologies can be used. As used herein, a synchronous system or processor transfers information between communicating logic elements in lock-step with a global clock signal. In an asynchronous system or processor, information transfer between communicating logic elements is NOT performed in synchrony with a global clock signal, but instead is performed at times according to latencies of the communicating logic elements. Asynchronous systems are implemented with self-timed logic elements. Accordingly, an asynchronous system or processor is also referred to as "self-timed".

The temporal control of a self-timed system is performed by the system's communicating logic elements. Time and sequence are related inside these logic elements, so that signal transitions at their terminals need to occur in predefined order. Processing is initiated by signal transitions at a self-timed element's input, while output signal events indicate completion of processing. The time for performing a computation is determined by the delay between initiation and completion, and by interconnection delays. For proper operation, communicating self-timed logic elements are connected through a closed control-signal path, usually including a request and acknowledge signal. A self-timed element does not request or accept new input data until the connected logic elements or storage devices acknowledge receiving the result of its previous computation. This communication protocol allows each self-timed element's operational characteristics to be substantially isolated from the characteristics of the other system elements. An asynchronous interface can remove many timing constraints from the system level design.

Moreover, an asynchronous digital system can substantially avoid many limitations of a synchronous digital system. A first advantage of an asynchronous digital system is its adaptation of operating rate to the semiconductor process parameters (resulting from the VLSI manufacturing process) and environmental operating conditions (temperature and supply voltage). Accordingly, an asynchronous processor implemented using a CMOS technology operates faster at 5.5 volts and 0° C. than at 4.5 volts and 70° C. In general, this allows a self-timed design to fully use the available semiconductor performance. Also, this adaptability allows self-timed circuits to operate over a wider environmental range. The reliable operating range of an asynchronous system is limited by the semiconductor's physical resiliency to damage, and not by a range dictated by a global clock. These factors allow a single asynchronous system to support both commercial and military environments while substantially providing the best possible performance for any given operating environment.

If all elements of a system or processing complex are self-timed, then logic elements can be interfaced through an asynchronous communication protocol. This communication protocol allows each self-timed element's operational characteristics to be substantially isolated from the characteristics of the other system elements. Accordingly, processor complex chip-sets are not rendered incompatible or inefficient by improvements in the processor's semiconductor technology.

Asynchronous logic systems can provide correct operation without detailed analysis of synchronization constraints for each independent system element; faster development cycles since each logic element need not be redesigned for efficient system operation; a longer usefulness for subsystem logic elements; and a design structure for substantially providing maximum possible performance for a given technology and operating conditions. Performance is substantially maximized without sacrificing system reliability and robustness.

Despite the advantages of self-timed system structures, previous self-timed circuits have significant shortcomings which limit their use in general-purpose computer systems. A primary component in a computer system is the CPU. Without an asynchronous CPU or processor, an asynchronous system is impractical to implement efficiently.

Many general-purpose processors have complex data paths and a multi-token pipeline structure. In a multi-token pipeline structure, each functional unit operates on a different data variable, or token, during a given cycle. With microprocessors having 64-bit data paths, encoding of logic signals to support self-timed operation presents serious problems.

FIG. 6 is an illustration of exemplary data streams for a single-rail encoding scheme and for three dual-rail encoding schemes. Dual-rail variable encoding is a widely used technique for self-timed circuit design. The three dual-rail encoding schemes of FIG. 6 are 4-Phase, transition signalling, and LEDR. As shown in FIG. 6, these variable encodings increase the implementation complexity of connected functional units.

FIGS. 7a–b are schematic electrical circuit diagrams of two dual-rail implementations of a full-adder element, thereby illustrating the implementation complexity. FIG. 7a shows a self-timed dual-rail full-adder using a PLA-like structure, and FIG. 7b shows a self-timed dual-rail full-adder using a DCVSL structure. By using dual-rail encoding, sequencing-control logic can detect completion of each functional unit operation.

FIG. 8 is a block diagram of a conventional two-input dual-rail completion detector. The gate labeled "C" is a Muller C-element. The C-element's output 70 is a logic 1 in response to all the inputs 72a–b being a logic 1, is a logic 0 in response to all the inputs 72a–b being a logic 0, and retains its logic state in response to the inputs 72a–b being neither all 0 nor all 1. A C-element tree is used to detect completion for a larger number of variables. C-elements are discussed in more detail hereinbelow.

As discussed hereinabove, FIGS. 6, 7a–b, and 8 show configurations and complexities of previous self-timed logic structures. Other shortcomings of a self-timed, multi-token pipeline structures are the time for generating a completion detection signal and the communication overhead for supporting data transfer between adjoining pipelined elements.

FIG. 9 is a block diagram of a conventional asynchronous pipeline structure. FIG. 9 illustrates how self-timed elements are connected in a conventional asynchronous pipeline structure. The asynchronous sequencing overheads result from delays of the completion detectors CD0–CD3 and Muller C-elements C1–C3. These devices communicate the operating condition of each precharged dual-rail combinational logic block LB1–LB3 to its successor and predecessor, adding to the sequencing period of that logic block.

This overhead can negatively affect the asynchronous pipeline's throughput. Some techniques attempt to reduce both completion detection and communication overheads. For example, by using a single data-variable bit to detect completion (rather than using a full completion tree for all the bits), the completion detection overhead can be significantly reduced for carry-save-adders used in a divider circuit. The communication overhead between function elements can be significantly reduced by pipelining the communication operations among the internal elements. This is possible where the divider operates on one token at a time. Because of the required functional unit granularity, such techniques are less efficient for multi-token, pipelines of general-purpose processors.

Another technique for minimizing the effects of completion detection and communication is to implement large processing elements so that the delay of completion detection and communication is small compared to the processing elements' delays. Nevertheless, in a general-purpose VLSI processor, the functional units might only require 20 series gate delays (as is required by functional units discussed hereinbelow in connection with FIGS. 27–48), while the completion detector and communication signalling require a minimum three gate delays (one C-element and one NOR when using a single data-bit pair for completion detection). For this example, the completion detection circuit would increase the functional unit latency by approximately 15%.

Development tools for self-timed circuit design are not widely available, thereby increasing the difficulty of implementing an efficient and competitive self-timed processor or logic system. DSPs, control logic, multi-processor switch networks, and a 16-bit RISC processor have been implemented using self-timed logic structures. Nevertheless, such previous self-timed logic structure have complex implementation, large size, and insufficient performance relative to corresponding synchronous logic structures.

Even with potential for adaptive operation and ease of interfacing, self-timed processor techniques have not been widely used. The increased complexity and sequencing overhead of self-timed logic structures have limited their use in processor and system designs. By comparison, the pipeline sequencing technique of the preferred embodiment has the implementation size, complexity, and design ease of a synchronous pipeline structure, together with the adaptive operation (to environmental conditions and process parameters), wide operating range, and interfacing efficiency of a self-timed structure. In connection with FIGS. 10–15, the discussion hereinbelow describes a pipeline sequencing technique having these characteristics and called dynamic clocking.

Dynamic clocking is a pipeline sequencing technique which can be described as a self-timed, synchronous structure. All pipelined functional units sequence in lock-step in response to a global sequencing signal. Advantageously, the period of global sequencing this signal adapts on a cycle-by-cycle basis to the environmental conditions, process parameters, and pending pipeline operations. The global sequencing signal, or "clock", also stops and waits for completion of operations with indeterminate delays (e.g. external memory and I/O transfers). Such a dynamic clocking technique supports a fully asynchronous external interface. Significantly, dynamic clocking is a sequencing and interface technique which uses synchronous design tools and logic elements while providing the interface efficiency and performance available through self-timing.

Memory system performance significantly affects, and in many cases limits, the performance of microprocessors. The average access time of a memory system depends on many factors: the processor's architecture, the program's behavior, the caches' sizes and organizations, and the fetch and prefetch strategies. Preferably, a balance is reached between the caches' access times (a general rule is that smaller caches have lower latencies), the caches' miss rates, and the penalty for a cache miss. Ideally, the first-level cache access time is less than the other pipelined functional unit latencies, and the miss rate is low.

A primary goal for a more efficient memory system is to reduce the average time for accessing a memory word. Memory system performance can be enhanced by hardware and software techniques. An improved memory hierarchy is described hereinbelow for significantly improving memory system performance and processor efficiency.

Caches are used in all forms of computer systems: embedded controllers, laptops, personal computers, workstations, mainframes, and supercomputers. Caching is a technique for increasing a system's performance. Caches are important for efficient system operation. Previous studies have focused on cache size, associativity, block size, fetch size and fetch strategies. Integrated circuit technology allows a CPU and a small first-level cache to reside on a single chip. Many studies have focused on hit rates and have not adequately addressed implementation complexity, access time, and interface efficiency.

A primary goal for an improved memory system is to reduce the average access time for instruction and data requests. Excluding the register file, the cache nearest the CPU, or first-level cache, has the shortest access time and highest bandwidth of all levels in the memory hierarchy. Most programs exhibit the principles of spatial locality, temporal locality, and instruction sequentiality, so that most CPU memory reference access one or more first-level caches. An efficient memory system has an average memory access time approximately equal to the access time of the first-level cache.

There are several ways to reduce the effective access time of data and instruction references to the memory system. One technique for increasing the memory system's throughput is by pipelining the first-level caches. This technique is frequently used when the first-level caches have an access time greater than the operational latency of the other functional units in the pipeline.

Such a pipeline cache can result in two dependency hazards in a machine, one for data and one for instructions.

For data, dependency checking logic stalls the machine to ensure a data load operation completes before the data is needed by subsequent instructions. For instructions, the pipeline cache increases the number of cycles for restarting the pipeline after a mispredicted branch operation. Accordingly, shortcomings of such a technique are that it increases the number of stages in the pipeline (resulting in an increase in the branch and load penalties) and increases complexity of the memory unit.

Another technique for reducing the average access time of data references is to provide queues, either explicitly architected or transparent to the user, that allow the machine to continue executing instructions while waiting for the memory request to be serviced. Since the memory system speed is not integrated into the processor's architecture, data conflicts are resolved by more hardware. A single element transparent queue can allow instructions after a load, which do not use the requested data, to continue to operate after the load reference is initiated. Queues can also be used in the instruction fetch stream. Instruction queues can be used to fetch ahead of the instruction request and to disconnect the memory system performance from the processor's sequencing rate.

Another technique for improving the performance of instruction references is to use target instruction buffers. A target instruction buffer stores the targets of previous non-sequentialities in the instruction stream. These targets include the target word after a branch and d succeeding words, thereby attempting to reduce the penalty of a non-sequentiality in the instruction stream. When a branch is taken, the instructions are removed from the target instruction buffer, and the instruction-fetch control logic references instructions sequential to the ones in the buffer. Buffering of two of the most recent targets can produce a significant improvement in memory system performance. The use of prefetch buffers and target instruction buffers can reduce instruction fetch delays by 50%. A shortcoming of this fetch technique is the high amount of continuous memory bandwidth for the next level of the memory hierarchy.

To improve the performance of data references, miss caching and victim caching can be used to improve the first-level cache's average miss penalty. Miss caching places a small fully-associative cache between the first-level cache and the next level in the memory hierarchy. The miss-cache stores the missed cache blocks in a least recently used (LRU) fashion. Misses in the cache that hit in the miss-cache have only a one-cycle miss penalty. Victim caching is an improvement to miss caching where the cache block replaced by the new cache entry is stored in the small fully-associative cache. Both techniques increase the associativity of a directed mapped cache and are most effective in the data stream.

Also, stream buffers can be used in the refill path of a direct-mapped instruction cache to store prefetched cache blocks starting at a cache miss address. This is similar to the fetch-on-fault prefetch strategy described further hereinbelow in connection with FIGS. 16–26, but the cache is not dual-ported. None of these techniques reduces the access time of the first-level cache, but they do reduce the first-level cache miss penalty. Accordingly, these caching techniques fail to significantly reduce the pipeline's cycle time.

One criteria for a memory system is reduction of the first-level cache miss ratio. The miss ratio of a first-level cache is often limited by its size, which is normally a function of available technology. To further reduce the miss ratio, aggressive fetch and prefetch strategies are used.

Fetch strategy is the interface technique and protocol for accessing and transferring information into a cache memory and processor pipeline during a cache miss operation. Prefetch strategy is the interface technique and protocol for accessing and transferring information into a cache memory or data buffer before it is requested by the processor. Prefetching is normally based on previous processor reference patterns. The history of reference patterns can be either the last reference (used in sequential prefetching) or the collection of all previous references (used in predictive prefetching).

A fetch strategy involves defining a control technique for a significant number of operational parameters. Basic fetch parameters include: which word in a cache block is returned first; when is the processor allowed to continue execution; what replacement technique is used; and how many sub-blocks or blocks are retrieved during a fetch. One fetch strategy, called non-blocking requested-word-first (nbrwf), fetches in response to a cache miss, returns the requested word first, allows the processor to continue execution after the first word is retrieved, and fetches a total of one cache block (fetch size =block size).

One modification to this strategy is blocking sequential-word-first (bswf), where the processor execution is stalled until the entire cache block is fetched. Another modification to this strategy is terminating non-blocking requested-word-first (tnbrwf), which terminates the fetch and services a new processor request if another miss occurs while a fetch is in progress. Normally, the nbrwf fetch strategy provides better performance, though only 4% better than bswf.

A prefetch strategy involves the same fetch parameters as a fetch strategy, plus additional parameters to control: when the prefetch occurs; when the prefetch operation has priority over a processor request; and depth the prefetch is propagated in the memory hierarchy. An efficient prefetch strategy can reduce the miss rate of a cache or prefetch buffer, thereby reducing the memory system average-access time. Nevertheless, prefetching of instructions and data is not always practical due to lack of transfer bandwidth between the cache and higher levels in the memory system. Also, while most prefetch techniques effectively predict future instruction references, they less effectively predict future data references. Accordingly, there is a need for an alternative technique for reducing the memory system's average access time.

Figure 16:
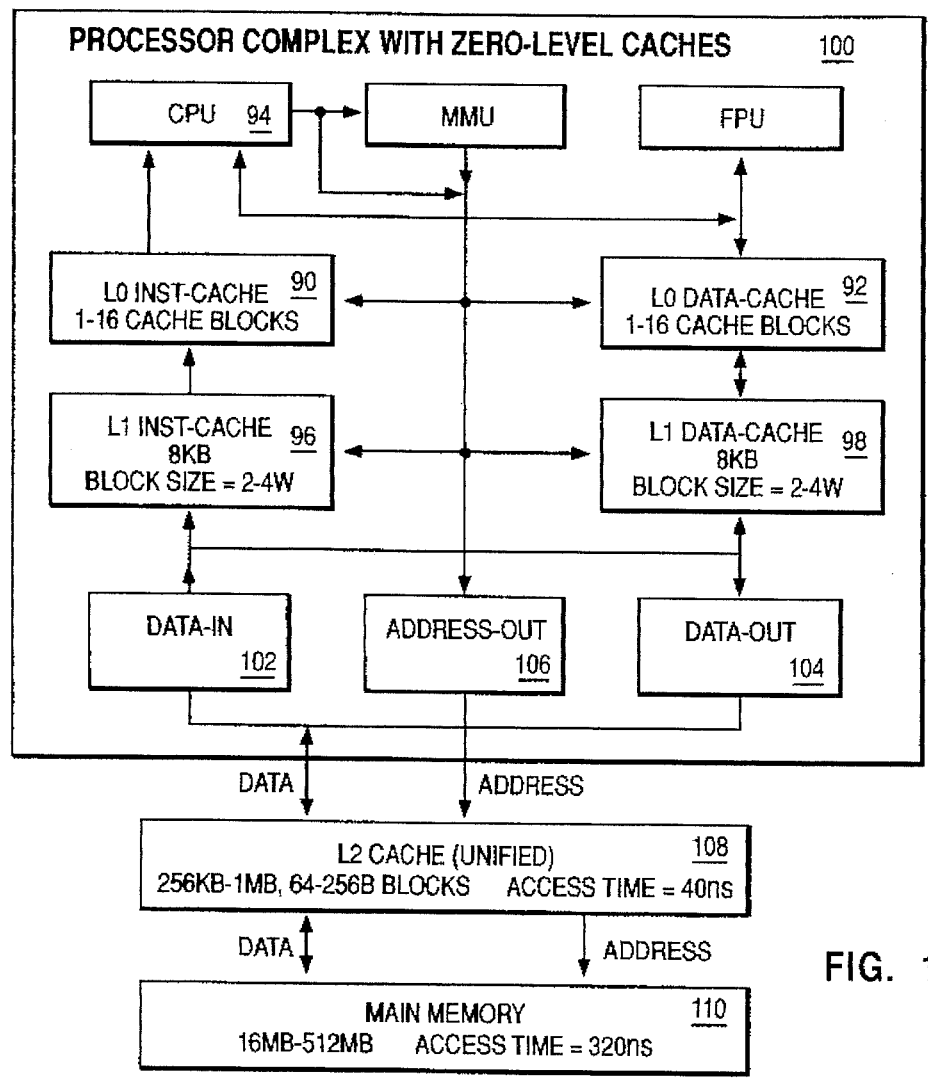
FIG. 16 is a block diagram of a memory hierarchy with zero-level caches.

FIG. 16 is a block diagram of a memory hierarchy with zero-level caches. FIG. 16 shows the location of zero-level caches 90 and 92 in the memory hierarchy. To significantly reduce the average access time of the first level in the memory heirarchy, zero-level caches 90 and 92 are very small fully-addressable prefetch buffers between a CPU 94 and first-level caches 96 and 98. Consistent with their location in the memory hierarchy and their operational characteristics, these prefetch-buffers 90 and 92 are called zero-level caches or L0 caches.

Zero-level caches 90 and 92, CPU 94, and first-level caches 96 and 98, are part of a processor complex 100. Processor complex 100 further includes a memory management unit MMU, a floating point unit, FPU, a data-in buffer 102, a data-out buffer 104, and an address-out buffer 106. Processor complex 100 is coupled through an L2 cache 108 to a main memory 110. Zero-level caches 90 and 92 are located in both data and instruction reference paths.

Because of their small size (not greater than 256 bytes); zero-level caches 90 and 92 have less than half the access delay of conventional internal first-level caches (usually 8 KB in size). The zero-level cache size is small to reduce the access time and to keep the implementation complexity of these fully-associative caches manageable. Relative to a conventional internal first-level cache, a zero-level cache is approximately 3% the size and has less than half the latency.

Previous implementations of small caches have been relatively ineffective. The high miss ratios of small caches have more than offset their fast access times. To improve the miss ratios of zero-level caches 90 and 92 the preferred embodiment advantageously uses a novel prefetch technique.

Predictive prefetching is a hardware-controlled prefetching technique which uses a history of reference patterns to predict future instruction and data reference patterns of CPU 94. Predictive prefetching advantageously supports the general reference stream for both instructions and data. A primary goal of predictive prefetching is to effectively prefetch processor references from first-level caches 96 and 98 to zero-level caches 90 and 92.

With a suitable interface size, block size, and cache size, predictive prefetching allows a zero-level cache to achieve a hit-ratio comparable to that of a first-level cache, but with an access time no more than half that of a conventional first-level cache. With such a zero-level cache, the average access time of the memory system is reduced to a latency level less than the other critical pipeline stages. By using zero-level caches with predictive prefetching and dynamic clocking, a processor's performance is improved, so that average cycle time is reduced without significantly increasing CPI or instruction count. In connection with FIGS. 16–26, the discussion hereinbelow further describes zero-level caching, predictive prefetching, and their hardware implementations.

As discussed hereinabove, the preferred embodiment uses a pipeline sequencing technique called dynamic clocking. Dynamic clocking is a self-timed synchronous sequencing technique having the adaptive-operating and efficient-interfacing characteristics of asynchronous logic structures, together with the implementation ease, sequencing efficiency, and small physical design of synchronous logic structures. Relative to previous techniques, dynamic clocking provides more flexibility in establishing the pipeline's sequencing dependencies and allows the use of substantially all the potential performance of a semiconductor technology.

Figure 10:
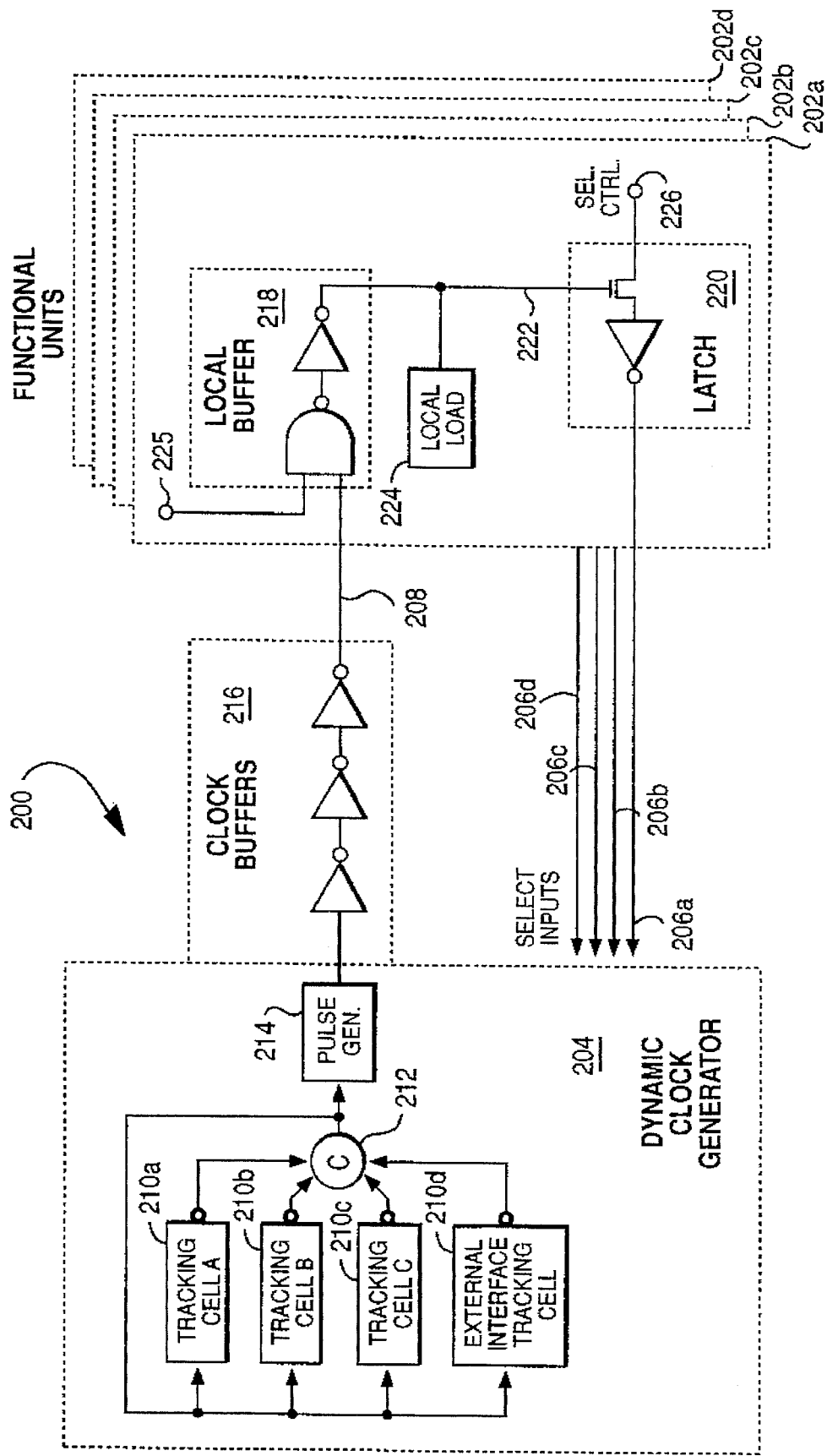
FIG. 10 is a block diagram of a general dynamic clocking digital system.

FIG. 10 is a block diagram of a general dynamic clocking digital system, indicated generally at 200. Dynamic clocking is a pipeline sequencing technique for processors and controllers. Dynamic clocking supports a self-timed, synchronous pipeline structure. Dynamic clocking further supports a pipeline sequencing and interface structure which uses synchronous design techniques and logic elements, achieves environment and process dependent performance, and provides an efficient asynchronous interface technique. In connection with FIGS. 10–15, the discussion hereinbelow provides a detailed description of a dynamic clocking system for a RISC processor.

Dynamic clocking achieves two primary goals. The first goal is to improve processor performance by fully using the available semiconductor performance by synchronous design constraints. The second goal is to efficiently interconnect chips and subsystems, independent of their respective optimal operating rates.

To achieve these two goals, dynamic clocking effectively supports asynchronous sequencing of a processor pipeline. Relative to synchronous techniques, dynamic clocking neither significantly increases the logic for building the pipeline structure nor significantly decreases the performance of the functional units. Dynamic clocking substantially eliminates constraints that otherwise limit the throughput of a synchronous processor, without significantly changing the conventional logic structures.

System 200 includes multiple functional units 202*a–d*. A processor's throughput is determined by one or more of functional units 202*a–d* having the worst-case operational latency. In general, synchronous implementations having a static-frequency clock are limited by the latency of the slowest operation among all the pipelined functional units. This limitation exists independent of the slowest operation's frequency-of-use.

By comparison, a fully asynchronous pipeline, formed by self-timed logic elements, is limited only by the slowest operation for a given cycle. The slowest operation varies on a cycle-by-cycle basis. Because of the conventional RISC pipeline structure and functional unit implementation, asynchronously-sequenced functional units wait until a slowest operation has completed before advancing to a next data token. So long as a pipeline can be sequenced according to the slowest operation for each cycle, maximum performance can be achieved without a fully asynchronous structure.

Dynamic clocking uses a self-timed, synchronous pipeline sequencing structure, thereby substantially avoiding the complexities of a fully asynchronous structure. This synchronous structure of dynamic clocking is clocked by an environmentally adaptable, operationally variable, stoppable clock sequencing signal. A dynamically-clocked pipeline sequences functional units 202*a–d* in lock-step in response to the environmental conditions, process parameters, and the critical-path operation pending for each cycle.

A dynamic-clock generator 204 is integrated on-chip and inputs operational information from pipeline functional units 202*a–d* through select inputs 206*a–d* and outputs a clock sequencing signal on a clock distribution network 208. Clock distribution network 208 is coupled to each of functional units 202*a–d*. The clock signal has a clock period sufficiently long to support the pending operations. Dynamic clock generator 204 does not use an external oscillator or crystal, so that phase-lock-loops are not used. For operations involving functional unit 202*d* where latencies are indeterminate (e.g. data transfers between the processor and independently sequenced devices), clock generator 204 stops the clock signal until a completion signal is received from functional unit 202*d* through select input 206*d*. Significantly, since dynamic clock generator 204 is integrated on the processor chip, its operation tracks the environmental conditions and process parameters present for the logic elements in the pipeline.

A functional unit's processing latency is accurately tracked by a tracking element, and a local-clock generator is formed for this tracking element. In a significant aspect of the preferred embodiment, the clock signal's period varies in response to multiple operations. Clock generator 204 adjusts the clock signal's period in response to the semiconductor process and environment.

A tracking cell, formed by the components of an operation's critical-logic path, provides more accurate tracking of the operation's latency than a tracking cell formed by an inverter chain. Also, the ability to start and stop the clock signal for each operation allows automatic and efficient synchronization to all input operands. This type of clock operation substantially eliminates metastability concerns when interfacing two non-synchronized devices.

Dynamic clock generator 204 uses tracking cells 210*a–d* for delay matching. Preferably, a variety of operations are supported, and the clock signal's period is dynamically adapted to those operations on each cycle. Tracking cells 210*a–d* are formed according to the critical processing paths in the pipeline. The expected utilization of each critical-logic path and its relative processing latency are two primary factors in determining which paths to track.

The independent tracking of each critical-logic path supports a continuous operation of dynamic clock generator 204, thereby substantially avoiding sequencing overhead from stopping the clock signal, waiting for a completion signal, and starting the clock signal before each cycle. To support this dynamic clocking technique, information from the processor's instruction decoder, the caches, and the bus interface unit is used to determine operations for the next pipeline cycle. Tracking cells 210a–d allow clock generator 204 to establish the clock signal's period for the next operation during the present cycle. Accordingly, dynamic clock generator 204 establishes the clock signal's period in advance of the clock signal's actual use to sequence the pipeline (in continuous time units). By establishing the clock signal's period in advance, system 200 substantially avoids the communication overhead associated with previous completion detection schemes.

Figure 11:
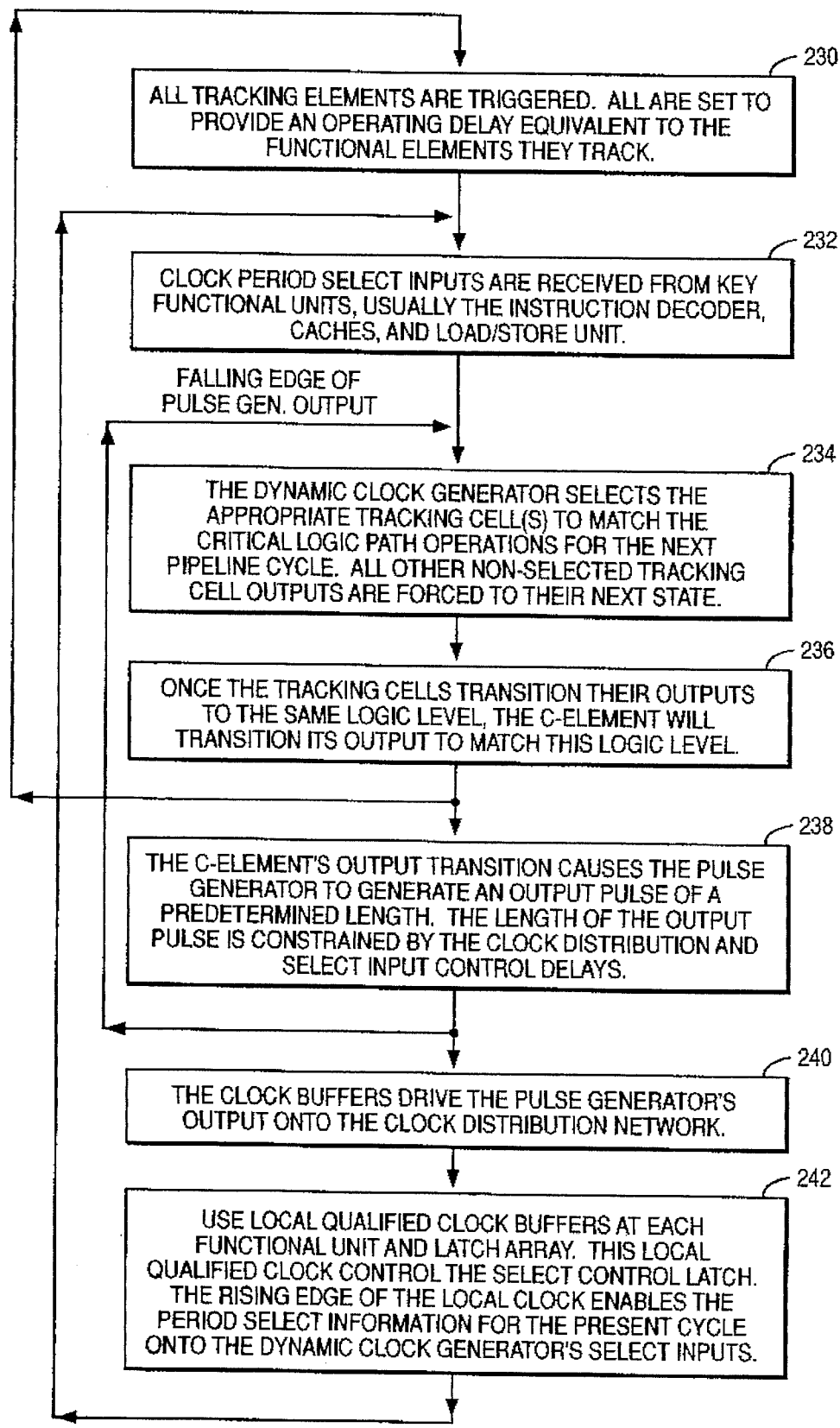
FIG. 11 is a flowchart of a sequence of operations of the system of FIG. 10.

FIG. 11 is a flow chart of a sequence of operations of system 200. At a first step 230, all tracking cells 210a–d are triggered to begin tracking critical-logic paths of their respective associated operations. Tracking cells 210a–d are set to provide operating delays substantially equal to their respective associated operations. At a next step 232, dynamic clock generator 204 reads statuses of select inputs 206a–d from functional units 202a–d, respectively, to determine one or more operations in effect for the next cycle. Accordingly, functional units 202a–d are key functional units, such as an instruction decoder, caches, and a load/store unit.

At a next step 234, in response to the statuses of select inputs 206a–d, dynamic clock generator 204 selects one or more of tracking cells 210a–d to match the critical-logic path operations for the next pipeline cycle period. Inverted outputs of non-selected tracking cells are forced to the next logic state. At a next step 236, in response to each selected one of tracking cells 210a–d transitioning its inverted output to the next logic state in response to completion of the tracking cell's respective associated operating delay, C-element 212 transitions its output to match the logic state of the inverted outputs of tracking cells 210a–d. As shown in FIG. 10, the output of C-element 212 feeds back to inputs of tracking cells 210a–d.

At a next step 238, in response to the output transition of C-element 212, a pulse generator 214 generates an output pulse of a predetermined length. The length of the output pulse is constrained by the clock distribution and select input control delays. At a next step 240, clock buffers 216 drive the output from pulse generator 214 onto clock distribution network 208 for distribution to functional units 202a–d.

Functional unit 202a is a representative one of functional units 202a–d. Referring to functional unit 202a, at a next step 242, local qualified clock buffers 218 are used to control select control latch array 220. Local clock buffers 218 are connected to latch array 220 through lines 222 having attached local load 224. A rising edge of the output pulse from clock distribution network 208 enables the period select information for the present cycle from a select control node 226 onto select input 206a, so long as a local enable node 225 is asserted.

Accordingly, the period select information from select control node 226 indicates whether a particular operation of functional unit 202a is in effect for the next cycle. This period select information is transferred to clock generator 204 through select input 206a in response to a rising edge of the output pulse from clock distribution network 208, so long as local enable node 225 is asserted.

After step 242, execution returns to step 232. Notably, after step 238, in response to a falling edge of the output pulse from clock distribution network 208, execution returns to step 234 (in parallel with execution continuing to step 240). Also, after step 236, execution returns to step 230 (in parallel with execution continuing to step 238).

During data transfer cycles, the clock signal on clock distribution network 208 stops to devices outside the clocked pipeline structure. Clock generator 204 waits for a completion signal from functional unit 202d through select input 206d before processing continues. The latency for restarting the clock signal is formed by chip interface delays, generator delays, clock buffering delays, and the clock distribution lines. In many cases, the clock startup time is small compared to the processing time of the transfer. Also, the clock startup time can be overlapped with part of the data transfer time, thereby reducing its overhead. The operations for which the clock signal is stopped include: second-level cache accesses, memory system accesses, floating-point unit transfers, I/O device transfers, and shutdown operations (to conserve power).

In connection with FIGS. 12–14b, the discussion hereinbelow describes constraints and significant elements for implementation of dynamic clock generator 204 and for implementation of the pipelined elements.

Tracking cells 210a–d accurately track the delays of their respective target operations and match the variations resulting from changes in temperature, voltage, and process. In the preferred embodiment, each of tracking cells 210a–d duplicates the series of gates, lines, and signal loads of its respective target operation's critical-logic path. Tracking cells 210a–d are symmetric in their output transition delays, thereby providing a consistent clock period from cycle to cycle. The minimum delay of a tracking cell is greater than the maximum delay of the respective critical-logic path, and asymmetric operation reduces efficiency of the dynamic clock generation. Preferably, the cycle-to-cycle clock period variation for a single critical-logic path is as small as practical (for constant environmental conditions and process).

Preferably, tracking cells 210a–d match the critical logic paths which impact the pipeline sequencing period. These dominant operations are identified in response to their latencies and frequencies-of-use. Decoding of tracked operations is available at least during the cycle before the operations occur. This allows output of select signals for enabling tracking cells 210a–d in dynamic clock generator 204. In connection with FIG. 15, the discussion hereinbelow describes an exemplary tracking cell selection process for a dynamically clocked RISC processor according to a MIPS-X compatible implementation.

A non-selected tracking cell's output transition occurs before the output transition of the minimum delay tracking cell. Generally, the output transition of a non-selected tracking cell is advanced by using multiplexers to force the internal gates to switch in parallel, instead of serially.

C-element 212 is a Muller C-element. C-element 212 is located in the clock generation logic path. C-element 212 detects the output transitions of all tracking cells 210a–d and indicates to pulse generator 214 when all of tracking cells 210a–d transmitioned their respective outputs. Operating characteristics of C-element 212 allow several tracking cells to be activated during a single clock cycle. From among such activated tracking cells, the tracking cell with the longest delay controls when C-element 212 transitions its output and thus controls the cycle time for that pipeline period.

The delay of C-element 212 is minimized to reduce its overhead during clock generation. Tracking cells 210a–d mask most of the C-element delay without significantly sacrificing tracking efficiency. The amount of overhead resulting from C-element 212 is less than 5%. C-element 212 is non-inverting, has symmetric output transition delay, and drives sixteen standard loads. C-element 212 is discussed further hereinbelow in connection with FIGS. 27–48.

The pulse output by pulse generator 214 has a width greater than or equal to the worst-case delay between the output transition of pulse generator 214 and the valid transition of the inputs that select the period of the next clock signal. The series of elements forming this delay includes: (a) global clock buffers 216, (b) clock distribution network 208, (c) local clock buffers 218, (d) select control latch 220, and (e) wire delay of the select input. Another secondary constraint on pulse generator 214 is the latching delay times of the pipeline storage elements, which can be either static or dynamic latches. In the STRIP implementation of the preferred embodiment discussed further hereinbelow in connection with FIGS. 27–56, the pipeline storage elements are dynamic latches. In a MIPS-X compatible implementation, the pipeline storage elements are static latches.

Figure 12:
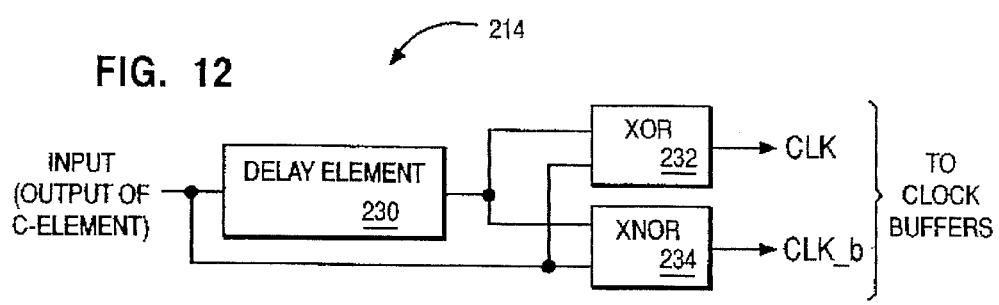
FIG. 12 is a block diagram of a pulse generator of the system of FIG. 10.

FIG. 12 is a block diagram of pulse generator 214. Pulse generator 214 includes a delay element 230 connected to XOR/XNOR gates 232 and 234 as shown in FIG. 12 to output a pulse in response to each C-element output transition. Pulse generator 214 outputs true and complement output pulses, so that true and complement clock signals CLK and CLK-b are generated.

The output pulse width becomes a $\phi 1$ period and is set by the propagation time of delay element 230. XOR/XNOR gates 232 and 234 are suitable for symmetric and identical propagation delays. This reduces the affects of XOR/XNOR gates 232 and 234 on the pulse width time set by delay element 230. Pulse generator 214 adds skew between the clock generation point (the output of C-element 212) and functional units 202a–d, but has little affect on the dynamic clock period set by tracking cells 210a–d.

Figure 13:
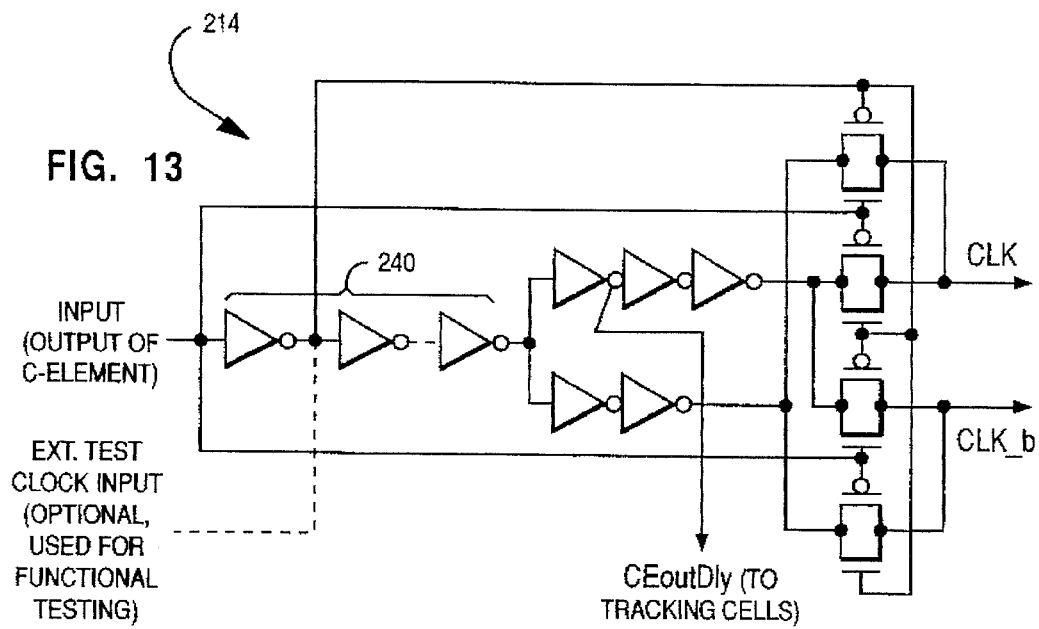
FIG. 13 is a schematic electrical circuit diagram of the pulse generator of FIG. 12.

FIG. 13 is a schematic electrical circuit diagram of pulse generator 214. Delay element 230 (FIG. 12) includes an inverter chain 240 having a delay satisfying the select feedback constraint. Inverter chain 240 includes fifteen inverters, resulting in a $\phi 1$ period equal to approximately half a minimum cycle time of 30 gate delays for a first-level cache latency. XOR/XNOR gates 232 and 234 provide symmetric operation, full CMOS output levels (sufficient drive to support a fanout of sixteen) and minimum C-element loading. The circuitry of FIG. 13 compromises between symmetry, drive and loading, according to the preferred embodiment.

Figure 14A:
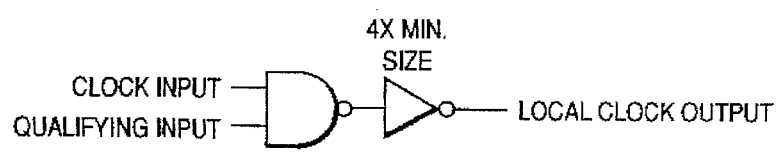
FIGS. 14a–b are schematic electrical circuit diagrams of local qualified clock buffers for single-phase and two-phase non-overlapping clock generation.
Figure 14B:
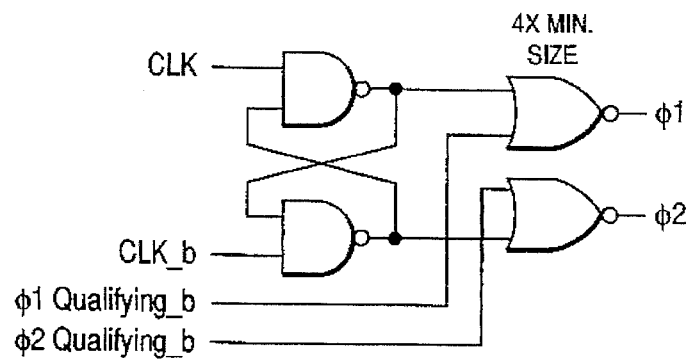

FIGS. 14a–b are schematic electrical circuit diagrams of local qualified clock buffers for single-phase and two-phase non-overlapping clock generation, respectively. Because of the dynamic clocking structure, the preferred embodiment uses a two-phase overlapping clock technique for pipelined functional units 202a–d. Series connected $\phi 1$ and $\phi 2$ latches are physically located sufficiently proximate to each other to allow use of a non-overlapping local qualified clock buffer. Even when the $\phi 1$ and $\phi 2$ latches are separated by a logic element, care is taken to ensure proper operation (due to clock skews in clock distribution network 208). The use of local qualified clock buffers helps to minimize clock skew between functional units 202a–d.

Preferably, the period of the clock signal output by dynamic clock generator 204 is controllable from an external source to allow sufficient control for manufacturing test. Also, during normal operation, the clock periods set by tracking cells 210a–d, and the $\phi 1$ period from pulse generator 214 (FIG. 13) are externally and separately adjustable. This feature is referred to as the KNOB. This external adjustability allows an incorrectly tracked operational delay to be compensated by varying the tracking cell or pulse generator delays. The KNOB provides sufficient adjustability to repair a non-functional sequencing structure. In connection with FIGS. 27–48, the discussion hereinbelow describes implementation options for the KNOB.

If dynamic latches are used in the pipeline structure, the clock signal is not stopped for more than the minimum dynamic storage time of the latches. The clock signal is suspended during dependent transfers to devices operating asynchronously of the processor pipeline (e.g. floating-point unit and external bus interface devices). Accordingly, a time-out timer is included for terminating the stopped-clock condition before latched data are lost. Static latches substantially eliminate this concern but can decrease the processor's performance.

Operations of functional units 202a–d are independent of the duty cycle of the clock signal output by clock generator 204. The clock signal's period tracks pipeline variations resulting from environmental, process, and operational changes. But the clock signal's duty cycle does not directly track variations in operations of functional units 202a–d. The select feedback delay is a primary constraint setting the clock high time ($\phi 1$). The clock low time ($\phi 2$) varies according to the selected tracking cells. Accordingly, functional units 202a–d do not rely on the lengths of the clock signal's phases.

Accordingly, many precharged logic operations are self-timed to remove the signal-precharge constraints from the clock signal's phase periods. Where practical, functional units 202a–d include static logic elements. Such an approach also streamlines implementation of tracking cells 210a–d.

Clock buffers 216 substantially minimize clock skew between the output of pulse generator 214 and the inputs of functional units 202a–d. Clock buffers 216 drive clock distribution network 208. In an exemplary embodiment, clock distribution network 208 includes four clock signals with 20 pf of load/clock distributed over 10 mm of signal line.

The use of local qualified clock buffers helps reduce the total load encountered by the global clock signals. To form clock buffers 216, a series of three inverters is used as shown in FIG. 10, each four times the preceeding inverter's size. In the preferred embodiment, the sizes are 6 x, 24 x, and 96 x the minimum inverter size of the processor design. The factor-of-four increase per logic stage is a preferred general rule for static CMOS buffers.

By following these guidelines, a dynamically-clocked processor achieves significant advantages of self-timed operations, together with the implementation simplicity of a synchronous design.

Figure 15:
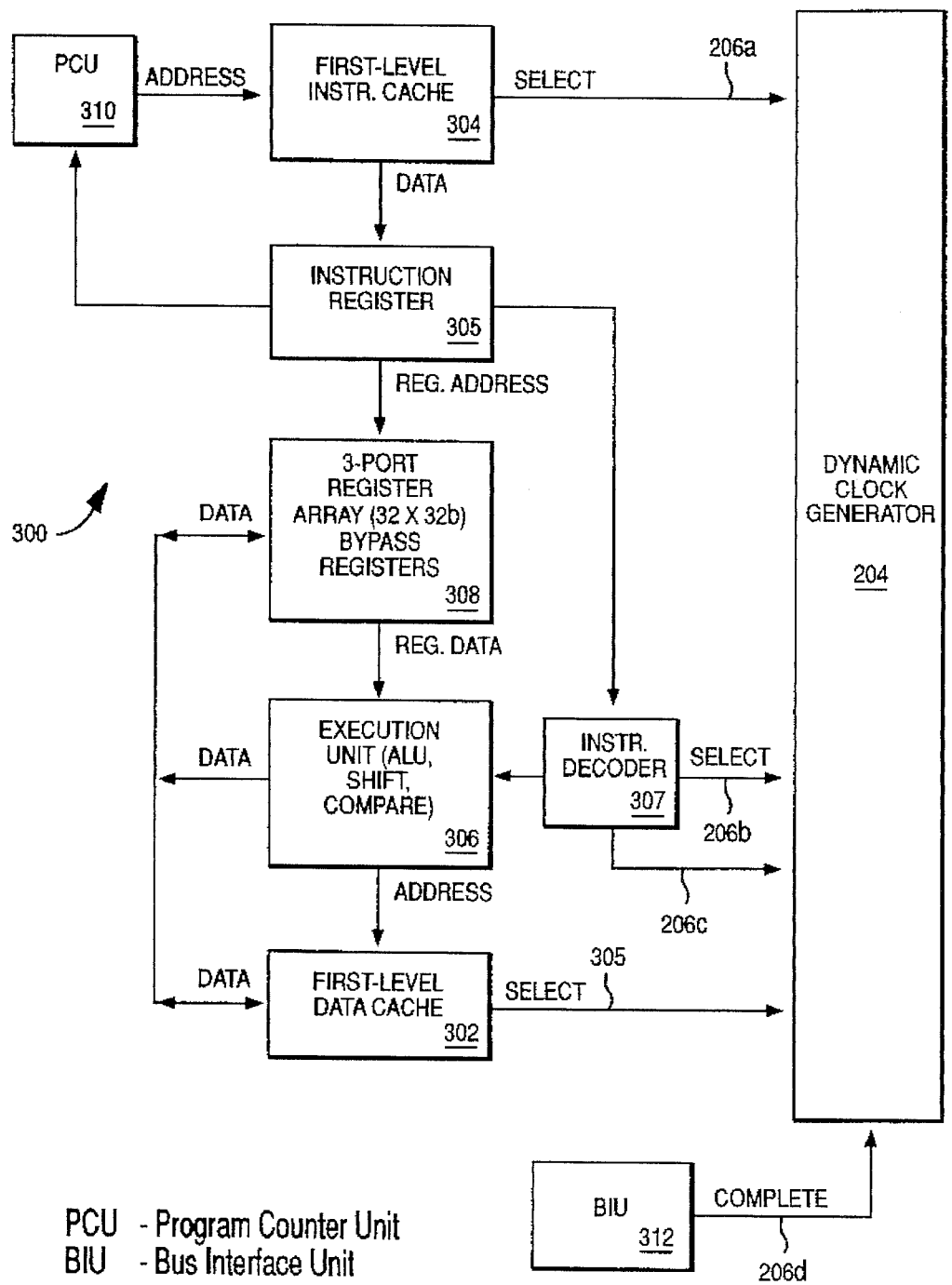
FIG. 15 is a block diagram of a MIPS-X processor adapted for dynamic clocking.

FIG. 15 is a block diagram of a MIPS-X processor 300 adapted for dynamic clocking. Adapted MIPS-X processor 300 illustrates the compatibility of dynamic clocking with a RISC processor. The functional unit designs are unmodified, except for the self-timing of some precharge operations. The inclusion of an internal first-level data cache 302, having the size and complexity of a first-level instruction cache 304, is compatible with integration levels of advanced fabrication techniques. IRSIM and SPICE simulations establish the functional unit latencies and control overhead. Information is readily available for understanding the instruction mix, projected cache hit rates, and functional unit performance and utilization. These elements are important for developing an efficient dynamically clocked processor.

FIG. 15 shows the adapted MIPS-X pipelined functional units and their primary interface signals. Dynamic clock generator 204 replaces a normal synchronous clock generator. Dynamic clock generator 204 differs from the normal synchronous clock generator in the following ways:

(1) Dynamic clock generator 204 does not use an external clock, crystal, or oscillator input;

(2) Dynamic clock generator 204 does not use phase-lock-loop (PLL) circuitry;

(3) Dynamic clock generator 204 uses feedback information from the pipeline to determine the period of the next clock cycle; and (4) Dynamic clock generator 204 automatically adapts the dynamic clock cycle time in response to variations in process, temperature, and supply voltage.

Concerning the selection of tracking cells 210a–d (FIG. 10) for the adapted MIPS-X architecture and implementation, the period of each pipeline cycle is dynamically adjusted in response to pending operations in the pipeline, and is not predetermined according to a single critical-logic path. Accordingly, each key functional operation is optimized independently. For each key functional operation, an associated tracking cell matches the operating structure of that functional operation. In response to information from selected ones of the associated tracking cells, dynamic clock generator 204 sets the cycle time for pending operations in the pipeline.

If a functional operation's optimized execution rate, or access time, is always less than other frequently used pipeline operations, then such a functional operation does not necessarily have an associated tracking cell. The performance and frequency-of-use of the functional operations determine which operations are tracked, thereby determining the operating rate of processor 300. The tracking cells of dynamic clock generator 204 are selected in response to analysis of the propagation delays of the functional units and analysis of instruction usage.

Referring to FIG. 1 and FIG. 15, processor 300 has a five stage pipeline: (1) instruction fetch [IF], (2) register fetch/instruction decode [RF], (3) execute [ALU], (4) memory access [MEM], and (5) register write-back [WB]. An instruction fetch operation involving instruction register 305 and first-level instruction cache 304 occurs on every pipeline cycle and occurs sufficiently early in the pipeline to support a selectable tracking cell. Accessing first-level instruction-cache 304 either is faster than other frequent functional operations or is tracked on every pipeline cycle.

In this example, the first-level cache access time (after self-timing the bit-line precharge and tag access) is less than several frequently used operations. Nevertheless, a first-level cache tracking cell is used to increase the sequencing efficiency of self-timed processor 300. The latency of the first-level cache sets the minimum cycle time of the self-timed, adapted MIPS-X pipeline. For example, tracking cell 210a (FIG. 10) substantially matches the latency of the first-level caches and is denoted as the minimum delay tracking cell. The minimum-delay tracking cell does not necessarily need an associated select input since it has the shortest delay of all the tracking cells.

The access time of such a cache configuration, including tag-compare, bit-line precharge, address drives/latches and data latches, is approximately 30 gate delays. A gate delay is substantially equal to an inverter delay with a fanout of four. In this example, both first-level caches are 2 Kbytes in size and 8-way set associative to substantially minimize their miss rates. Also, such an example includes a copy back first-level data cache 302 organization with write buffers, thereby allowing store operations to occur in substantially minimum cycle time.

If an instruction fetch misses in first-level instruction cache 304, select input 206a is driven to dynamic clock generator 204 to indicate that an external memory cycle is needed. Likewise, if a data request misses in first-level data cache 302, a select input 305 is driven to dynamic clock generator 204 to indicate that an external memory cycle is needed. In response thereto, the pipeline is stalled and the clock signal is stopped during the next cycle until the memory reference completes.

Notably, select inputs 206a–d are not necessarily respectively associated with tracking cells 210a–d. Instead, dynamic clock generator 204 relates select inputs 206a–d to tracking cells 210a–d according to the relation between select inputs 206a–d and operations tracked by tracking cells 210a–d. For example, one or more operations tracked by tracking cells 210a–d can be performed by one or more functional units.

Register reads, instruction decode, and bypass register selection occur during the next stage in the pipeline sequencing. Like instruction fetches, instruction decoding and operand fetches occur on every processor cycle. In this example, the register fetch, instruction decoding by instruction decoder 307, and bypass register select operation are faster than a first-level cache access. The time for latching and driving the source data to the other functional units is included in the operational delays of the tracked operations and is not considered as part of the register select/fetch delay. Accordingly, such operations execute within the cycle time set by the other pipeline functions.

In this example, the operation chosen to set the second most critical cycle time of dynamic clock generator 204 is the add operation (specifically, execution unit 306 executing an ALU addition driving through bypass registers 308). Some form of add operation occurs during almost every processor cycle. TABLE 2 lists the operations having an add operation, together with their expected frequencies-of-use.

TABLE 2

List of operations having an add operation

| Pipelined Functions Requiring an Add Operation | Frequency-of-use (%) |
|---|---|
| PC increment | 100 |
| Branch address calculation (conditional and unconditional) | 15 |
| Memory reference address calculation (load/store) | 30 |
| Arithmetic instructions | 20 |
| Total (excluding PC increment) | 65 |

Some of these add operations (e.g. program counter (PC) increment) are implemented with a faster execution time than the other add operations. But the other PC address calculations (e.g. branch address, jump address, and trap address) are multiplexed with the PC increment, thereby increasing their total latencies. A full 32-bit addition, excluding PC increment, is used approximately 65% of the time.

In this example, three factors support the choice of the add operation to set the second-fastest cycle time: the frequency-of-use, the add delay relative to the instruction fetch delay (approximately four gate delays longer), and the use of identical adder logic in both program counter unit (PCU) 310 and execution unit 306. The ALU add path is longer than, or equal to, the other add operations. Accordingly, tracking cell 210b (FIG. 10) substantially matches the critical delay path of an ALU add operation. The delay of such a tracking cell 210b is approximately 34 gate delays. For all add operations except PC increment, tracking cell 210b is selected. Select input 206b is driven by instruction decoder 307 during the RF pipe stage (all selected adds occur during the ALU pipe stage).

In this example, the next slowest critical-logic path is the compare-and-branch operation, which occurs during the pipeline's execute stage. This operation occurs for each conditional branch instruction. The compare-and-branch operation uses the ALU adder of execution unit 306 to execute the comparison (equal-to, greater-than, or less-than).

In response to the comparison, the appropriate PC address is selected for the next instruction fetch cycle. The total compare-and-branch delay is approximately six gate delays longer than the add operational delay. Approximately 15% of all executed instructions are branch instructions. Accordingly, tracking cell 210c (FIG. 10) substantially matches the critical delay path of a compare-and-branch operation. Select input 206c is driven by instruction decoder 307 in response to a branch instruction.

Finally, tracking cell 210d (FIG. 10) interfaces dynamic clock generator 204 to Bus Interface Unit (BIU) 312. Tracking cell 210d is activated for each external data transfer which stalls the pipeline, as in response to assertion of select input 206a or 305. For example, external cycles occur for I/O transfers, for other non-cachable data transfers (e.g. video memory), and for first-level cache misses.

During an external data transfer, dynamic clock generator φ4 stops the clock signal during φ2 and remains in 42 until a transfer COMPLETE signal is received from Bus Interface Unit 312 through select input 206d. It is estimated that the clock signal's startup time increases the second-level cache access time by less than 5%, assuming processor 300 and the external cache are implemented in the same technology. Some of this additional delay can be masked by driving the COMPLETE signal early relative to the data signals. Up to half of this delay might be safely masked by an early COMPLETE signal. Nevertheless, such masking might be unnecessary, because such external cycles form approximately 6% of all operations (resulting from instruction and data cache misses).

In connection with FIGS. 27–48, the discussion hereinbelow further describes tracking cells 210a–d of dynamic clock generator 204 for a STRiP implementation of the preferred embodiment.

Relative to a fully synchronous MIPS-X implementation, the adapted self-timed dynamically clocked implementation of FIG. 15 is improved. The comparative performance of the synchronous and self-timed MIPS-X implementations was evaluated using a variety of simulation and analytical data. IRSIM, a switch level simulator, and SPICE, a non-linear circuit simulator, were used to determine the processing latencies of each critical logic path. Analysis of instruction mix and cache performance for RISC based systems was used to determine the frequency-of-use of each functional unit.

The evaluation assumed that logical elements are identical in both synchronous and self-timed implementations, except for specific cases where the sequencing technique affects the design style (e.g. self-timed precharged buses versus phase precharge buses). The memory systems are identical in size and complexity. A primary goal of the evaluation was to determine the effectiveness of self-timing on an otherwise synchronous processor implementation.

Since the instruction set architecture for the synchronous and self-timed MIPS-X implementations is unchanged, the conflict penalties incurred by the two machines are considered to be the same. These penalties are caused by cache misses, load delays, mispredicted branches, and other resource conflicts. To simplify the calculations, the second-level cache is assumed to have a 100% hit ratio. This assumption has little affect on the final comparison because of the projected second-level cache size (512 KB–2 MB). Both implementations have identical cycles-per-instruction (CPI) measures, resulting from an equal number of conflict penalties per instruction.

A primary difference between the two implementations is the period required, and used, to sequence each operation through the pipeline. The fully synchronous implementation sequences the pipeline at a constant rate, determined by the worst-case environment, semiconductor process, and critical logic path. By comparison, self-timed implementation dynamically adjusts each cycle's period to match the prevailing environmental conditions, semiconductor process, and pipeline operations.

To calculate a relative performance difference, independent of technology, the evaluation used gate delays to represent the processing latencies of the critical-logic paths. The evaluation assumed that all logic functions are implemented in the same technology. The second-level cache access time is normalized to the same gate delay measure used for the processor. The evaluation assumed a nominal operating environment (25° C. and 5 V), a nominal process, and the ability to sort the synchronous processor after manufacturing to within 25% of the available process performance (LSI Logic assumes a 50% process variance from nominal to worst-case).

TABLE 3 lists the frequencies-of-use and processing latencies for the critical-logic paths of the MIPS-X processor.

TABLE 3

Frequencies-of-use and processing latencies for the MIPS-X processor critical logic paths.

| Critical Operation | Frequency-of-Use | Processing Latency (Gate Delays) |
|---|---|---|
| Instruction Fetch (first-level cache access) | 100% | 30 |
| Data Fetch (Load/Store, first-level cache access) | 30% | 30 |
| Add/Sub (arithmetic and Load/Store, Execute Unit operation) | 45% | 34 |
| Compare-and-Branch (branch instruction, PCU operation) | 15% | 40 |
| Combined internal cache miss ratios (instruction and data) | 6% | — |
| Second-level cache references (combined zero- and first-level cache miss ratios * % of references per instruction) | 130% * 6% = 7.8% | 100 |

The processing latency for the second-level cache access assumes an external cache controller with external SRAMs and parity checking. An average cycle time per instruction for both synchronous and self-timed implementations is determined with these numbers. The number of stall cycles resulting from branch and load penalties is assumed to be the same in both synchronous and self-timed implementations, affecting their performance similarly.

The average synchronous cycle time per instruction is determined as follows:

---
Average Sync. Cycle Time

= worst-case logic path latency
+ second-level cache [access frequency *
  access time]
= 40 + (0.078 * (3 * 40))
= 49.4 gate delays
---

The second-level cache access time was three processor cycles since synchronous system transfers have a discrete number of cycles. If the second-level cache access could be accomplished in two cycles, the average synchronous cycle time would be 46.2 gate delays, a 6.5% performance increase.

The average self-timed cycle time per instruction is determined as follows:

---
Average Self-Timed Cycle Time

= branch [access frequency * processing latency]
+ add [access frequency * processing latency]
+ first-level cache [access frequency * access time]
+ second-level cache [access frequency * access time]
= [(0.15)(40) + (0.45)(34) + (1 − 0.15 − 0.45)(30)](1− 0.078)
+ (0.078)(100)
= 37.1 gate delays
---

Accordingly, assuming both synchronous and self-timed MIPS-X system implementations are operated independent of worst-case process, temperature, and voltage, the self-timed system operates 25% faster than the synchronous system. This performance advantage can be combined with the performance advantage achieved by the self-timed design when operating at nominal temperature, voltage, and process. The degradation factors for temperature, voltage, and process (discussed hereinabove in connection with FIGS. 1–9) can be used to determine the total performance difference between synchronous and self-timed systems operating at nominal conditions:

$t_{sync} = K_T * K_V * K_P * K_S * t_{self-timed}$ where $t_{sync}$=the average synchronous pipeline clock period $t_{self-timed}$=the average self-timed pipeline clock period $K_T$=temperature degradation factor $K_V$=voltage degradation factor $K_P$=process degradation factor $K_S$=sequencing degradation factor Accordingly, the total performance advantage of self-timed pipeline sequencing under nominal operating conditions is:

$$\frac{t_{sync}}{t_{self-timed}} - 1 = (K_T \cdot K_V \cdot K_P \cdot K_S) - 1$$
$$= (1.22 \cdot 1.15 \cdot 1.25 \cdot 1.25) - 1$$
$$= 1.19 \text{ or } 119\%$$

Assuming perfect tracking of critical-logic paths and no overhead in the dynamic clock generation, a MIPS-X processor adapted for dynamic clocking theoretically operates more than twice as fast as a non-adapted synchronous processor at nominal operating conditions. In fact, this is true even if the dynamic clock generator overhead is as high as 10% (resulting from the C-element and tracking cell inaccuracy). Self-timing by dynamic clocking is a practical alternative to conventional synchronous operation, and dynamic clocking uses substantially all of the available semiconductor performance for a given implementation. Also, the elimination of an external interface clock supports efficient scalability as technologies evolve.

An important factor limiting a processor's performance is the memory system. To increase the processor's performance, the memory system preferably has low latency and a high bandwidth. Cost-per-bit is also a factor in determining the practical memory system size and performance.

In connection with FIGS. 16–26, the discussion hereinbelow describes an internal memory system and aggressive prefetching technique for achieving performance greater than previous memory system structures without significantly increasing cost or size. The adaptive prefetching technique is called predictive prefetching, and it uses a history of references to predict future references. Small low-latency caches (<256 bytes) using predictive prefetching are evaluated and compared with a conventional memory hierarchy.

For reducing the average memory system access time, access times are reduced to one or more levels in the memory hierarchy. The memory subsystem closest to the processor has the largest affect on the average access time and is usually constrained to work in a integer number of processor cycles. This first level in the memory hierarchy is usually a first-level cache.

Processors can include internal first-level caches whose sizes are functions of the available semiconductor area. The speed-size-miss ratio tradeoff for very small caches (less than 1K bytes) can result in inefficient operation because of high miss-rates and total miss-penalties. Accordingly, the first-level caches normally are as large as possible and use the fastest available RAMs. Internal first-level caches normally are at least 16K bytes in total size, and external first-level caches can be as large as 2M bytes.

Many processors are sequenced at a rate comparable to the access time of the first-level cache. This streamlines the cache access and reduces the complexity of information control within the pipeline. A disadvantage of large first-level caches is that their access times are greater than the optimum processing rates of the other pipelined functional units. Accordingly, one technique for decreasing a memory system's average access time involves pipelining the first-level caches.

Pipelining the first-level caches can double their average throughput and reduce their effective access time in half. Nevertheless, cache pipelining adds complexity to the cache structures and increases the pipeline depth of the processor. Increasing the pipeline depth can increase the processing penalty for a mispredicted branch instruction and data conflicts following a load operation. If branch and load delay slots are scheduled by a compiler, then increasing the pipeline depth can increase the number of delay slots to be filled with useful instructions. Preferably, when using multicycle or pipelined caches, potential operational penalties do not offset the gains in throughput.

Assuming identical size caches, identical branch prediction strategies, and identical pipeline sequencing rates, a five stage pipeline can provide more performance than a deeper pipeline. Notably, a higher CPI penalty of a deeper pipeline can be offset by a reduction in cycle time. Preferably, a memory system achieves the average access time of pipelined caches without increasing pipeline depth and CPI.

Some techniques reduce the effective memory system access time by adding queues, FIFOs, buffers, and special memory structures. By comparison, the preferred embodiment decreases a memory system's average access time without increasing the number of pipeline stages. Referring agin to FIG. 16, the memory hierarchy of the preferred embodiment includes very small (less than 256 bytes), fully-addressable prefetch buffers 90 and 92 between CPU 94 and first-level caches 96 and 98. Consistent with the location of prefetch buffers 90 and 92 in the memory hierarchy and their operational characteristics, these prefetch-buffers are called "zero-level caches" or "L0 caches".

To reduce resource conflicts, a zero-level cache 90 is located in the instruction reference path, and zero-level cache 92 is located in the data reference path. Zero-level caches 90 and 92 have small size to reduce their access time (less than half that of a first-level cache) and to retain manageability of the fully-associative configuration. Accordingly, a zero-level cache is approximately 4% the size and has less than half the latency of an 8K-byte, direct-mapped first-level cache.

As mentioned hereinabove, a shortcoming of small caches is their high miss ratios which more than offset advantages of their fast access times. In the preferred embodiment, aggressive fetch and prefetch strategies significantly reduce the miss ratios of small caches in the memory hierarchy. Many prefetch techniques are more effective at predicting future instruction references than future data references. By comparison, the preferred embodiment uses a hardware-driven prefetching technique and a memory system organization for using zero-level instruction and data caches in an efficient and practical manner.

For a prefetching technique, optimum values are set for several key parameters. These parameters include: condition determining the object to be prefetched, condition determining when the object is prefetched, size of the prefetched object, the prefetch depth into the memory system, the prefetch priority relative to a processor request, and the bandwidth for supporting the prefetch technique. The adaptive prefetching technique of the preferred embodiment efficiently prefetches both data and instructions. The technique is hardware-driven, achieving efficient operation independent of application software. Previous hardware-driven prefetch techniques are sequential-prefetch-always, fetch-on-fault, and tagged-sequential prefetching. The following three paragraphs discuss each of these techniques:

(1) For sequential-prefetch-always, a fetch to the next level in the memory hierarchy is initiated in response to the processor reference to the cache, regardless of whether a cache miss occurred. This prefetch technique uses a significant amount of memory system bandwidth and can fill the cache with worthless data. To accommodate the bandwidth requirements, the interface size can be set between the cache and the next level in the memory hierarchy to greater than a word.

(2) For fetch-on-fault, a fetch to the next level in the memory hierarchy is initiated in response to a cache miss and retrieves more than one cache block of data (fetch size > block size). The additional blocks or subblocks of fetched data are sequentially addressed from the cache miss block address. This technique can be classified as part of a fetch strategy instead of a prefetch strategy. Many implementations of this technique allow the processor to continue execution before the prefetching is completed (similar to nbwrf discussed hereinabove in connection with FIGS. 1–9).

(3) For tagged-sequential prefetching, a fetch to the next level in the memory hierarchy is initiated in response to a processor request to a cache block which has been fetched but not accessed by the processor. A prefetch also occurs in response to a cache miss, which is considered the first access to a cache block. Accordingly, tagged-sequential-prefetch essentially is a modification to the fetch-on-fault prefetching technique, allowing prefetches to occur in response to initial block accesses and in response to cache misses. The address of a prefetched cache block is the next sequential block address after an accessed block. Tagged-sequential prefetching is more efficient than fetch-on-fault and sequential-prefetch-always prefetching, but it has a more complex control structure. With this strategy, zero-level cache implementation would be dual-ported to allow simultaneous read and write of the cache's tag and data RAMs.

Tagged-sequential prefetching achieves a significant reduction in instruction-cache miss rates while allowing for a manageable and efficient implementation structure. Nevertheless, even tagged-sequential prefetching fails to significantly reduce the miss rates for small data caches. Previous fetch and prefetch strategies rely on a memory system structure having large caches closest to the CPU. The resulting access times are not optimum for the target processing rate.

Relative to previous techniques, an adaptive prefetching structure of the preferred embodiment, called predictive prefetching, significantly increases accuracy of the prefetch. Predictive prefetching is responsive to a processor's access patterns for data and instruction references relative to workload and processor type. Predictive prefetching achieves improved prefetch accuracy, reduces the amount of unused prefetched data, increases the cache's hit rate, and reduces the required memory system bandwidth.

Figure 17:
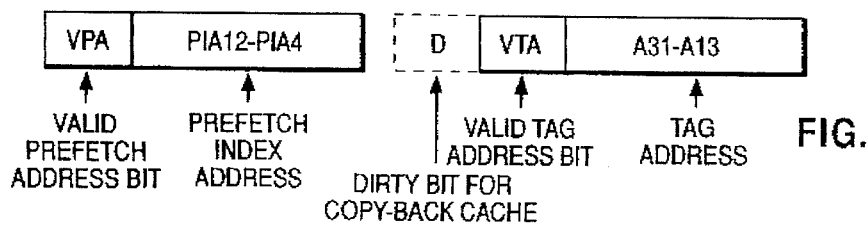
FIG. 17 is an illustration of a first-level cache tag structure for supporting predictive prefetching.

FIG. 17 is an illustration of a first-level cache tag structure for supporting predictive prefetching according to the preferred embodiment. FIG. 17 shows the first-level cache tag structure for an 8K-byte direct mapped first-level cache with 4-word blocks, such as first-level data cache 98 of FIG. 16. Each block stored in the first-level cache has a respective associated first-level cache tag according to the structure shown in FIG. 17.

Figure 18:
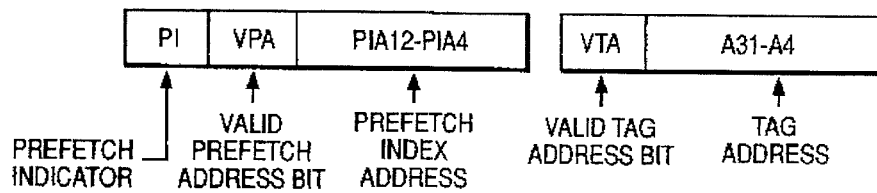
FIG. 18 is an illustration of a zero-level cache tag structure for supporting predictive prefetching.

FIG. 18 is an illustration of a zero-level cache tag structure for supporting predictive prefetching according to the preferred embodiment. FIG. 18 shows the zero-level cache tag structure for a fully-associative zero-level cache with 4-word blocks, such as zero-level data cache 92 of FIG. 16. Each block stored in the zero-level cache has a respective associated zero-level cache tag according to the structure shown in FIG. 18.

Predictive prefetching maintains a history of processor reference patterns to predict future references. Referring to FIG. 17, the reference history is stored in a first-level cache tag as a 9-bit cache-block prefetch index address (PIA) PIA12–PIA4 and is updated after each reference to a first-level cache block. Setting of the valid prefetch address (VPA) bit indicates the PIA entry is valid.

Accordingly, the tag of a referenced first-level cache block includes a PIA, which is written with the address of the next referenced first-level cache block. The PIA operates as a predictive prefetch address when the first-level cache block is later reaccessed. Predicted references are prefetched from the first-level cache (having high bandwidth) to the zero-level cache (having low latency). With zero-level caches and predictive prefetching, the memory system of the preferred embodiment has an average access time less than half that of a conventional memory hierarchy.

Advantageously, the predictive prefetch technique of the preferred embodiment supports the prefetching of both data and instruction references. The processor reference patterns are recorded so that, for each referenced address, the temporally next referenced address is stored as the PIA. The stored reference patterns are addressed so that prefetching information is provided and used before the processor references subsequent addresses. In a significant aspect of the preferred embodiment, the predictive prefetching technique records the instruction and data reference patterns separately. Accordingly, past instruction reference patterns are used to predict future instruction references, and past data reference patterns are used to predict future data references.

With the predictive prefetching technique of the preferred embodiment, the first-level cache tags store the reference history of the system. In response to a present reference to a first-level cache address, the history (PIA) of the first-level cache address predicts the next referenced address to be that which followed a previous reference to the first-level cache address. The amount of active reference history is a function of the number of first-level cache blocks and their lifetime in the cache. This factor is important for the effectiveness of the predictive prefetching technique. An 8K-byte on-chip first-level cache has sufficient tag entries to support a reference history for accurate data and instruction prefetching.

In a significant aspect of the preferred embodiment, predictive prefetching uses the stored reference history for prefetching all instruction and data references. Accordingly, the prefetch mechanism is decoupled from the instruction decoder: nevertheless, the stored instruction reference history can also support branch prediction.

Significantly, predictive prefetching occurs for both instruction and data references. Each cache block stores the address (PIA) of the temporally next addressed cache block. In response to the PIA address, the prefetch unit prefetches the temporally next addressed cache block to the zero-level cache from the PIA address of the first-level cache. Moreover, for each fetch and prefetch from the first-level cache to the zero-level cache, the VPA bit and PIA address are copied from the block's associated first-level cache tag to the zero-level cache tag as shown in FIG. 18.

Each prefetched zero-level cache block is tagged by a prefetch indicator (PI) so that a next prefetch does not occur until the prefetched zero-level cache block is referenced by the processor. This technique for prefetching is called tagged-predictive prefetching. If a valid PIA prefetch address is not stored for a given cache block, the next sequential address is used as the prefetch address. Since a sequential address is a full 32-bit address, rather than a cache-block address, it can be used to prefetch past the first-level cache. This increases the memory system efficiency during cold-starts.

A primary goal of predictive prefetching is to effectively prefetch processor references from the first-level caches to the zero-level caches. With a suitable fetch size, block size, interface size, and cache size, predictive prefetching allows a zero-level cache to achieve a hit ratio comparable to that of a first-level cache but with half the access time. Also, the use of full addresses on sequentially-predicted prefetch addresses enhances the entire memory system effectiveness.

The predictive prefetching technique of the preferred embodiment uses the first-level cache tag structure of FIG. 17 to store the reference history of the processor. This information is then used to prefetch both data and instruction addresses into the zero-level caches. The reference history is stored as first-level cache PIA index addresses, substantially minimizing the number of address bits per cache block. An 8K-byte first-level cache with four-words-per-block has a PIA index address of nine bits. Accordingly, each first-level cache block includes a tag entry for the PIA, which specifies the cache reference following the reference of that first-level cache block.

The reference history of the processor is updated in response to each access to the first-level cache. Significantly, each first-level cache access is monitored to determine whether it resulted from a prefetch request or from a zero-level cache miss. This allows the exact reference pattern of the processor to be saved.

Because the prefetch addresses are stored and accessed during the same cycle, the memory cells for storing the reference history are dual-ported. Accordingly, the size and control of the reference history storage is different from that of other first-level cache tag storage. If a valid PIA prefetch address is not yet stored for a given cache block, the next sequential address is used as the prefetch address.

As a first-level cache block is fetched or prefetched to the zero-level cache, the VPA valid bit and the prefetch PIA address stored with that first-level cache block are also transferred to the zero-level cache as shown in FIG. 18. The zero-level cache further includes a PI tag storage for the prefetch information. As with the first-level cache prefetch storage, the zero-level cache is dual-ported to support simultaneous fetch and update cycles. This dual-porting slightly increases the complexity of the zero-level cache.

Because the zero-level cache is approximately twice as fast as the first-level cache, the processor is able to cycle at approximately twice the access rate of the first-level cache. Since a prefetch request occurs in parallel with normal processor cycling, each prefetch operation takes two cycles. If a miss occurs in the zero-level cache during the first cycle of a prefetch operation, that prefetch operation is terminated unless the miss address matches the prefetch address. Otherwise, the prefetch completes without interruption. This operating mode substantially minimizes the stall time for supporting a zero-level cache miss. It also reduces the number of unreferenced prefetched addresses.

Key aspects of predictive prefetching and its supporting memory system are discussed immediately hereinbelow.

1. A first-level cache reference results from a zero-level cache miss or from a zero-level cache prefetch request.

2. Each zero-level cache miss is immediately followed by a zero-level cache prefetch request.

3. The address of each first-level cache reference is stored as a PIA entry in the tag of one of the two immediately preceding first-level cache references, based on whether the first-level cache reference and its first immediately preceding first-level cache reference resulted from a zero-level cache prefetch request or from a zero-level cache miss. Normally, the address of each first-level cache reference is stored as a PIA entry in the tag of its first immediately preceding first-level cache reference, except when a zero-level cache prefetch request is followed by a zero-level cache miss. In such a situation, the address of the first-level cache reference (resulting from the zero-level cache miss) overwrites the address of its first immediately preceding first-level cache reference (resulting from the zero-level cache prefetch request) as a PIA entry in the tag of its second immediately preceding first-level cache reference. This achieves an accurate history of the actual processor reference pattern, substantially avoiding reference history storage of unused prefetched references.

The following discussion further describes the storage procedure for each combination of references:

a. If a first-level cache reference results from a zero-level cache miss, and its first immediately preceding first-level cache reference resulted from a zero-level cache miss, then the address of the first-level cache reference is stored as a PIA entry in the tag of its first immediately preceding first-level cache reference.

b. If the first-level cache reference results from a zero-level cache miss, and its first immediately preceding first-level cache reference resulted from a zero-level cache prefetch request, then the address of the first-level cache reference is stored as a PIA entry in the tag of its second immediately preceding first-level cache reference.

c. If the first-level cache reference results from a zero-level cache prefetch request, then its address is stored as a PIA entry in the tag of its first immediately preceding first-level cache reference, irrespective of the cause of its first immediately preceding first-level cache reference.

TABLE 4 sets forth the PIA prefetch index address storage patterns according to the order of reference types.

TABLE 4

PIA storage according to reference types and their ordering.

| Present L1 Cache Ref. (n) | Previous L1 Cache Ref. (n-1) | Storage Location of Present Index Address |
|---|---|---|
| L0 cache miss | L0 cache miss | PIA of reference (n-1) |
| L0 cache miss | L0 cache prefetch request | PIA of reference (n-2) |
| L0 cache prefetch request | L0 cache miss | PIA of reference (n-1) |
| L0 cache prefetch request | L0 cache prefetch request | PIA of reference (n-1) |

Accordingly, each first-level cache tag address is temporarily latched (according to the type of reference) for use during the next two first-level cache references. The type of reference (prefetch or miss) is communicated to the first-level cache controller. The logical implementation of this protocol is supported by dual-porting of the PIA RAM cells. The VPA bit is set valid in response to each PIA update.

4. A prefetch address tag is invalidated (VPA is set invalid) in response to a first-level cache miss. A first-level cache miss occurs only during full 32-bit address references (zero-level cache misses and sequential-address prefetching). A first-level cache block's PIA is not updated, and VPA remains invalid, until the first-level cache block is next referenced. This allows full-address sequential prefetching without storing full addresses in the prefetch tags. Full address sequential prefetching supports prefetching past the first-level cache during cold-start conditions.

5. A prefetch request is terminated if a zero-level cache miss occurs before the prefetch request has completed. If the zero-level cache miss address equals the overlapping prefetch request address, the prefetch request is allowed to complete, and the data are forwarded to the target register (instruction or data). This operation is supported by a prefetch address comparator.

6. The zero-level cache directory includes a VPA bit and a PIA for each zero-level cache block, as shown in FIG. 18. This information is transferred from the first-level cache tag to the zero-level cache tag when data are transferred from the first-level cache to the zero-level cache. These entries, together with a prefetch indicator (PI) bit in the zero-level cache tag, support tagged prefetching. If the information transfer from the first-level cache to the zero-level cache results from a cache miss, then the PI bit is set to indicate the zero-level cache block has been referenced. If the information transfer results from a cache prefetch request, then the PI bit is cleared to indicate the zero-level cache block has not been referenced.

7. If a previously unreferenced (indicated by the PI bit) zero-level cache block is accessed, and its PIA is valid (indicated by the VPA bit), the PIA is used as a prefetch address for the first-level cache. For an invalid PIA, the program counter (PC) is incremented by one cache block and used as the prefetch address. A previously referenced (indicated by the PI bit) zero-level cache block does not initiate a prefetch request in response to subsequent processor references to that zero-level cache block.

8. All cache entries are invalid during power-on reset or a cache flush operation.

In the preferred embodiment, the tagged-predictive prefetching technique is fully hardware controlled. Assuming an 8K-byte first-level cache and 4-words per block, the increase in first-level cache storage for storing the reference history is approximately 7%.

0.8 um CMOS process and 0.8 um BiCMOS process can achieve sequencing rates of 100–200 MHz, thereby indicating an average memory system access time of less than 10 nsec. By comparison, similar caches implemented in CMOS technologies have access times of 20 nsec.

As shown in FIG. 16, in the preferred embodiment, CPU 94, floating point unit FPU, memory management unit MMU, first-level instruction cache 96, and first-level data cache 98 are integrated on a single integrated circuit. Split first-level instruction cache 96 and data cache 98 are direct-mapped for fast effective access time. The data cache is a copy-back, write-allocate implementation, and the instruction cache does not allow writes to instruction storage.

The size of each first-level cache is 8K-bytes. A primary goal of the preferred embodiment is to substantially avoid increasing the CPI rating while supporting a target sequencing rate. The internal cache block and fetch sizes are equal.

Several aspects affect block and fetch size. For example, there is a very small miss-rate difference between caches with block sizes of four to sixteen words. Other such aspects include the external data interface size, the data transfer size between zero-level caches and the first-level caches, and the maximum size and the maximum number of entries allowed in the zero-level caches.

Large block sizes can reduce cold start or compulsory misses, increase collision or conflict misses, and increase the cache miss penalty. Capacity misses are substantially unaffected by block size. In consideration of all these factors, the preferred embodiment has a block size between two and four words.

The second-level cache is a unified, direct-mapped cache. Its size can range from 256K-bytes to 1024K-bytes with a block size of 16 to 64 words. Due to the size of the second-level cache relative to the number of unique addresses accessed by targeted applications, relatively little performance loss results from second-level cache misses.

The second-level cache has a copy-back, write-allocate write replacement protocol and is addressed by the processor via real addresses. This supports cache coherency through a snoopy interface.

The zero-level cache size can vary from one block to 16 blocks, and preferably does not exceed 256 bytes. The zero-level and first-level cache block, fetch, and interface sizes are equal. A bypass path allows data to be transferred from the first-level caches to both CPU 94 and zero-level caches during miss cycles. The external interface is two words (64-bits). The block size is between two and four words (an eight word block size can be used with the maximum zero-level cache size).

In an evaluation, independent of the block size, tagged-sequential prefetching and tagged-predictive prefetching achieved a near minimum miss rate with a zero-level instruction cache size of three blocks. The miss ratios for predictive prefetching were three to four times smaller than the miss ratios for sequential prefetching. The miss ratio for tagged-predictive prefetching with a zero-level instruction cache size of three blocks was 2.5%. In all cases, the miss ratio for no prefetching was inadequate, never falling below 25%.

An eight-word cache block showed no improvement over a four-word cache block. A four-word cache block always provided a better miss ratio than a two-word cache block and increased the first-level cache transfer bandwidth. The higher bandwidth provided by the four-word block and interface size allowed the prefetcher activity to outpace the processor request.

With tagged-predictive prefetching and a zero-level instruction cache size of three blocks, the average access time is half that of a conventional memory hierarchy without a zero-level cache. There is approximately a 10% difference in average access times when comparing the two prefetching strategies. After a certain point, significant reductions in the miss ratio achieve only marginal reductions in average access times.

A predictive prefetching strategy for instruction references costs more in semiconductor area than a sequential prefetching strategy because of the required reference-history storage. Nevertheless, since the instruction reference history is stored in the prefetch address tag RAM, this information can also be used as a branch-target-buffer for branch prediction. A comparator determines whether the predicted address matches the actual requested branch address. The use of the instruction reference history for instruction prefetching and branch prediction reduces the total hardware cost when branch prediction is used.

Concerning a zero-level instruction cache and tagged-predictive prefetching, a factor-for-unused prefetches (FUP) parameter indicates the percentage of prefetched cache blocks never accessed by CPU 94. A higher FUP indicates a less efficient prefetch technique. FUP provides an indication of first-level cache bandwidth wasted by a prefetch technique.

In an evaluation for zero-level instruction cache 90, less than 8% of blocks prefetched according to predictive prefetching were never accessed by CPU 94 (with a zero-level cache size greater than three blocks). By comparison, sequential prefetching failed to achieve an FUP below 22%.

Accordingly, tagged-predictive prefetching is an efficient hardware driven prefetch technique for reducing the miss rate of zero-level instruction caches. Approximately 70% of available first-level cache bandwidth is used to support a zero-level cache with tagged-predictive prefetching. The resulting average-access time for instruction references was 1.1 times the zero-level cache access time and half the access time of a conventional (non-pipelined) memory system.

For a 16-block zero-level data cache using four-word blocks and tagged-predictive prefetching, the miss ratio was 12.75%. This was half the miss ratio achieved by tagged-sequential prefetching. Concerning the miss ratio, the block size had a more significant affect for data references than for instruction references. For zero-level data cache 92, the miss ratios for a two-word block were up to 60% greater than for a four-word block. For a zero-level cache size of 256 bytes and tagged-predictive prefetching, the miss ratio for an eight-word block was 13.1%, slightly higher than for a four-word block.

In reducing the average access times of data fetches, a zero-level data cache with tagged-predictive prefetching has approximately half the average access time of a conventional memory system. The data prefetch efficiency with predictive prefetching for data read and write cycles is improved relative to previous prefetching techniques, although the instruction stream improvement is greater. The memory performance for data references using zero-level data cache 92 and tagged-predictive prefetching is twice that of a memory system without such enhancements.

For a total memory system CPI, where both zero-level instruction cache 90 and zero-level data cache 92 are the same size and use the same fetch technique, the performance of the memory system using tagged-predictive prefetching is up to twice that of a conventional memory system. Actual implementations of zero-level caching can use different sizes for the instruction and data caches. A four-block zero-level instruction cache and a 16-block zero-level data cache, both having a block size of four words, is an efficient implementation with minimum hardware cost.

Relative to a non-pipelined memory system, both zero-level caching and pipelined caching achieve approximately twice the memory system CPI performance (0.6 versus 1.2). Nevertheless, pipelined caches increase the number of pipe stages, undesirably increasing the number of load and branch delay slots. Accordingly, a five-stage RISC processor using zero-level caching and predictive prefetching outperforms an eight-stage RISC processor using pipelined first-level caches by approximately 20% (assuming equal cycle times and a memory system CPI of 1.2 for both configurations).

In the preferred embodiment, the memory system's structure and operation support prefetching. Hardware structures are used in the internal memory system of the preferred embodiment to support tagged-predictive prefetching. The signal naming convention used in connection with FIGS. 19–26 is discussed further hereinbelow in Appendix B.

As previously described, zero-level caches 90 and 92 (FIG. 16) are small fully-associative caches located between CPU 94 and first-level caches 96 and 98. The implementation of caches 90 and 92 supports the fetch and prefetch operations of the instruction stream of processor 100. Advantageously, zero-level caches 90 and 92 simultaneously support a processor read reference and a prefetch update operation. Since instruction fetches occur at all times, dual-porting is used to support the bandwidth for these parallel operations. Both data and tag RAMs of each zero-level cache are dual-ported. Accordingly, zero-level caches 90 and 92 operate as fully-addressable prefetch buffers and support tagged-predictive prefetching.

Zero-level caches 90 and 92 are fully-associative, substantially minimizing the number of cache entries for a given miss rate. With a maximum size of 16 cache blocks, the complexity and access times of caches 90 and 92 are substantially minimized. The replacement technique also varies with cache size to reduce complexity. An LRU technique is used for cache sizes less than or equal to four blocks, and a random replacement technique is used for larger caches.

The interfaces between the zero-level and first-level caches support a high bandwidth for the prefetch technique and the improved execution rate of CPU 94. Accordingly, the zero-level and first-level cache block, fetch, and data interface sizes are equal, substantially optimizing their block transfer rates. Finally, to streamline cache coherency and substantially optimize write performance, zero-level data cache 92 uses a write-through policy with write-buffers.

Figure 19:
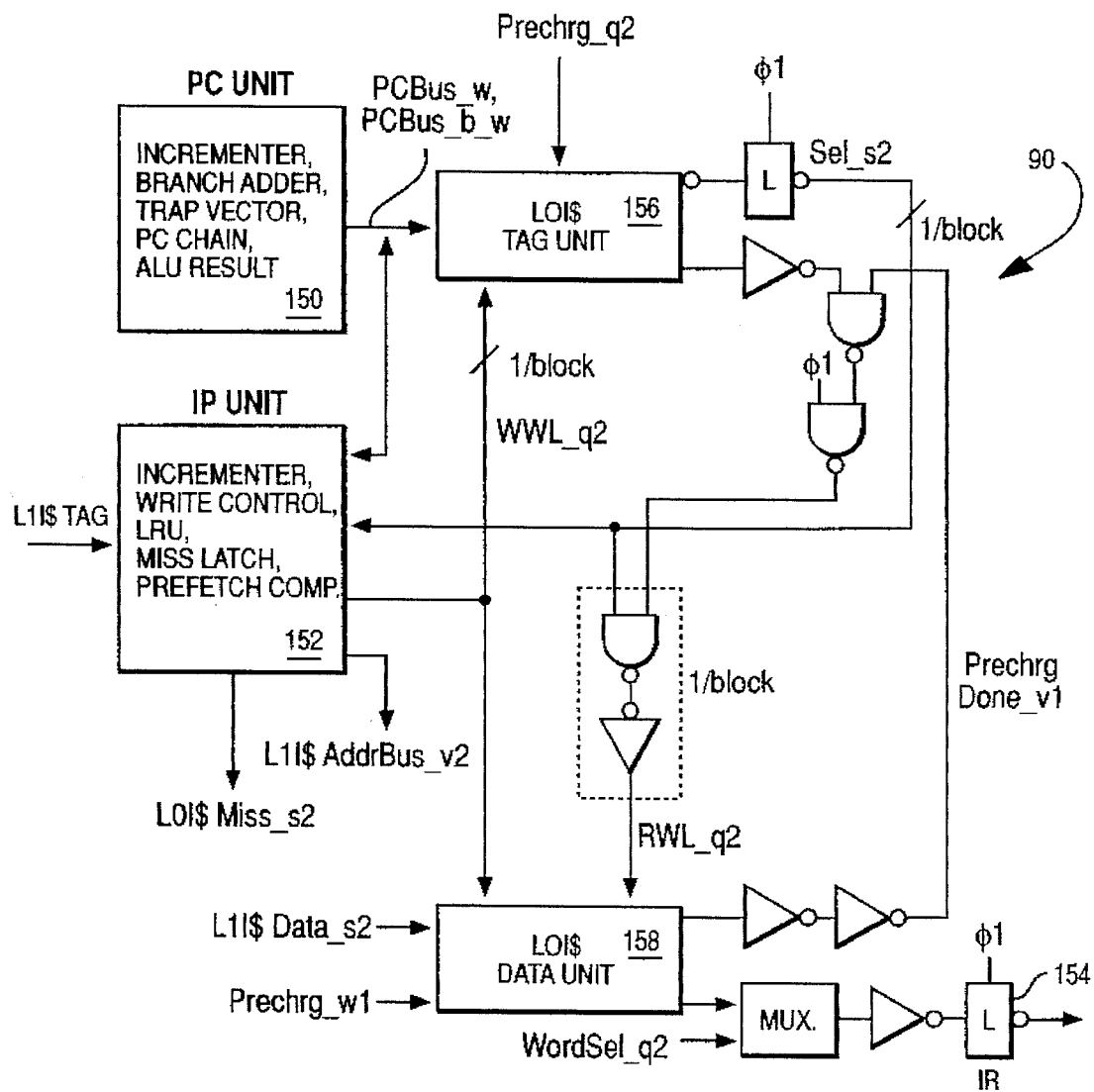
FIG. 19 is a block diagram of a zero-level instruction cache.

FIG. 19 is a block diagram of zero-level instruction cache 90. Data cache 92 has a similar configuration with the Program Counter ("PC") Unit 150, Instruction Prefetch ("IP") Unit 152, and Instruction Register ("IR") 154 replaced by a Memory Address Register, a Data Prefetch Unit, and a Memory Data Register, respectively. Zero-level instruction cache 90 is formed by two units, a Tag Unit 156 and a Data Unit 158. Likewise, zero-level data cache 92 includes a tag unit and a data unit. Tag Unit 156 outputs cache hit/miss indication signals, tag prefetch control signals, and select signals to Data Unit 158.

Figure 20:
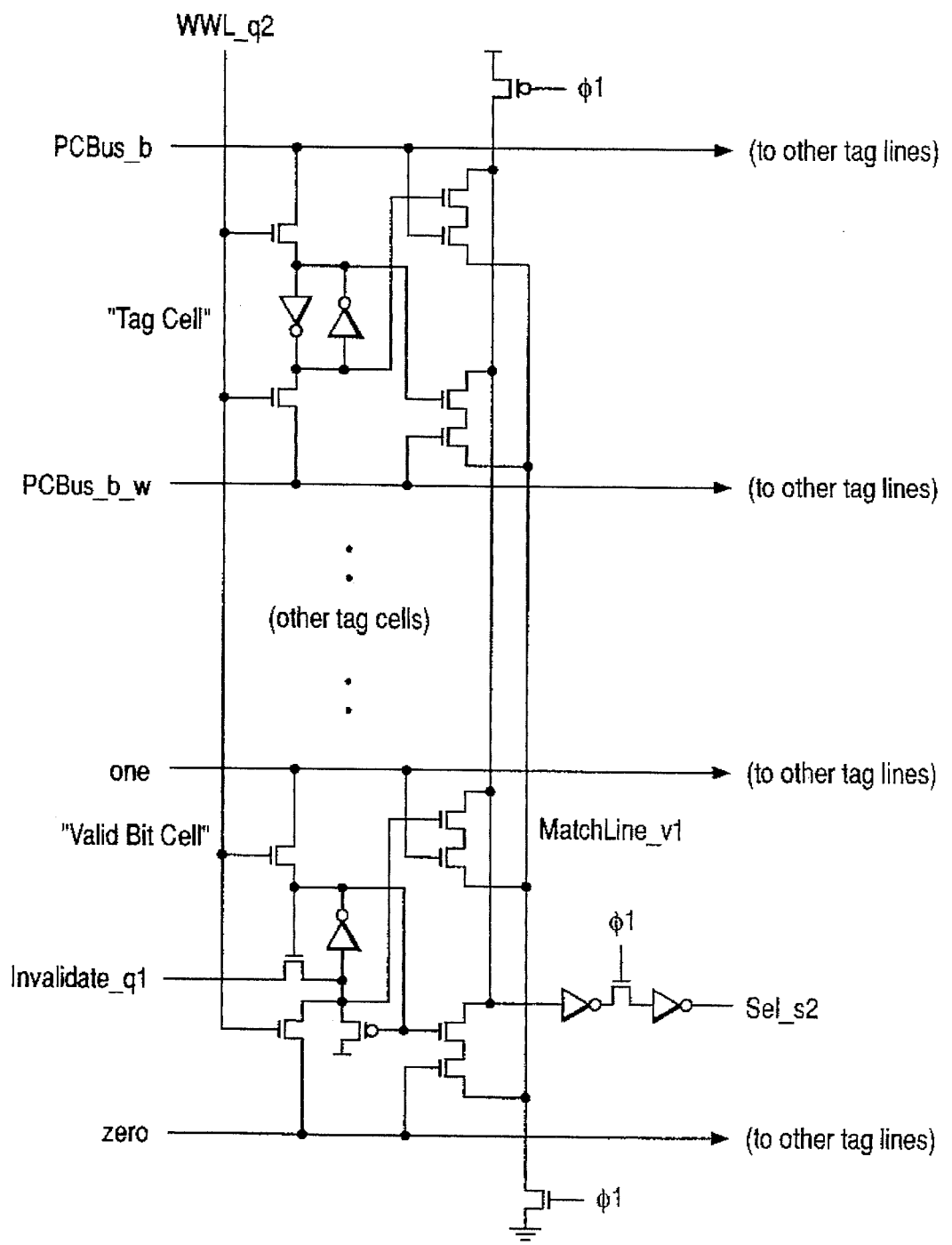
FIG. 20 is a schematic electrical circuit diagram of a zero-level cache tag and valid-bit CAM cell.
Figure 21:
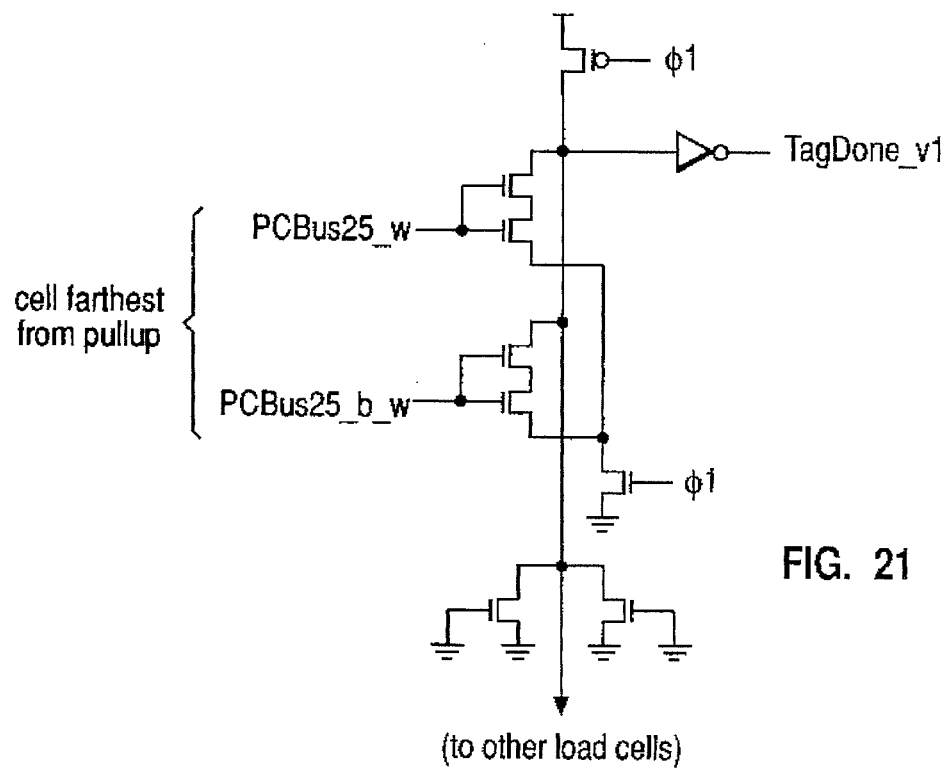
FIG. 21 is a schematic electrical circuit diagram of a zero-level cache tag tracking cell.

FIG. 20 is a schematic electrical circuit diagram of a zero-level cache tag and valid-bit CAM cell of the preferred embodiment. FIG. 21 is a schematic electrical circuit diagram of a zero-level cache tag tracking cell of the preferred embodiment. A content-addressable memory (CAM) is used for tag storage, and a tag-access tracking cell is used for self-timed control.

Data Unit 158 provides cache data storage, tagged prefetched address storage, and select control signals. To support simultaneous read/write operations, storage cells of Data Unit 158 are dual-ported RAMs. If a prefetch request matches a CPU reference request, the data are also bypassed to the target CPU register.

Figure 22:
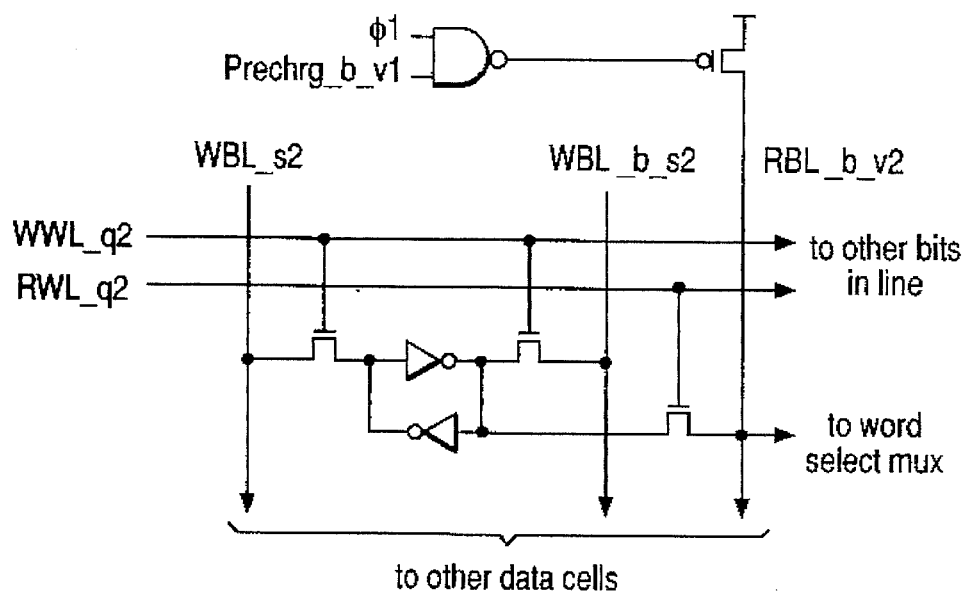
FIG. 22 is a schematic electrical circuit diagram of a zero-level cache data RAM cell.
Figure 23:
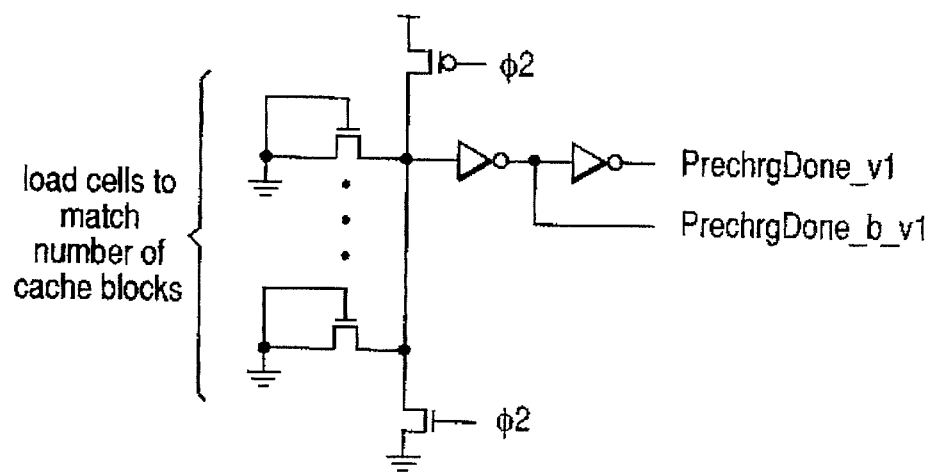
FIG. 23 is a schematic electrical circuit diagram of a zero-level cache bit-line precharge tracking cell.

FIG. 22 is a schematic electrical circuit diagram of a zero-level cache data RAM cell of the preferred embodiment. FIG. 23 is a schematic electrical circuit diagram of a zero-level cache bit-line precharge tracking cell of the preferred embodiment. The bitline-precharge tracking cell provides self-timed signalling for read-bitline precharging. This substantially optimizes cache read performance and substantially isolates the cache's operation from the clock duty cycle.

To achieve instruction and data bandwidth for a RISC processor operating at greater than 100 MHz, processor 100 (FIG. 16) inclues internal first-level instruction and data caches 96 and 98. Their on-chip location decreases their access times (no chip boundaries) and supports a wide data path (interface size equals block size). Both factors are important for supporting the prefetching technique of the preferred embodiment for effective operation of zero-level caches 90 and 92. To reduce the first-level cache miss rate, first-level caches 96 and 98 are preferably as large as the CMOS technology allows (assumed to be 8K-bytes for instruction and 8K-bytes for data). First-level caches 96 and 98 are direct-mapped.

Figure 24:
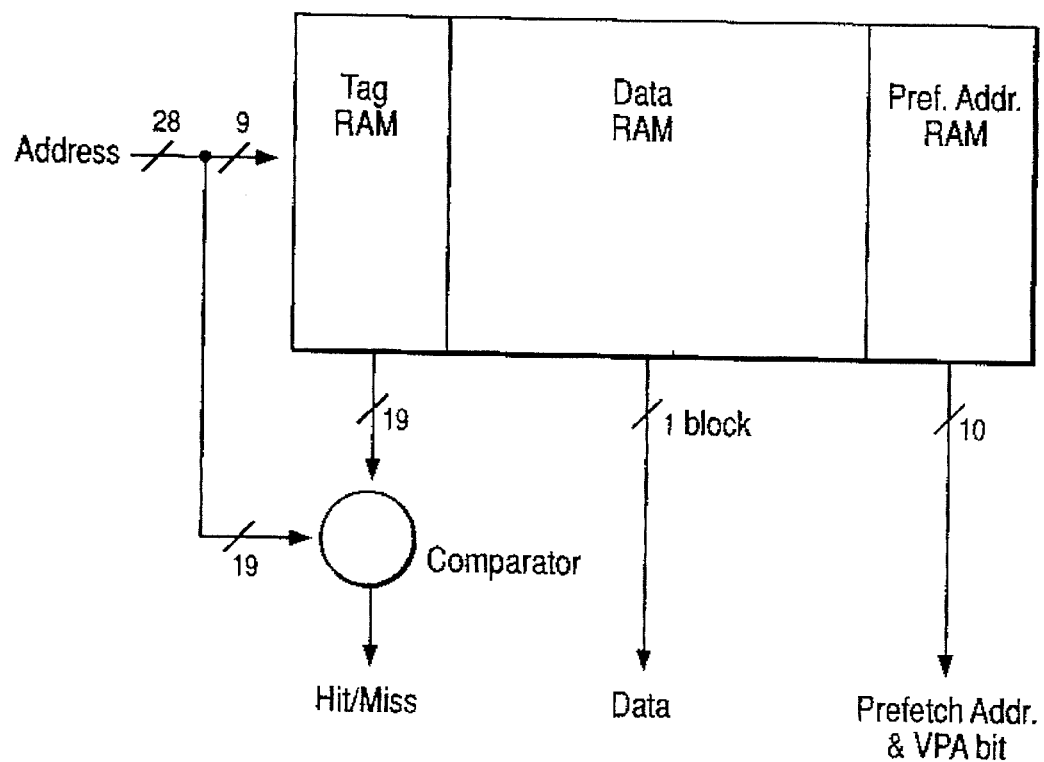
FIG. 24 is a block diagram of a first-level cache array.

FIG. 24 is a block diagram of a first-level cache array of the preferred embodiment. The first-level cache address is driven from the prefetch unit of processor 100. The Tag RAM and Data RAM include single-port, six-transistor fully static RAM cells.

During a read operation, the bitlines are precharged at the beginning of the cycle by a self-timed precharge-control circuit similar to that of zero-level caches 90 and 92. Reads to the first-level cache can result from: a zero-level cache miss, a prefetch request from the prefetch unit of processor 100, or a snoop operation to a dirty cache block (data cache 98 only). First-level cache write requests occur during a first-level cache miss operation or a write request from CPU 94. First-level instruction cache 96 needs no write policy, since writes do not occur to cachable instruction memory during normal operation. First-level data cache 98 has a Copyback-Write-Allocated (CBWA) write policy to increase efficiency for data operations.

Figure 25:
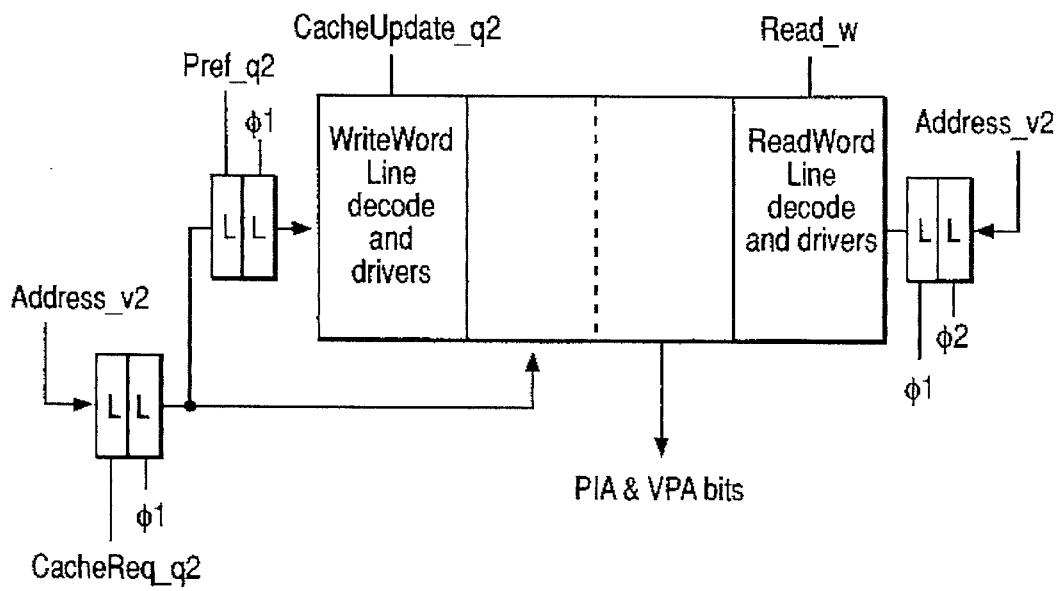
FIG. 25 is a block diagram of a first-level cache prefetch address RAM array.

FIG. 25 is a block diagram of a first-level cache prefetch address RAM array of the preferred embodiment. The RAM array of FIG. 25 stores the reference history of processor 100, providing a mechanism for predicting future references. The RAM array of FIG. 25 is dual-ported to support updating of a prefetch address while another is being read. Such dual-porting is advantageous because the block being referenced is not the block requiring a PIA update, and because prefetching uses 70% of the first-level cache bandwidth (instruction stream). The remaining 30% would not provide adequate bandwidth for the updates.

Single-rail sensing (ratioed inverter) is used on each of the differential bitlines (similar to the structure used in the register file array), thereby streamlining the sense amp and providing true and complement signals to the zero-level cache. Since an additional comparator is included in the path of the other cache tag bits, the speed of single-rail sensing is sufficient. The read bitlines are precharged by the same control signal used in the data array.

Figure 26:
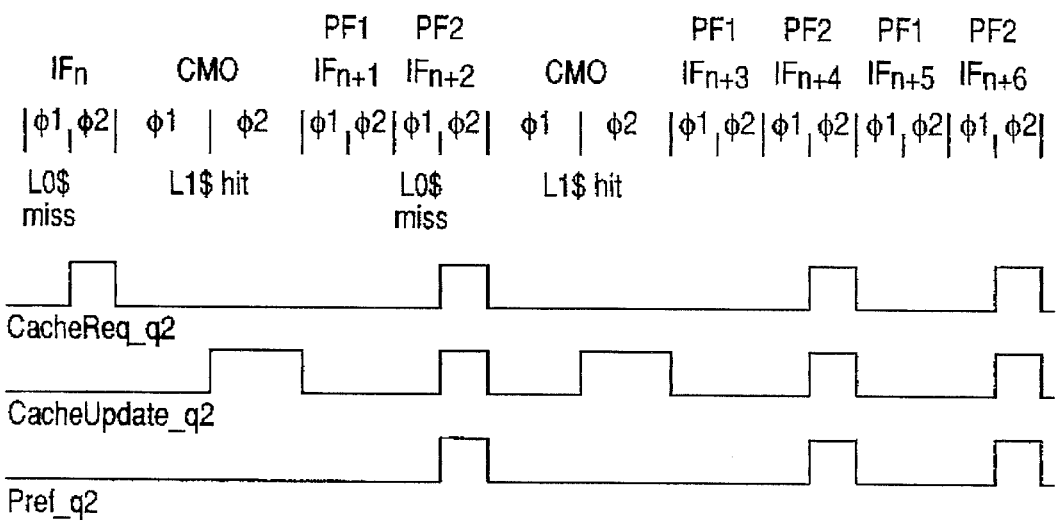
FIG. 26 is an exemplary timing diagram for prefetch address tag RAM.

FIG. 26 is an exemplary timing diagram for prefetch address tag RAM according to the preferred embodiment. FIG. 26 shows the control signal operation for the prefetch address RAM, illustrating the update protocol. The index address for a first-level cache prefetch access is stored according to the cause of the next access. The present first-level cache prefetch address is stored only if the next first-level cache access is another prefetch access.

Accordingly, a prefetch access is stored in the cache block selected by the previous cache access only if the next access is a prefetch access. If the next first-level cache access results from a zero-level cache miss, then the index address of that access is stored, rather than the previous prefetch address. This prefetch-index address storing protocol, and the use of tagged prefetching, allow the CPU's access patterns to be stored precisely. This technique for storing the CPU's reference history also a].lows the information to be used for branch prediction.

The instruction and data streams are handled independently. The data stream includes both read and write references. By handling data read and write references identically, the zero-level cache miss rate is reduced, the prefetch efficiency is increased, and the average data memory access time is reduced. The additional tag bits for supporting tagged-predictive prefetching increases the number of bits in the instruction and data first-level caches by 7% (compared to a conventional direct-mapped 8K-byte cache with a block size of four words). The performance advantages achieved by predictive prefetching and use of the same reference history for branch prediction, justifies the 7% increase in cache storage.

To determine whether a zero-level cache including 16 blocks (4 words per block) is significantly faster than the target first-level cache (direct-mapped, 8K bytes), a general-purpose circuit simulation program with integrated circuit emphasis ("SPICE") was used to analyze the zero-level cache's access time. The SPICE simulation modelled the zero-level cache as shown in FIG. 19. Accordingly, the zero-level cache SPICE model included: (1) the address latches and tri-state drivers in PC-Unit 150, (2) zero-level cache tag unit 156, data unit 158, and word-line control logic, and (3) instruction register 154. The loading of all signals was set to match actual circuit conditions. The CMOS process models were a 2.0 um model based on the MOSIS CMOS process and a 0.8 um model. Appendix C gives the parameters of all technology models for the analysis.

All circuit delays were measured in gate-delays. The gate delay of a semiconductor process is the delay of an inverter with a fanout of four. This unit of measure allows the process to be normalized out of the circuit delay specification. A gate-delay in the 2 um MOSIS process is 0.9 ns and in the 0.8 um process is 0.45 ns under nominal operating conditions. According to test results, a direct mapped 8K-byte internal cache subsystem has an access time of approximately 35–40 gate delays, TABLE 5 lists serial logic elements forming a critical-logic path for modelling the zero-level cache reference delay.

TABLE 5

Logic elements in zero-level cache reference path

| Functional Units | Internal Logic Elements in Reference Path |
| --- | --- |
| PC Unit | Inverter |
| | Latch |
| | Tri-state driver (including four additional tri-state driver loads) |
| Tag Unit (CAM) | CAM cell (address signal loaded by 16 CAM cells) |
| | CAM bit-line (bit-line loaded by 28 CAM cells with only one cell active) |
| | TagDone sense-amp (ratioed inverter) |
| Control logic | NAND |
| for self-timing | NAND |
| and data | qualified clock word-line driver |
| selection | (NAND + 4× inverter) |
| Data Unit (RAM) | RAM cell (word-line loaded by 128 RAM cells) |
| | RAM bit-line (bit-line loaded by 16 RAM cells with only one cell active) |
| 4-1 MUX | minimum size pass transistor (with three pass transistor loads) + ratioed inverter |
| Instruction Register | minimum size pass transistor + inverter |

TABLE 6 lists each functional unit in the zero-level cache reference path, together with gate delays measured from the SPICE simulation.

TABLE 6

Functional Unit gate-delays for zero-level cache reference path.

| Functional Units | Logic delay (gate delays) |
| --- | --- |
| PC Unit | 3 |
| Tag Unit (CAM) | 4 |
| Word-Line Control | 4 |
| Data Unit (RAM) | 2 |
| Instruction Register | 1.5 |
| Total | 14.5 |

All simulations assumed nominal process and environmental conditions (5 V and 25° C.). The logic path delay (measured in gate delays) is measured from the rising edge of the PC Unit 150 control signal to the falling edge of the instruction register 154 output. The total delay for a zero-level cache access was approximately 14.5 gate delays. This is less than half the number of gate delays for a first-level cache access. It is also less than the number of gate delays for an add operation (18 gate delays) and for a compare-and-branch operation (24 gate delays). In the 0.8 um CMOS process, the zero-level cache access time was 7.5 ns.

The performance of a conventional RISC processor memory system is improved by approximately 100% by using small fully-associative caches called zero-level caches, and by using a hardware controlled prefetching technique called tagged-predictive prefetching. Zero-level caches of the preferred embodiment include less than 16 cache blocks, achieving access times approximately half that of an internal 8K-byte, direct-mapped, first-level cache. To reduce the miss ratio of these small caches, the preferred embodiment uses an aggressive and efficient prefetch technique.

By using tagged-predictive prefetching, the miss ratio of small data and instruction caches is significantly reduced. An instruction cache having 48 bytes (three cache blocks) achieves a miss ratio of 2.5% A data cache having 256 bytes (16 cache blocks) achieves a miss ratio of 12.75% with predictive prefetching.

Zero-level caches and predictive prefetching reduce the conventional memory system cycle time approximately in half without pipelining the first-level caches and without incurring the increased branch and load penalties otherwise resulting from increased pipeline depth. By not pipelining the memory system, the preferred embodiment substantially avoids overhead from increased branch and load penalties. The RISC processor of the preferred embodiment using zero-level caching and predictive prefetching is 20% faster than a conventional RISC processor using pipelined first-level caches (all other factors being the same).

The predictive prefetching technique of the preferred embodiment records the instruction and data reference patterns separately. Accordingly, past instruction reference patterns are used to predict future instruction references, and past data reference patterns are used to predict future data references. In an alternative embodiment, data addresses are prefetched in response to instruction references.

The techniques and structures of dynamic clocking and predictive prefetching are readily applicable to a RISC architecture. A self-timed RISC processor of the preferred embodiment is called STRiP. STRiP's architecture is based on, and binary code compatible with, a Stanford MIPS-X processor. By adding self-timing to the MIPS-X architecture, the pipeline sequences at a rate according to pending functional unit operations, semiconductor process, and present environmental conditions. The addition of self-timing improves the performance of the processor by 2–3 times.

The STRiP instruction set architecture is unchanged from the MIPS-X architecture and is pipelined so that one instruction is issued every cycle. Appendix D includes more details concerning instruction encoding and execution characteristics. Referring to FIG. 1, instruction executes through a five-stage pipeline according to the following execution pattern:

| Instruction Fetch | IF |
| --- | --- |
| Register Fetch and Instruction Decode | RF |
| ALU Operation (add, sub, shift, compare, logical) | ALU |
| Data Memory Access (load/store operations) | MEM |
| Register Write-Back | WB |

Each pipelined processing stage includes two phases, $\phi 1$ and $\phi 2$, supported by a two-phase, overlapped, dynamically-clocked sequencing technique. Since the functional units are self-timed and operate independent of the clock duty cycle, the clock periods are the primary timing constraint. Clock phases are able to start, stop, or extend processing, but their lengths are not used for timing within the functional units.

The development of a dynamically-clocked processor includes several steps. First, operations of each functional unit are substantially optimized, independent of the other functional units. This independent optimization is preferred because each operation might involve the critical logic path on any given cycle. Second, the critical logic paths and their frequencies-of-use are evaluated. From this information, dominant pipeline operations are determined. Operations are selected for tracking within the dynamic clock generator if they can be determined in the cycles before their actual occurrence. Third, the dynamic clock generator tracking cells are formed together with logic generating the select inputs.

Figure 27:
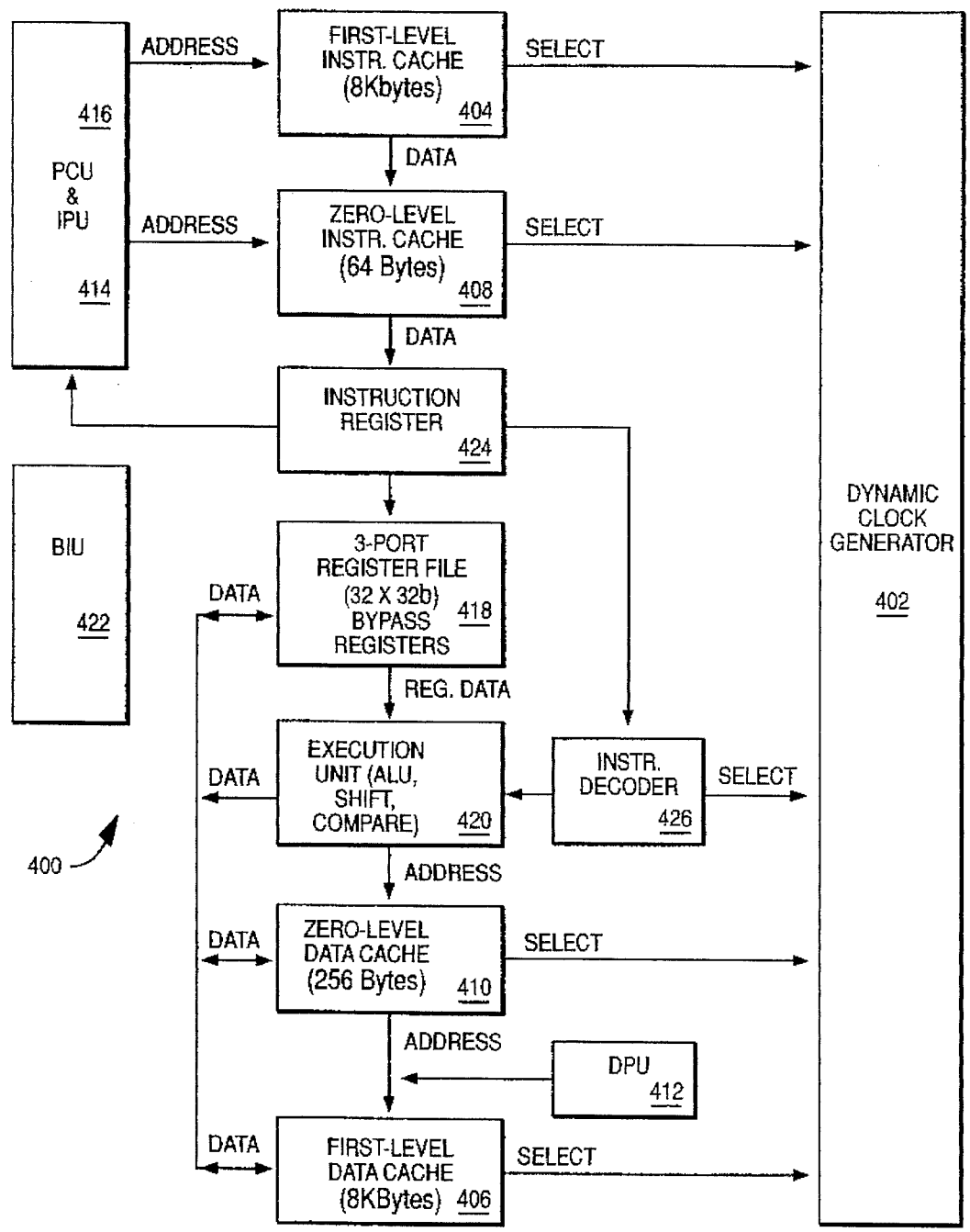
FIG. 27 is a block diagram of a STRiP functional unit organization.

FIG. 27 is a block diagram of a self-timed RISC processor (STRiP) 400 functional unit organization according to the preferred embodiment. The hardware implementation of processor 400 includes seven primary sections: dynamic clock generator 402, the internal memory system (including first-level instruction cache 404, first-level data cache 406, zero-level instruction cache 408, zero-level data cache 410, data prefetch unit (DPU) 412, and instruction prefetch unit (IPU) 414), program counter (PC) unit (PCU) 416, register file 418, execution unit 420, bus interface unit (BIU) 422 and instruction register 424/decoder 426. These functional units are interconnected as shown in FIG. 27. Also, as shown in FIG. 27, IPU 414 is integral with PCU 416. For clarity, interconections are not shown between BIU 422 and other functional units.

The functional units of STRiP 400 correspond to MIPS-X implementations, with only slight changes. The unit having the most change is execution unit 420. Execution unit 420 includes a 32-bit ALU, a 64-bit to 32-bit funnel shifter, MD registers for supporting multiplication and division, and a processor status word (PSW). The ALU is one of the most timing-critical datapath units. The ALU implements all of the logical and arithmetic operations, as well as branch comparisons and load/store address calculations. The adder accounts for a significant amount of the ALU's logic delay. Because MIPS-X uses precharged logic for its adder implementation (Manchester carry-chain), it is inefficient for dynamic clock operation. Accordingly, STRiP 400 includes a high performance static design instead.

TABLE 7 provides a relative performance comparison of various adder types.

TABLE 7

CMOS adder performance comparison.

| Adders | # of Serial Transistors from cin to S32 | # of Complex Gate Delays from cin to S32 |
| --- | --- | --- |
| Carry-Look-Ahead | 21 | 6 |
| Conditional-Sum | 16 | 5 |
| Carry-Select | 18 | 5 |
| Multiple-Output Domino Logic | 18 | 5 |
| CMOS Ling | 14 | 4 |
| Parallel (Mod. Todesco) | 14 | 7 |

A parallel adder, modified for efficient operation in a dynamically clocked pipelined, is preferred, as it achieves high performance at relatively low complexity for the targeted CMOS technologies. In the preferred embodiment, the parallel adder also has minor modifications to provide the other ALU functions, logical and compare operations. The same adder design of the ALU is implemented in DPU 412, IPU 414 and PCU 416. In this manner, dynamic clock generator 402 more accurately tracks units performing addition.

Another element of execution unit 420 is slightly modified relative to MIPS-X. The shifter in the MIPS-X implementation is a two-stage funnel shifter. This shifter structure is efficient for dynamic clocking. Accordingly, the shifter of execution unit 420 has modified transistor sizes for substantially optimum operation.

A critical functional unit used by every instruction is register file 418. Register file 418 outputs operands to execution unit 420 and the memory system. Register file 418 further includes bypass or holding registers for outputting computed-but-not-yet-stored values to the instruction stream. Register file 418 is essentially a 32 word, triple-ported (two read ports, one write port) static memory. If the register file is slower than other critical logic functions, then it reduces the performance potential of the processor.

A primary difference between register file 418 of STRiP 400 and the MIPS-X register file is the ability of register file 418 to be simultaneously read and written, instead of time-multiplexing the operations. For this reason, register file 418 includes independent read and write bit-lines and word-lines, a self-timed read-bit-line precharge circuit, a self-timed write circuit, and a third bypass register (notably, the third bypass register is included only in the BiCMOS implementation since the read-through-register operation is otherwise insufficiently fast). The parallel read/write structure allows reads to start during the beginning of the cycle, instead of during $\phi 2$ as in MIPS-X. Performing the register read and write operations in parallel reduces the total cycle time of register file 418.

Figure 28A:
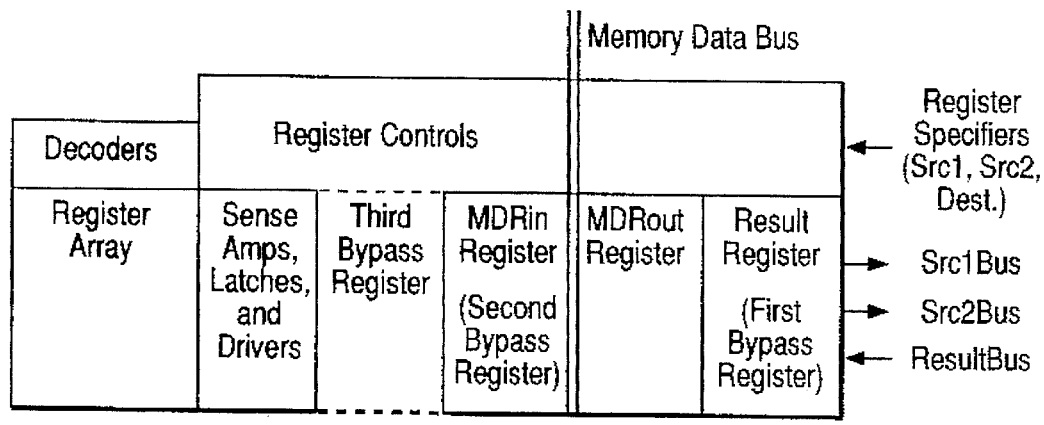
FIG. 28a is a floor plan diagram of a register file.
Figure 28B:
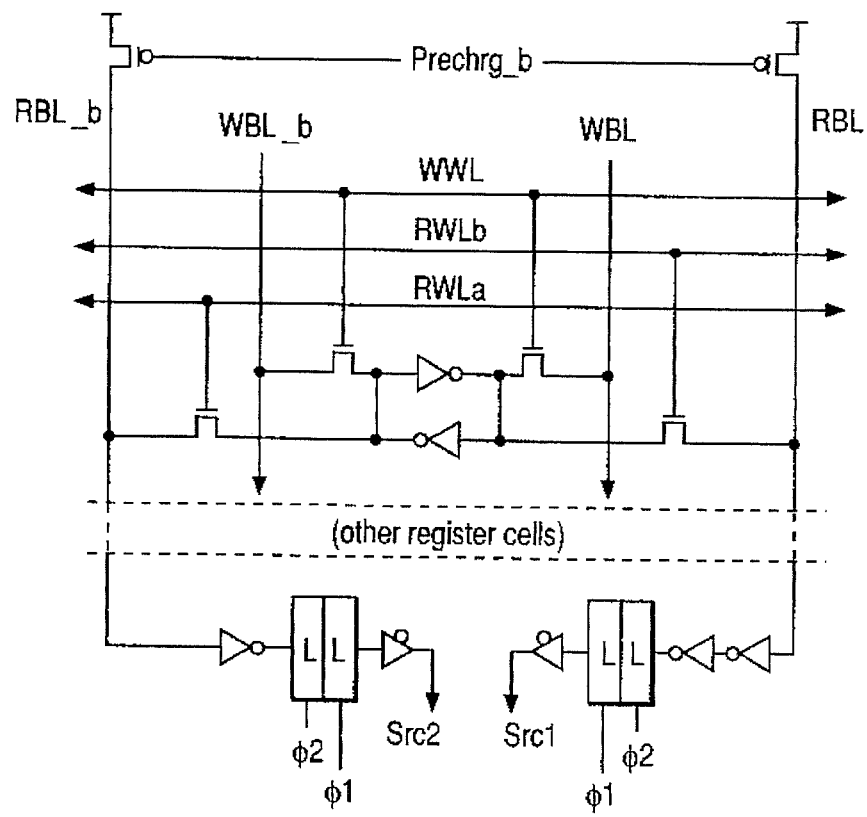
FIG. 28b is a schematic electrical circuit diagram of a register array memory cell.

FIG. 28a is a floor plan diagram of STRiP's register file 418. FIG. 28b is a schematic electrical circuit diagram of a memory cell of the register array.

As discussed further hereinabove in connection with FIGS. 16–26, the memory system can limit the processor sequencing rate. Since instruction fetches occur during every processor cycle and data fetches occur during approximately 30% of processor cycles, the average memory access time is important. For this reason, STRiP 400 includes the internal memory system discussed further hereinabove in connection with FIGS. 16–26. By including zero-level caching with predictive prefetching, the memory system is removed from the critical logic paths. To support this memory subsystem, STRiP 400 includes a finite-state-machine (FSM) for zero-level and first-level cache miss and prefetch cycling. Both the instruction and data paths include an FSM operating according to the state diagram of FIG. 29.

Figure 29:
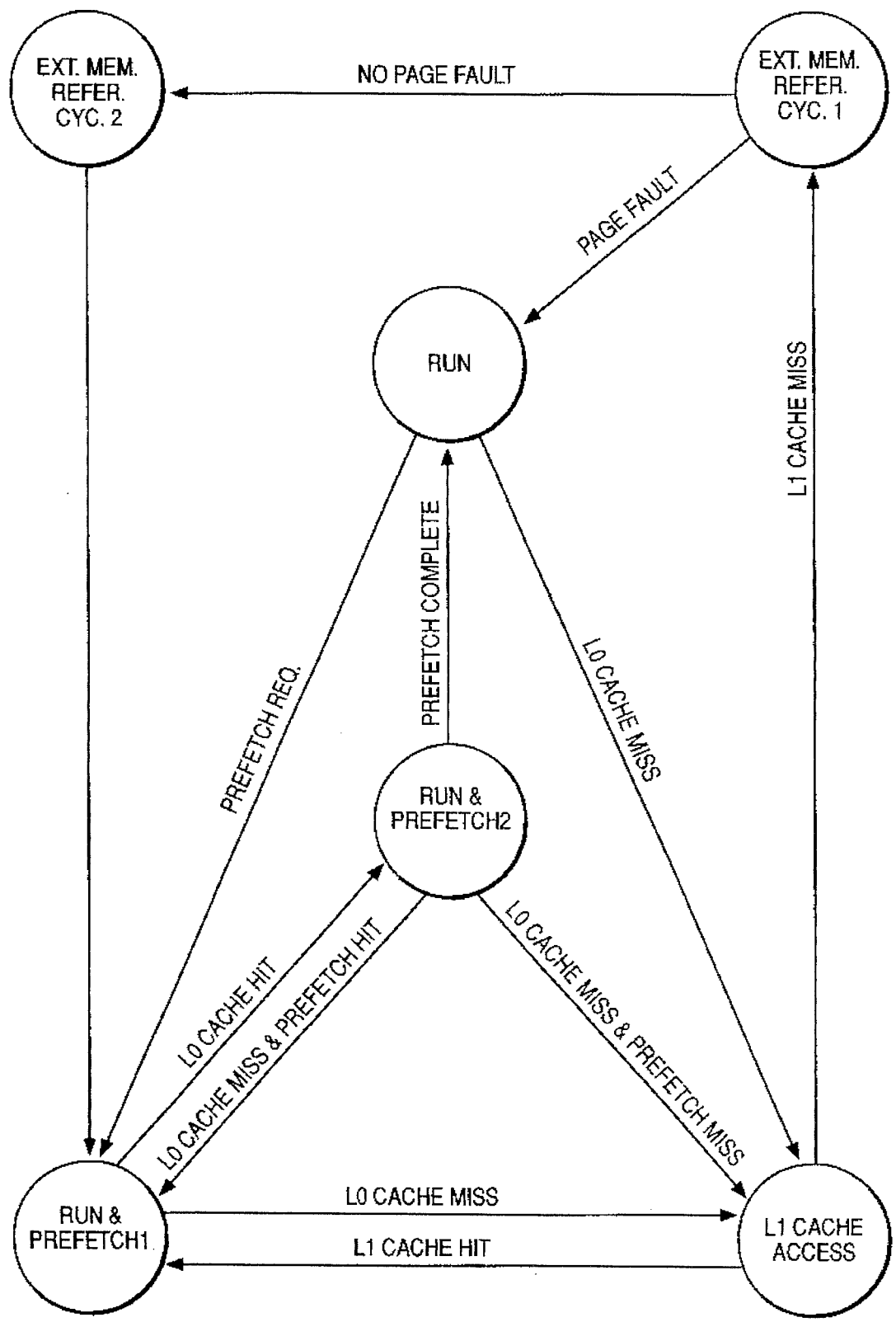
FIG. 29 is a state diagram for an internal cache miss finite-state-machine (FSM)

Referring to FIG. 29, when in the RUN state, a zero-level cache tag unit signals the state machine in response to a cache miss or prefetch request. This signalling occurs at the end of $\phi 1$. In the RUN/Prefetch states, the pipeline sequences normally with a prefetch operation occurring in parallel. The RUN/Prefetch states are entered after a prefetch request, a prefetch hit-compare, or a first-level instruction cache hit. The prefetch operation takes two cycles, due to the speed of first-level instruction cache 404 relative to a minimum processor cycle time. If a zero-level instruction cache 408 miss occurs during the first Prefetch/RUN state, and if the missed address is different than the prefetch address, then that prefetch operation is terminated. This substantially eliminates unnecessary stall time resulting from the overlapping of prefetch and fetch operations. If a zero-level cache miss occurs during the second Prefetch/RUN state, and if the missed address matches the prefetch address, then the prefetched data are bypassed to the target register.

A first-level cache access state is entered in response to a zero-level cache miss or prefetch miss-compare. A first-level cache access in this state is one cycle, since dynamic-clock generator 402 adjusts the cycle time to substantially match the cache access time. In response to a first-level cache miss, the state machine sequences through an external memory request cycle. Notably, the state machine takes two cycles to fetch information from external memory, comparable to MIPS-X. During the first external miss cycle, the cache block is read from the external memory. During the second cycle, the block is written into zero-level instruction cache 408 and first-level instruction cache 404. The state machine advantageously begins a prefetch cycle during the second cycle of the first-level cache miss.

Figure 30:
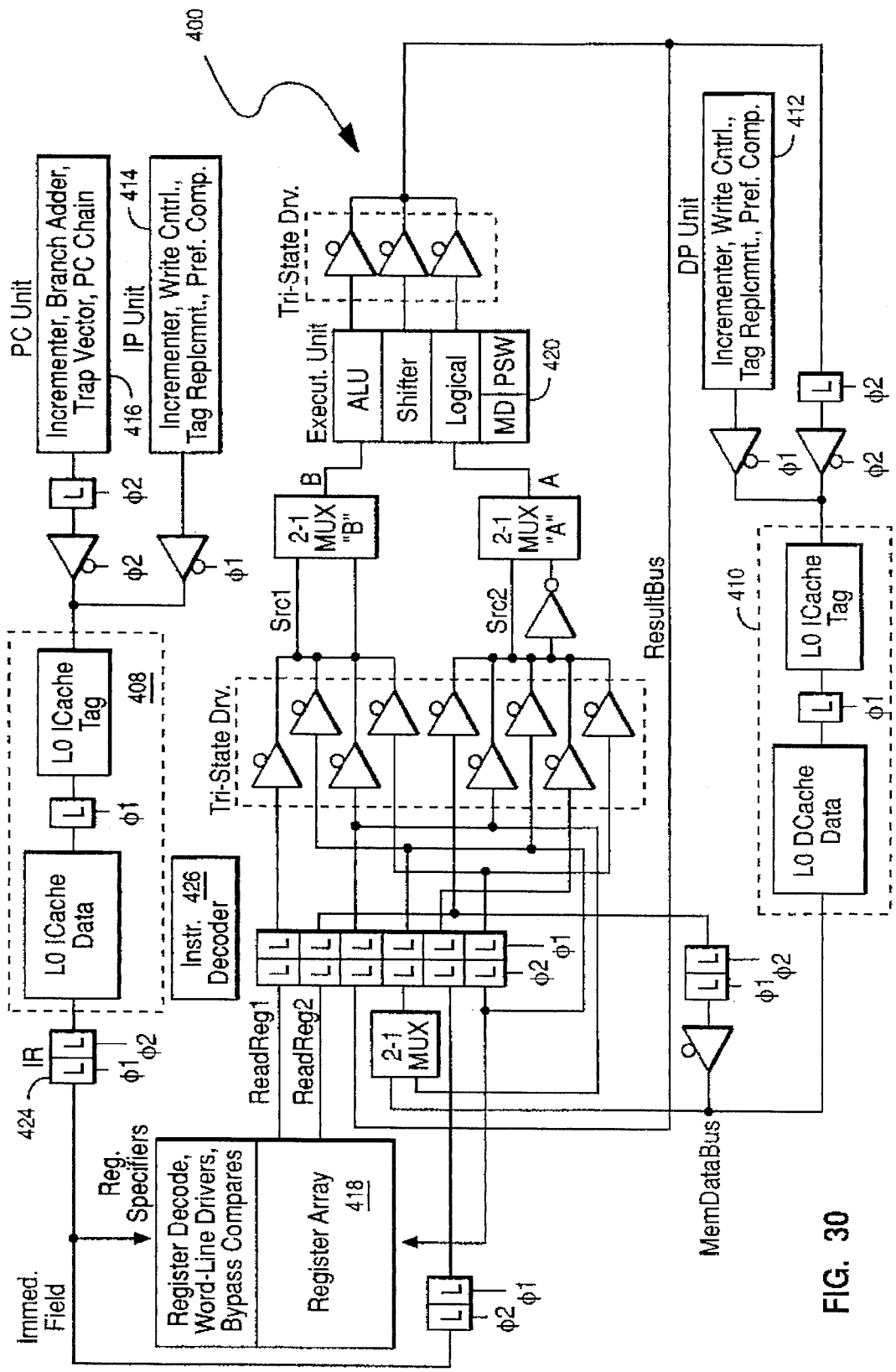
FIG. 30 is a block diagram of STRiP datapaths.

FIG. 30 is a block diagram of STRiP 400 datapaths. Proper floor planning and datapath design are important for the efficient operation of a processor. FIG. 30 shows the hardware resources included in the pipeline of STRiP 400, the phase on which each latch is controlled, and primary buses connecting the pipelined elements. Primary differences between the STRiP datapath structure and the MIPS-X datapath structure are: internal data caches, a tri-state result bus (instead of precharged), and the execution unit 420 configuration. Prefetch units 412 and 414 and first-level caches 404 and 406 are not considered part of the primary pipeline.

Figure 31:
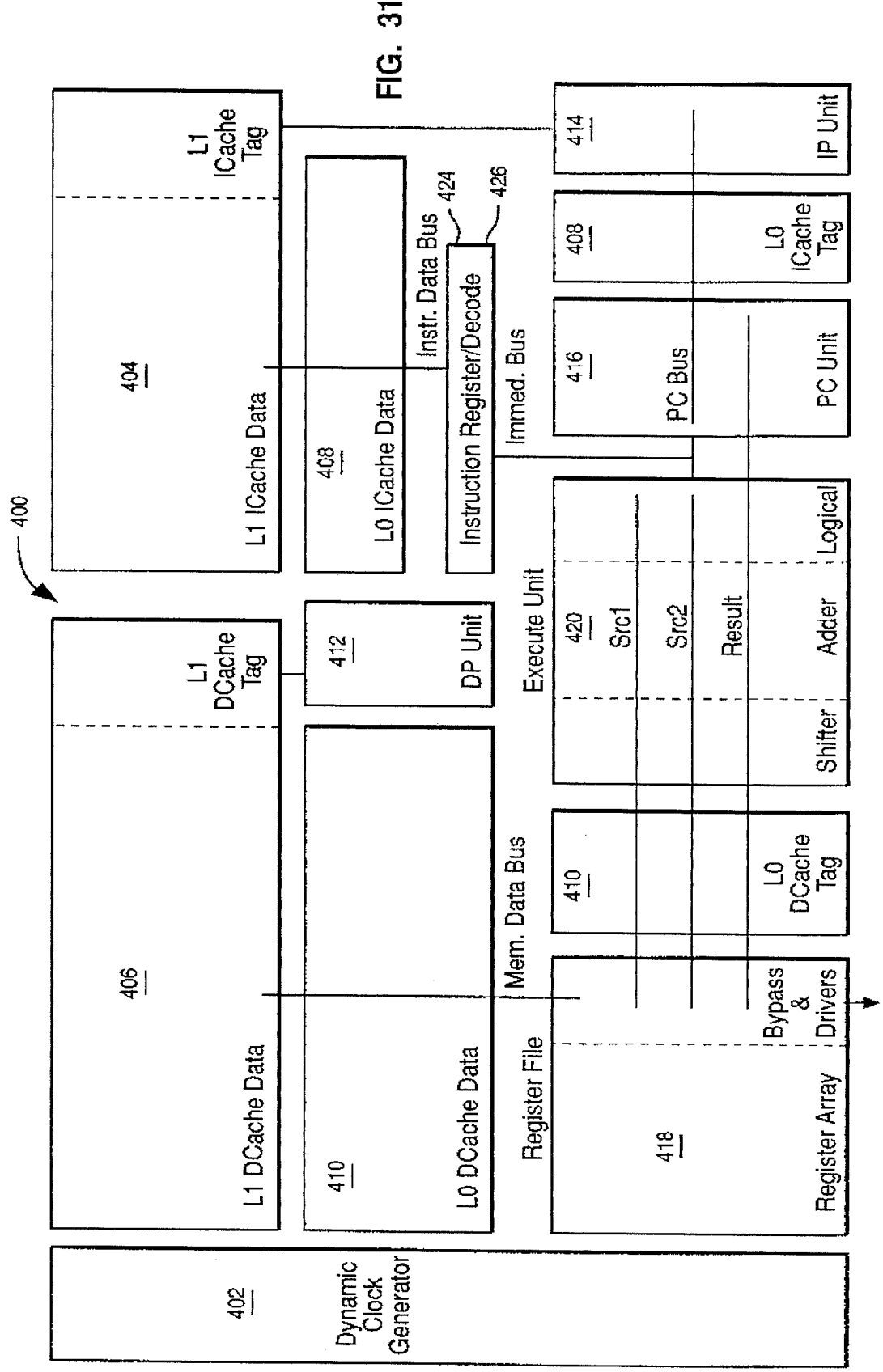
FIG. 31 is an exemplary STRiP floor plan.

FIG. 31 is an exemplary STRiP 400 floor plan indicating primary bus locations relative to the connected functional units. Referring also to FIG. 30, the SRC1 and SRC2 buses are used to read data from register array 418, bypass registers, and immediate field and transfer such data to execution unit 420. The Result Bus transfers data to the bypass registers, PC Unit 416 (for indexed jump operations), and the memory address register (for load/store operations). The PC Bus transfers instruction fetch addresses generated by PC Unit 416. The Immediate Bus transfers immediate values from IR 424 to PC Unit 416 and execution unit 420. The Mem Data Bus and Instr Data Bus transfer data from the first-level caches to the zero-level caches during a zero-level cache miss or prefetch cycle.

Referring to FIG. 27, the key elements in dynamic clock generator 402 are tracking cells. Each tracking cell matches the operational delay of a targeted critical logic path. To achieve accurate tracking and substantially optimum performance, the tracking cells include the same type and size of series gates, signal wires, and loads of the critical logic paths. Such an approach to implementing tracking elements provides accurate tracking under all environmental conditions.

A tracking cell matches signal loading by including active and passive devices sized to match the total gate load per signal. Also, a tracking cell includes the length and type of material for each critical path signal line. Since each tracking cell is inverting, some tracking cells might include one less series gate than the actual critical logic path. The C-element delay compensates for the lost gate delay.

To support symmetric output transitions, the organization of the critical path gates might be somewhat altered in the tracking cell. Most gates in the STRiP implementation are ratioed to substantially optimize performance and symmetric operation, so that gates need not be rearranged for symmetric tracking cell operation. Nevertheless, in some complex gate designs, it is difficult to achieve identical transition delays.

Figure 32:
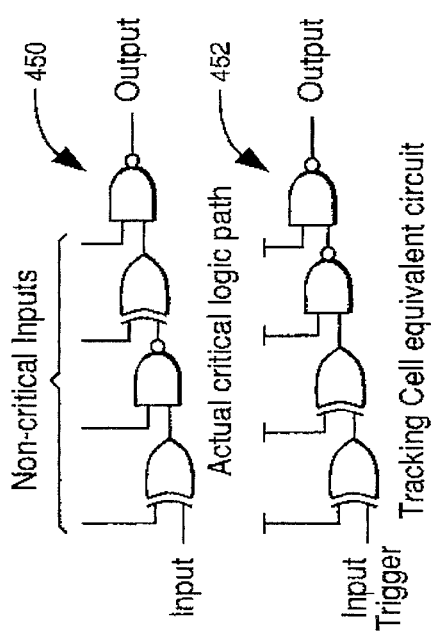
FIG. 32 is a schematic electrical circuit diagram of an exemplary critical logic path and equivalent tracking cell circuit.

FIG. 32 is a schematic electrical circuit diagram of an exemplary critical logic path 450 and its equivalent tracking cell circuit 452. In the processor critical logic path 450, the XOR gates alternate in the series gate positions, so they switch to the same logic state. If the XOR gates are asymmetric, this structure reduces the symmetry of this series connection of gates. By comparison, the tracking cell equivalent circuit 452 locates the XOR gates back-to-back in the series connection of gates. Nevertheless, the worst-case path might be the XOR gates switching to the same logic level, resulting in a slower circuit than if the XOR gates switch to opposite levels. Accordingly, such a rearrangement of gates might eliminate tracking of the worst-case path. In such a situation, addition loading is added to circuit 452 for simulating the worst-case delay and still achieving symmetric operation. Also, worse-case inputs are used while shorter delay inputs are tied off. In this manner, for each clock cycle controlled by the tracking cell, the number and type of gate transitions are substantially identical and worst-case.

For proper design of tracking cells, the critical operations to be tracked are chosen. TABLE 8 lists the latencies and frequencies-of-use for various critical logic paths.

TABLE 8

STRiP's critical path latencies and their frequencies-of-use.

| Critical Operation | Freq.-of-Use (per instruction) | Latency (gate delays) |
| --- | --- | --- |
| Register Access | 100% | 13 |
| L0 ICache | 100% | 15 |
| L0 DCache | 30% | 15 |
| Adder* | 65% | 18 |
| Compare & Branch | 15% | 24 |
| L1 ICache | 2.5% | 45 |
| L1 DCache | 4.0% | 45 |
| External Cycles | 1.0% | 100 |

The latencies are normalized to gate delays (one gate delay equals an inverter delay with a fanout of four). An instruction fetch occurs in response to every machine cycle, but the zero-level cache latency is less than the next most frequent operation, an addition operation. An addition operation has a frequency-of-use of approximately 65% (100% if PC increment is included). Accordingly, in the preferred embodiment, the add operation of execution unit 420 is the minimum delay critical logic path in the pipeline.

The next longest pipeline operation is a compare-and-branch. Its length is approximately six gate delays longer than the add operation delay, and it has a frequency-of-use of approximately 15%. A first-level cache access resulting from a zero-level cache miss occurs infrequently (approximately 6% of all references) but has a delay approximately twice that of an add operation. Accordingly, first-level cache access is tracked during pipeline stalls resulting from zero-level cache misses.

The slowest operation is an external transfer. Its delay is indeterminate and ranges in length between a second-level cache access and an I/O transfer for a device on a system bus. A special tracking cell monitors such requests to external devices, stops the clock signal in response to such requests, and restarts the clock signal in response to completion of such requests. Accordingly, dynamic clock generator 402 includes four tracking cells.

Figure 33:
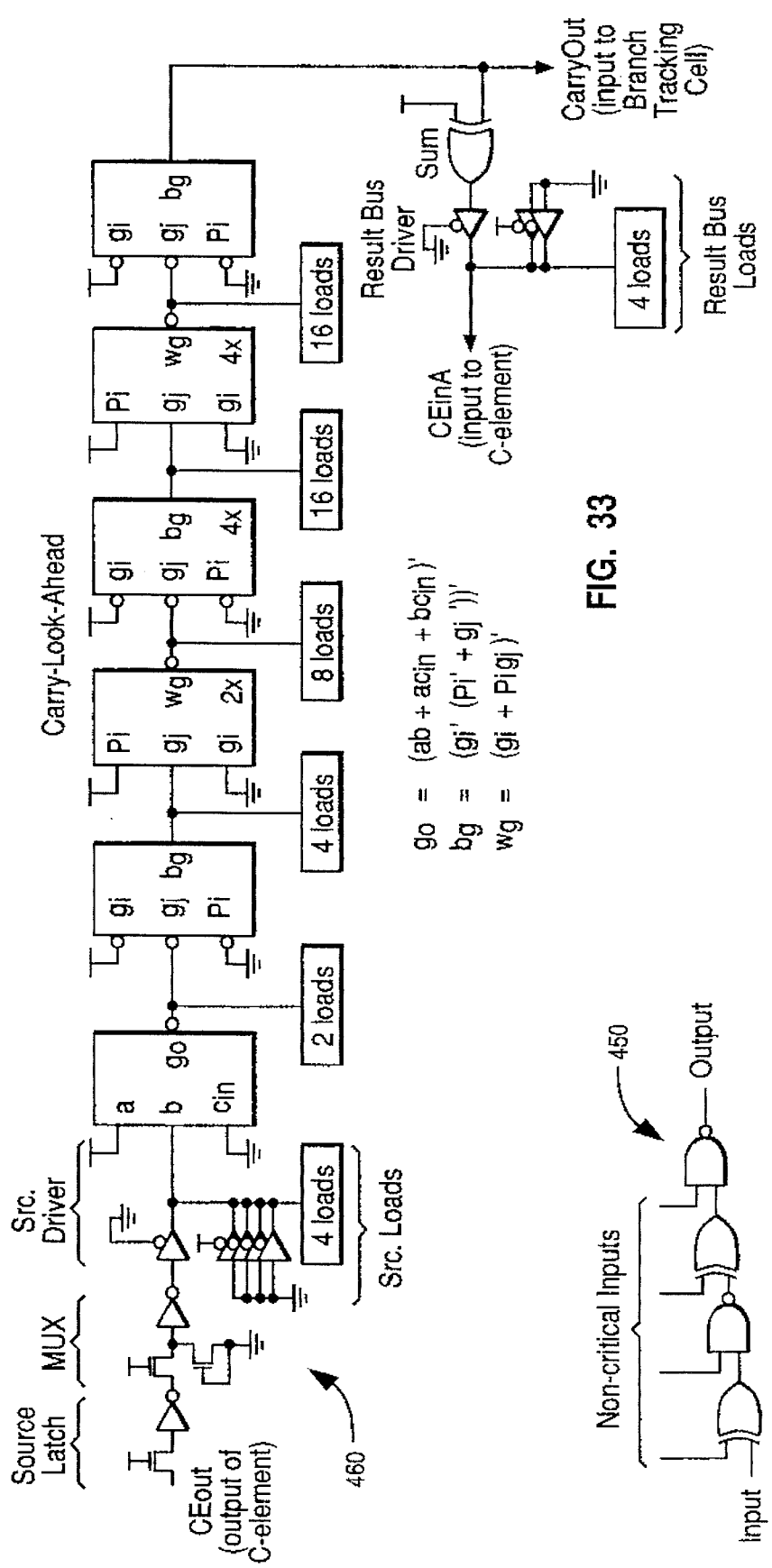
FIG. 33 is a schematic electrical circuit diagram of an adder tracking cell.

FIG. 33 is a schematic electrical circuit diagram of an adder tracking cell 460 of dynamic clock generator 402. Adder tracking cell 460 tracks the add/subtract/compare operation in the ALU. The ALU add operation occurs during add/subtract, jump, and load/store instructions. Add operations also occur in other functional units for branch address calculation, prefetch address calculation and PC incrementing. For STRiP 400, the ALU critical logic path is slightly longer than the other logical units performing addition.

FIG. 33 shows the gates and internal loads used to match the ALU add critical logic path. The complex gates of adder tracking cell 460 substantially match those gates in the carry-look-ahead section of the parallel adder design implemented for the critical functional units. FIG. 33 further shows how the logic is connected in a series. The gate input providing the worse case delay is connected to the series connections in the tracking cell. All other gate inputs are tied either to Vcc or GND.

Adder tracking cell 460 includes eleven series connected gates. These gates, plus the C-element, have a logic latency of 17 gate delays. The actual critical path of the add operation further includes an additional lightly loaded result bus latch. Nevertheless, the result bus latch was not included in tracking cell 460 since it would result in tracking cell 460 being non-inverting. The C-element delay compensates for the absent result bus latch delay. To accurately track the source and result bus loading, the line between the tri-state drivers and the input to the next series gate is substantially the same length, width, and material type as the actual source and result buses. To improve tracking accuracy, active gates and passive transistors are used for simulating similar loads in the ALU critical logic path.

Figure 44:
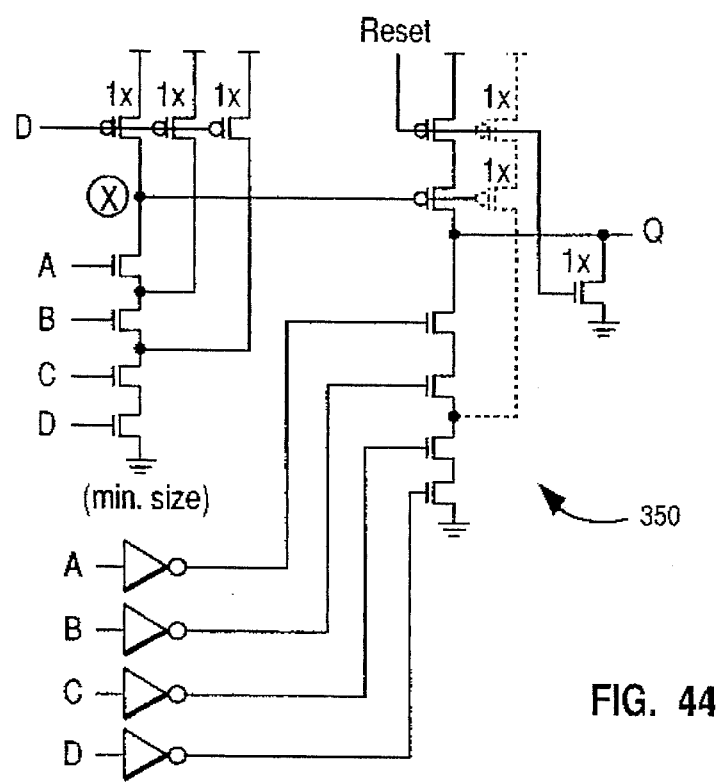
FIG. 44 is a schematic electrical circuit diagram of a 4-input pseudo-dynamic C-element.

Adder tracking cell 460 is active on every cycle. Its logic delay establishes the minimum sequencing period of the pipeline, so it does not necessarily need a select input. Its output connects to the A input of the C-element (FIG. 44). By design, the A input provides the least logic delay. This substantially optimizes clock generator 402 to support the minimum sequencing period, which has the highest frequency-of-use.

The CarryOut signal is an input to the branch tracking cell. This is because the compare operation for the branch instruction uses the ALU adder. Accordingly, the compare-and-branch critical logic path is substantially identical to the ALU adder path, up to the CarryOut signal. Sharing of logic functions advantageously reduces the dynamic clock generator 402 logic.

Figure 34:
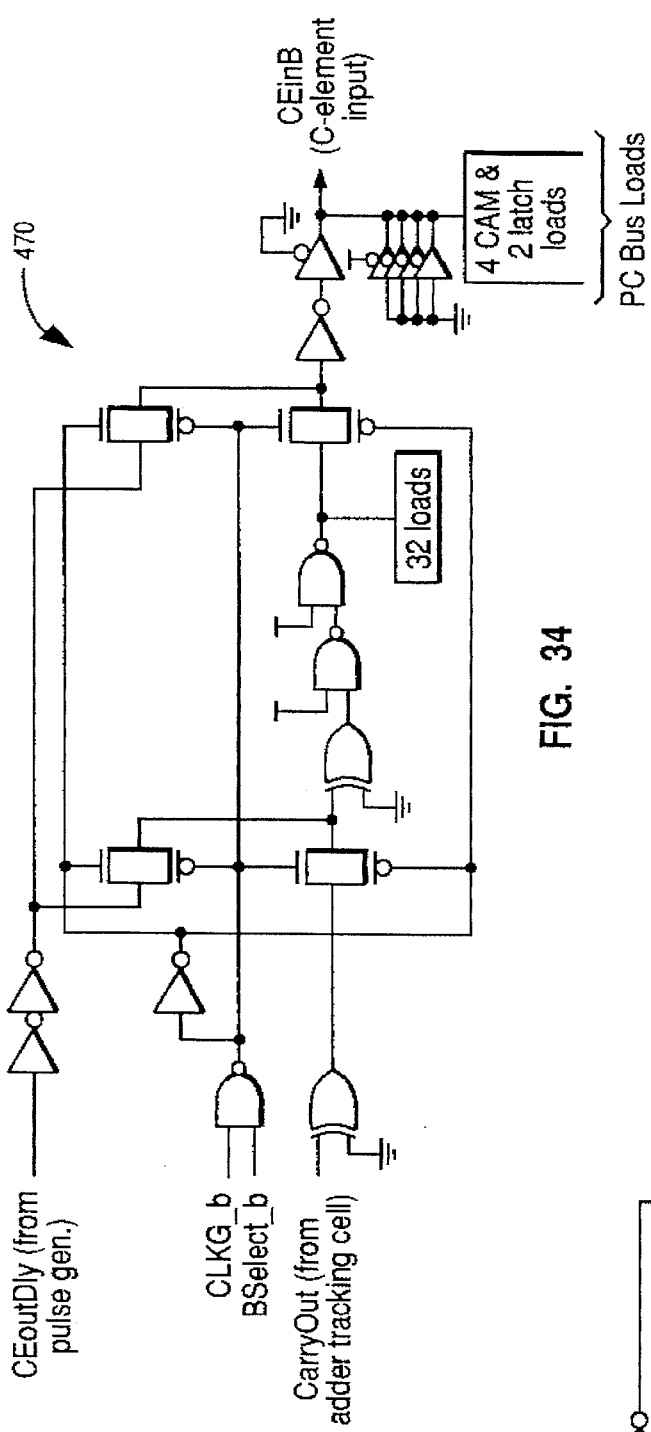
FIG. 34 is a schematic electrical circuit diagram of a branch tracking cell.

FIG. 34 is a schematic electrical circuit diagram of a branch tracking cell 470 of dynamic clock generator 402. Branch tracking cell 470 tracks the next slowest of the processor pipelined critical logic paths. It also represents the next most frequent operation executed by processor 400.

The total number of gate delays for a compare-and-branch operation is approximately 22 (tracking cell 470+C-element). The frequency-of-use of a conditional branch operation is approximately 15%. In addition to having the adder in its critical logic path, a branch operation further includes logic to determine greater-than, less-than, or equal-to conditions.

Moreover, the branch logic path includes address selection multiplexers and drivers. Although the branch-on-equal operation has a faster compare delay (less than the full adder delay), it is included in the set of branch operations. To improve performance, the branch-on-zero can be eliminated from the decoder selecting branch tracking cell 470.

Referring to FIG. 34, two 2-to-1 multiplexers select between the full delay of tracking cell 470 and the set trigger, which forces tracking cell 470 to switch its output prematurely. The tracking cell delay is less than the minimum cycle time when a compare-and-branch operation is not selected. When the tracking cell is triggered for minimum delay, it responds to the next input change for the next cycle. The selection multiplexers also closely match the pass transistors in the actual branch critical logic path, adding little additional delay to the optimum cycle time. Relative to the actual logic path, the XOR gates are for symmetric operation of the tracking cell 470.

Three primary considerations affect the configuration of branch tracking cell 470 as well as any other tracking cell having selectability. First, the logic delay of the circuit between the 2-to-1 multiplexers is less than the adder tracking cell delay minus the pulse generator delay. This helps ensure that the tracking cell is set to the final state before the next cycle begins (i.e. the C-element changes state). This consideration also applies for the tracking cell circuit delay between the output 2-to-1 multiplexer and the input to the C-element.

The second consideration applies to the input signal of the 2-to-1 multiplexers. The multiplexers select the full tracking cell delay during 100 1. This gives the tracking cell select inputs time to become valid (stable-$\phi 2$ signals). If the tracking cell is selected, the full tracking cell delay selection is maintained through $\phi 2$. If the tracking cell is not selected, the tracking cell output is switched early. The multiplexer data input, which advances the tracking cell when not selected, is driven by a stable-$\phi 2$ signal. CEoutDly is the multiplexer data input satisfying this consideration. CEoutDly is a signal generated near the end of the pulse generator inverter chain and is essentially the C-element output delayed by several gate delays. This consideration helps ensure monotonic operation of the tracking cell output.

The third consideration relates to the select input to the tracking cell. The select input is a stable-$\phi 2$ signal, relative to the clock generator local output signals. This consideration helps ensure monotonic operation of the tracking cell output. To satisfy this consideration, the pulse width generated by the pulse generator, which results in the $\phi 1$ time of the pipeline, is equal to or greater than the total delay of the global clock buffers, the clock distribution network, the local clock buffers, the select control latch, and the select input wire delay. These logic delays account for the clock skew between the clock generator and the functional unit output signals.

Figure 35:
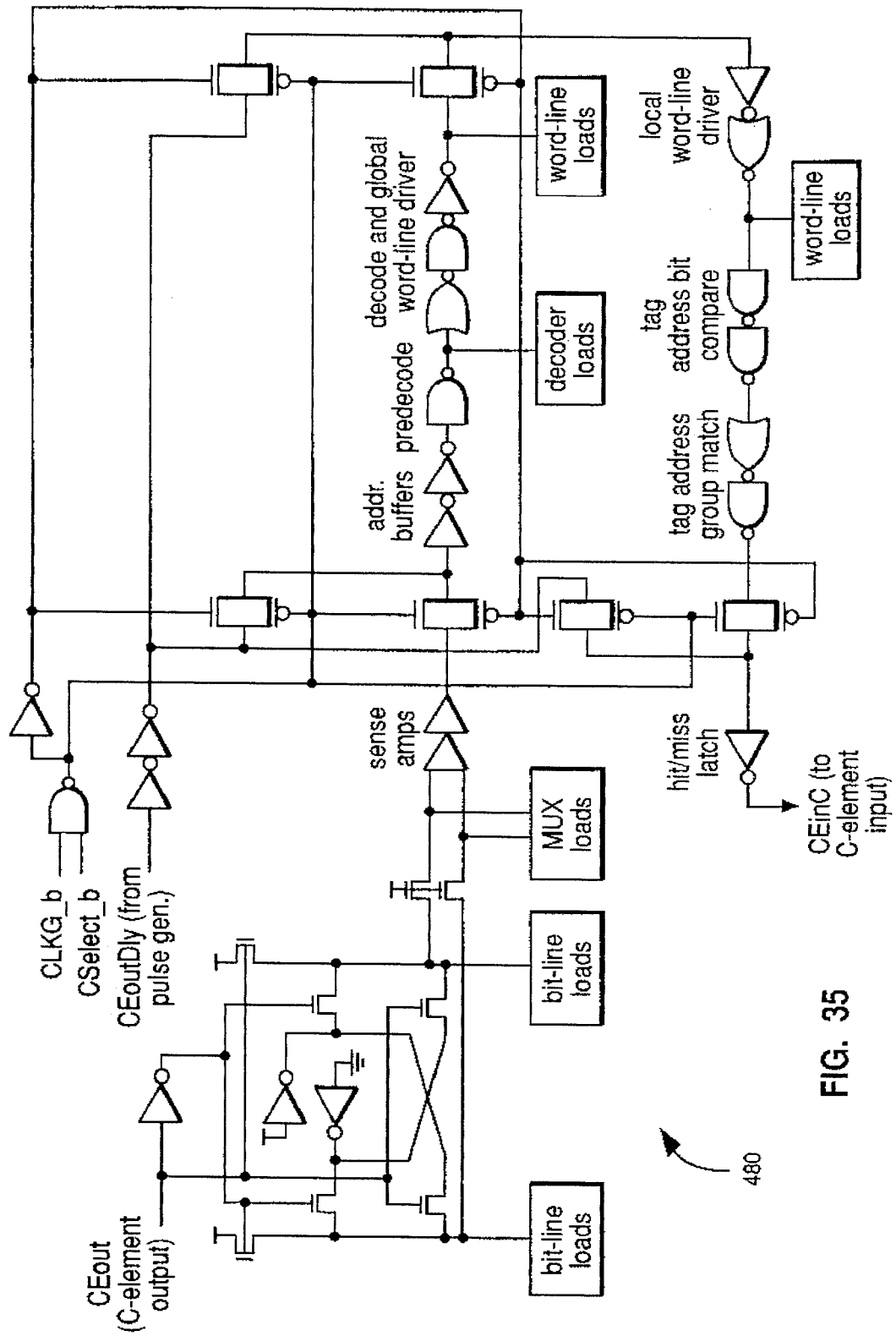
FIG. 35 is a schematic electrical circuit diagram of a first-level cache tracking cell.

FIG. 35 is a schematic electrical circuit diagram of a first-level cache tracking cell 480. First-level cache tracking cell 480 accurately indicates the access times of the first-level instruction and data caches. Tracking cell 480 is selected during the pipeline stall cycle after each zero-level cache miss. First-level cache tracking cell 480 is not selected during prefetch request. In such a situation, two pipeline sequencing periods (two minimum delay cycles) occur for each prefetch operation.

From the analysis of the memory hierarchy discussed further hereinabove in connection with FIGS. 16–26, first-level cache tracking cell 480 is selected on approximately 6% of the processor cycles. By using tracking cell 480 for first-level cache accesses, dynamic clock generator 402 can provide the proper sequencing period without a completion detect signal from the cache. By eliminating the completion detect handshaking for first-level cache cycles, the clock startup time is eliminated after a completion signal is received. Such a savings is significant, because the startup time otherwise forms approximately 20% of the cache access time.

Figure 36:
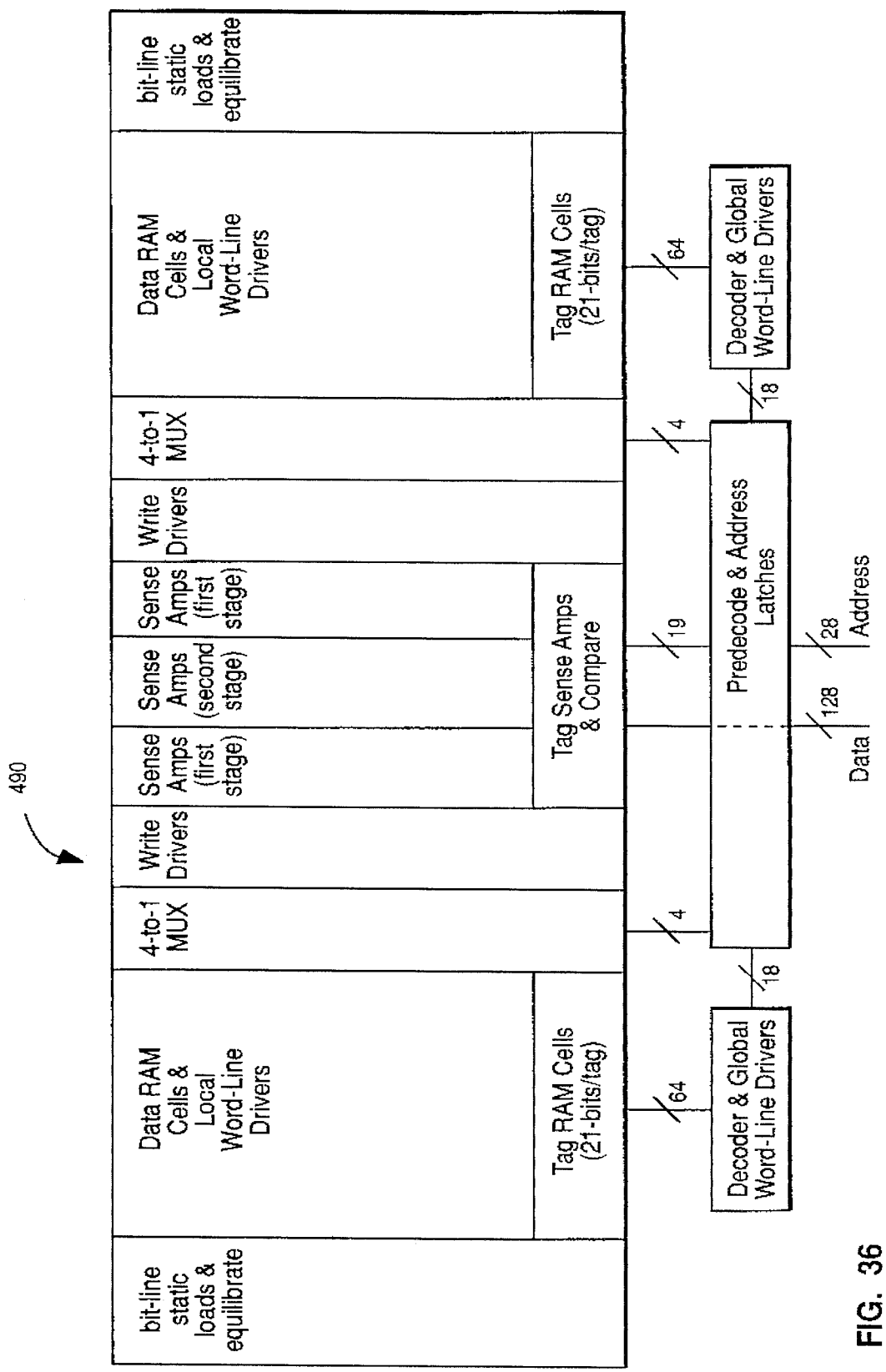
FIG. 36 is a floor plan diagram of a first-level cache.

FIG. 36 is a floor plan diagram 490 of a first-level cache. First-level cache tracking cell 480 models the delay of the cache RAM shown in FIG. 36. Tracking cell 480 is the most complicated of the tracking cells.

A STRiP 400 first-level cache is 8KB in size with an interface data path size of 16 bytes (128 bits). The cache is divided into 128 word-lines of 512 bits each. The word-lines are split to limit the number of bit-line loads to 64.

Moreover, each word-line uses local word-line drivers to distribute the word-line loads. A 4-to-1 multiplexer selects the addressed 128 bits from the 512 bit access group. Each multiplexer drives the first-stage of a two-stage static sense amp. Static sense amps are used to substantially maximize the performance of the cache and to simplify the tracking cell 480 implementation. The worst-case access path includes the compare logic of the tag bits. Cache write operations are not tracked since they always occur in parallel with other pipeline operations or during external interface cycles.

Tracking cell 480 includes all elements of the access path of the first-level cache. Due to the operating characteristics of tracking cell 480, the tracking cell elements are not connected in the same serial order as in the actual critical logic path. This reduces the complexity of tracking cell 480 but does not reduce its accuracy. The following is a list of serially connected elements which form the critical logic path for a first-level cache access:

- address latch and buffers
- predecoder
- decoder and global word-line driver
- local word-line driver and word-line loads
- bit-line select transistors and bit-line loads
- 4-to-1 multiplexer
- first and second stage sense amps
- address bit compare
- address word compare
- hit/miss latch To achieve accurate tracking, first-level cache tracking cell 480 includes the equivalent loads present on the predecoder, global word-line, local word-line, and bit-line signals. FIG. 35 shows these load as active gates or passive transistors. Since capacitance dominates the loading characteristics, appropriately sized transistors connected as capacitors are used instead of full active gates.

Also, delays resulting from large gates driving large loads are accurately duplicated by small gates driving small loads. Such techniques achieve a smaller physical layout and are based upon detailed analysis of the capacitive loads and drivers associated with each connection. The most conservative, but most area intensive, technique is to use exactly the same gates and loads as used in the cache. Ratioed-down gates and loads are substituted only when the most conservative technique is too area intensive.

Figure 37:
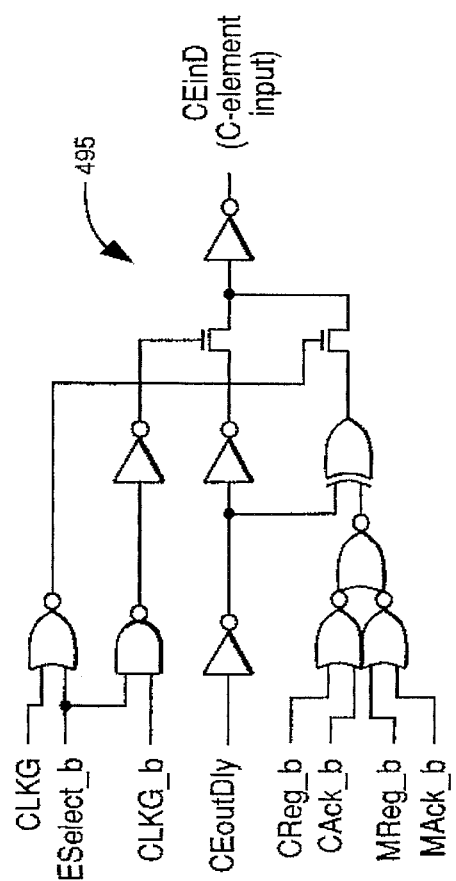
FIG. 37 is a schematic electrical circuit diagram of an external interface tracking cell.

FIG. 37 is a schematic electrical circuit diagram of an external interface tracking cell 495. External interface tracking cell 495 is selected for each external data transfer cycle, except for resource-independent stores and write-back operations. Tracking cell 495 allows clock generator 402 to stop or suspend operation until the external device signals data-transfer completion.

The completion signal is also internally buffered to match the data signal delays. These delays result from pad buffers, bus drivers, bus loads, and device latching. Since the clock period is not known in advance, clock generator 402 startup time adds overhead to the optimum cycle time.

The clock startup time associated with an external operation includes the tracking cell delay and the C-element delay, totaling seven gate delays. Assuming a 0.8 um CMOS process and a minimum external cycle of 40 ns (second-level cache access), the clock startup time adds less than 10% to the optimum cycle time. Some of the clock startup time is maskable by overlapping the clock startup delay with some internal data signalling delays. The external communication protocol can also add overhead to the data transfer between asynchronously operated devices. This overhead is reduced by overlapping the external handshaking with the clock startup, allowing processor 400 to continue processing before the external handshaking has completed.

Figure 38:
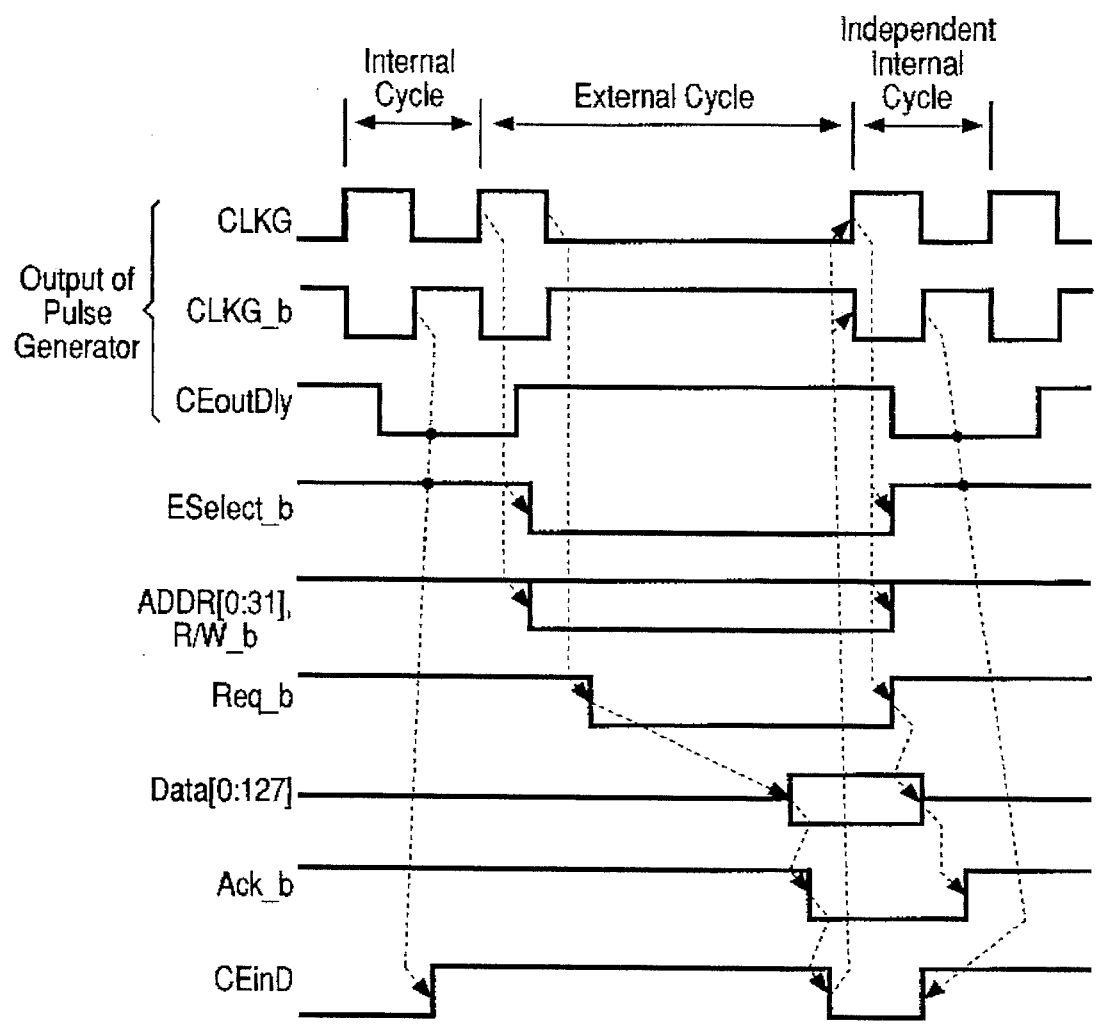
FIG. 38 is a timing diagram showing signals of the external tracking cell during a read cycle.

FIG. 38 is a timing diagram showing signals of external tracking cell 495 during a read cycle. ACK_b switching low (active) indicates the data are valid on the external bus, allowing processor 400 to continue operation after the data can be latched. The REQ_b inactive to ACK_b inactive delay need not be part of the internal cycle, thereby improving overall system performance. The internal communication control logic further ensures that the external bus signals and REQ_b are not driven until the ACK_b signal is inactive. With suitable protocols, the asynchronous external interface can optimize the systems performance and interconnection efficiency.

Figure 39A:
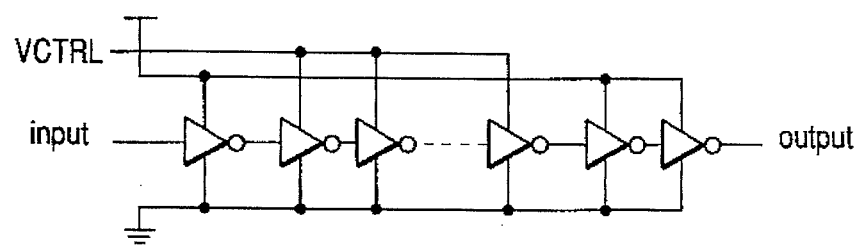
FIGS. 39a–b are schematic electrical circuit diagrams of adjustable delay elements using variable supply voltage and selectable inverter chains.
Figure 39B:
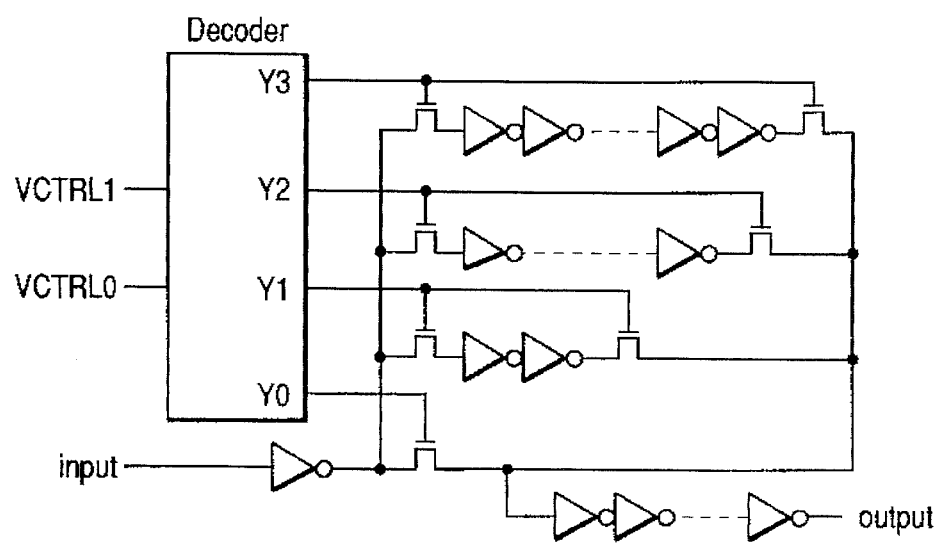
Figure 40:
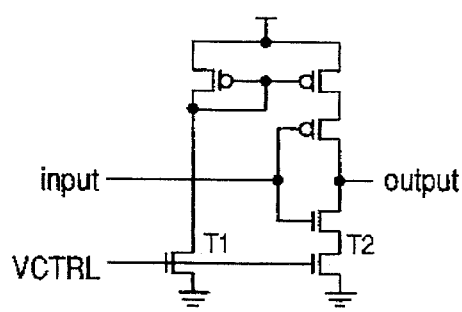
FIG. 40 is a schematic electrical circuit diagram of an adjustable delay inverter using current-starved delay element design style.
Figure 41:
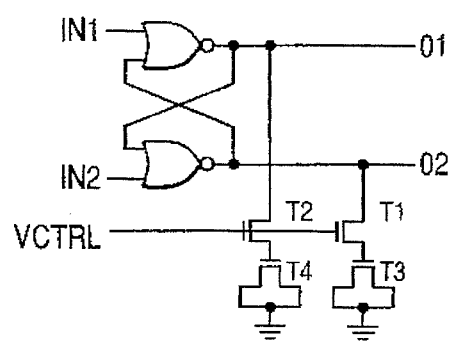
FIG. 41 is a schematic electrical circuit diagram of an adjustable delay logic gate using variable capacitive loading on each logic gate.

FIGS. 39a–b are schematic electrical circuit diagrams of adjustable delay elements using variable supply voltage and selectable inverter chains. FIG. 40 is a schematic electrical circuit diagram of an adjustable delay inverter using current-starved delay element design style. FIG. 41 is a schematic electrical circuit diagram of an adjustable delay logic gate using variable capacitive loading on each logic gate.

Synchronous processors have a maximum clock frequency for reliable operation under all environmental conditions defined for the system. This maximum clock frequency relies heavily upon the accuracy of a design implementation and process parameters for a given manufacturing run. If an error occurs during logic synthesis or if the process parameters change, thereby increasing the critical logic delay, then the clock frequency is reduced to achieve reliable operation. This ability to set the clock frequency according to the resulting implementation and process parameters is important, allowing increased manufacturing yields and use of otherwise broken devices.

Advantageously, for dynamically clocked processing according to the preferred embodiment, implementation errors and miscalculations can be compensated. If the design of dynamic clock generator 402 is correct, processor 400 automatically adapts to variations in process, temperature, and voltage. Nevertheless, the reliable operation of a dynamically clocked structure relies on suitable identification of target critical logic paths and on tracking cells for accurately matching those logic delays.

If too few gates are included in a tracking cell or pulse generator inverter chain, then the resulting processor chip would be non-functional without compensation. To compensate for possible errors, the tracking cell and pulse generator delays can be adjusted through external signals according to the preferred embodiment. This technique of the preferred embodiment is called a KNOB.

A primary function of tracking cell and pulse generator KNOBs is to provide adjustability to the clock characteristics, which are controlled by the clock generator delay elements. The addition of a KNOB transforms these static delay elements into adjustable delay elements. The KNOB adjustments are set during system-board manufacturing. Generally, KNOB adjustments are not dynamically adjusted during normal processor operation. A primary function of a KNOB is to allow an otherwise non-functioning device to operate properly, but with performance reduced from the target level.

Four primary approaches for KNOB implementations are: controlling the supply voltage of selected gates in the logic path, using multiplexers to select between several logic delay paths, using voltage-controlled current-starved logic gates, and adding voltage controlled load capacitors to internal delay element signals. Each of these four primary approaches is discussed hereinbelow.

In the preferred embodiment, the KNOB for STRiP's dynamic clock generator 402 satisfies the following specifications:

(1) The KNOB circuitry, when disabled, does not affect the delay element timing;

(2) The KNOB has a limited number of input control signals (less than four for all generator delay elements);

(3) The KNOB does not add a significant amount of logic to dynamic clock generator 402; and (4) The KNOB operates under worse case conditions and does not reduce the effective operating range of dynamic clock generator 402.

A first approach is shown in FIG. 39a. This approach includes a separate and adjustable supply to selected gates within the tracking cells and pulse generator. To support external CMOS signal levels, the delay element input and output gates are sourced by the nominal supply voltage. This isolates the reduced voltage signals from other parts of clock generator 402.

The input control voltage is VCTRL. As this voltage level is decreased from 5 V, the circuit delay increases. Conversely, a delay element's logic delay decreases as VCTRL is driven above 5 V.

Nevertheless, VCTRL variability is limited to ensure reliable signalling between the reduced voltage gates and the normal supply voltage gates. Also, noise margins are reduced when connecting gates with different input and output signal swings. Other shortcomings of the KNOB approach of FIG. 39a include tight control voltage tolerances, and added complexity to the physical layout of the delay element.

A second approach is shown in FIG. 39b. A decoder is included in the logic path of the delay elements, allowing selection between multiple logic delay paths. The delay control signals VCTRL0 and VCTRL1 are decoded for selection of one logic delay path. Each logic delay path is connected to an increasing number of serial connected logic gates. This structure allows the propagation delay of a delay element to vary according preselected, discrete increments. Shortcomings of this approach include its limited variability, increased number of control signals, and the required amount of implementation logic.

A third approach is shown in FIG. 40. FIG. 40 shows the use of current-starved inverters for adjustable delay elements. Current-starved logic gates can be used to adjust the tracking cells and pulse generator propagation delays. This approach uses a control signal to "current starve" a logic gate through a series-connected device. VCTRL modulates the "ON" resistance of transistor T1 and T2. These variable resistances control the current for charging and discharging the output capacitance. Large values of VCTRL allow a large current to flow, substantially minimizing resistance and delay.

Figure 42:
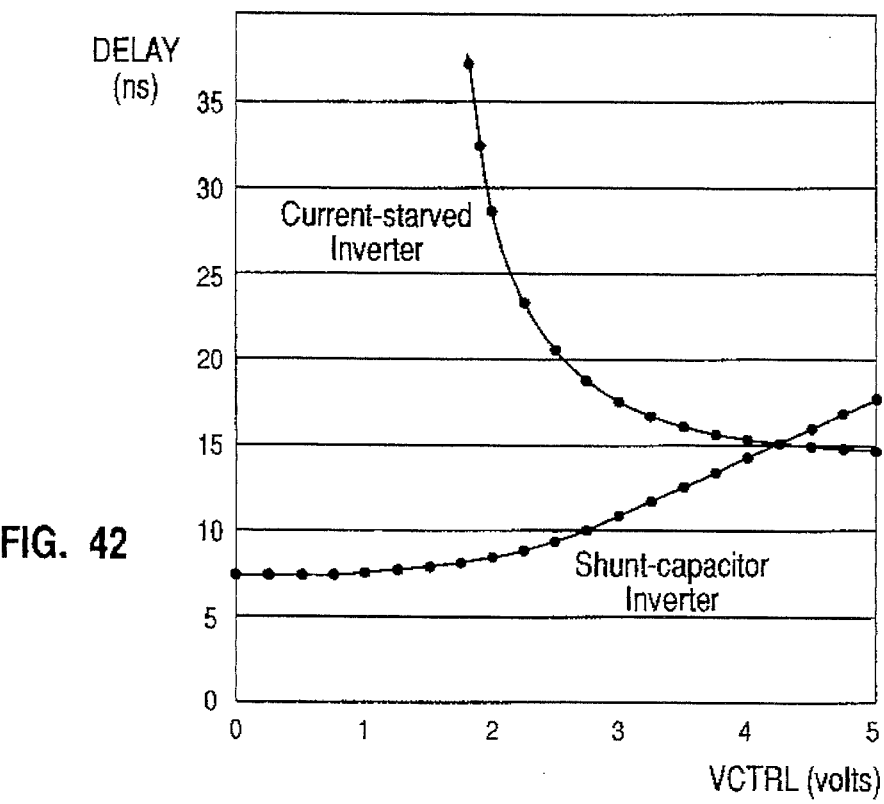
FIG. 42 is a graph of delay versus delay element control voltage assuming worst-case conditions and a 0.8 um CMOS process.

FIG. 42 is a graph of delay versus delay element control voltage assuming worst-case conditions and a 0.8 um CMOS process. FIG. 42 shows delay versus control voltage for a 12 stage inverter chain. A primary shortcoming of the KNOB structure of FIG. 40 is the increased minimum logic delay resulting from the current-mirror circuitry. The minimum propagation delay of a current-starved inverter is approximately twice that of a conventional CMOS inverter. This would increase the difficulty of implementing precise tracking cells. Other shortcomings include susceptibility to crosstalk, noise injection, dc current drawn by the current-mirrors, and noise on the control signal VCTRL.

A fourth approach is shown in FIG. 41. This approach includes shunt transistors connected between large load capacitors at the output of each internal gate. The resistance of a shunt transistor is a function of its gate voltage. The shunt transistors enable VCTRL to control the effective loads presented to the internal gates. The load increases as VCTRL increases, resulting in an increased logic delay.

FIG. 42 shows the delay time versus control voltage for a 12 stage inverter chain using variable capacitive loads at each inverter output. As shown in FIG. 42, VCTRL can vary between the supply voltage rails without disabling the delay element. There is a variation of approximately 3.3 ns/V between VCTRL=2 V–5 V.

Accordingly, the preferred embodiment uses variable-capacitive loads within the tracking cells and pulse generator for the clock generator KNOBs. Using voltage-controlled load capacitors achieves better noise rejection than using current-starved gates. This approach of FIG. 41 uses substantially no dc power and readily provides a 2:1 variation to the propagation delay of each gate. The implementation size of the variable loads should have relatively little impact on the tracking cell and pulse generator layouts.

Figure 43A:
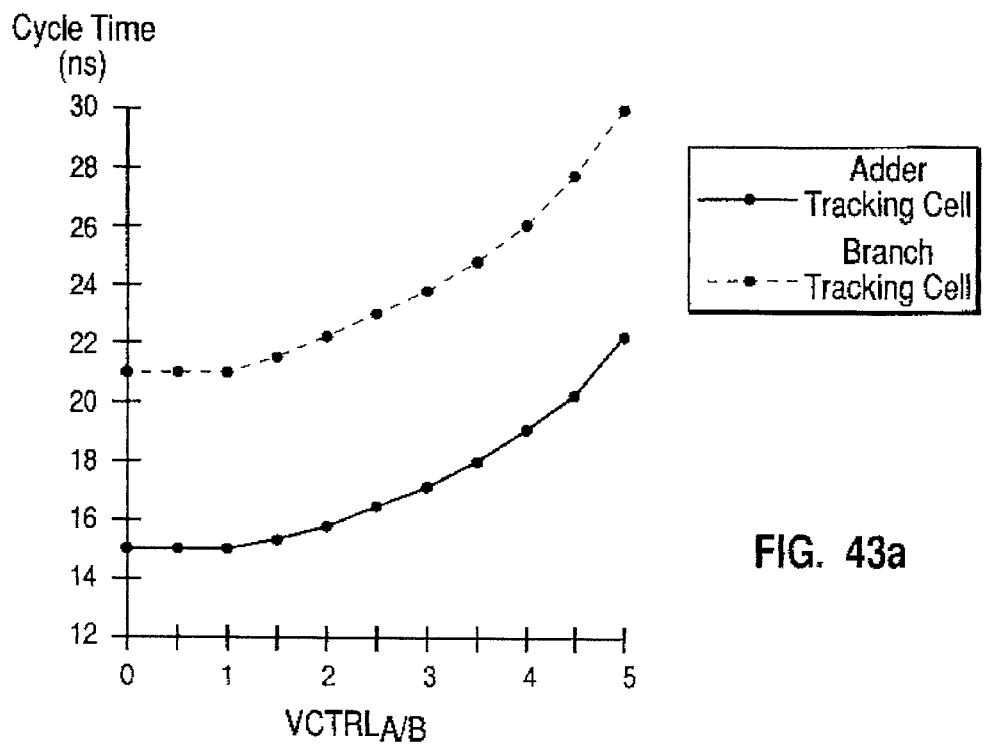
FIGS. 43a–b are graphs of KNOB variability on tracking cell cycle times and pulse generator output pulse.
Figure 43B:
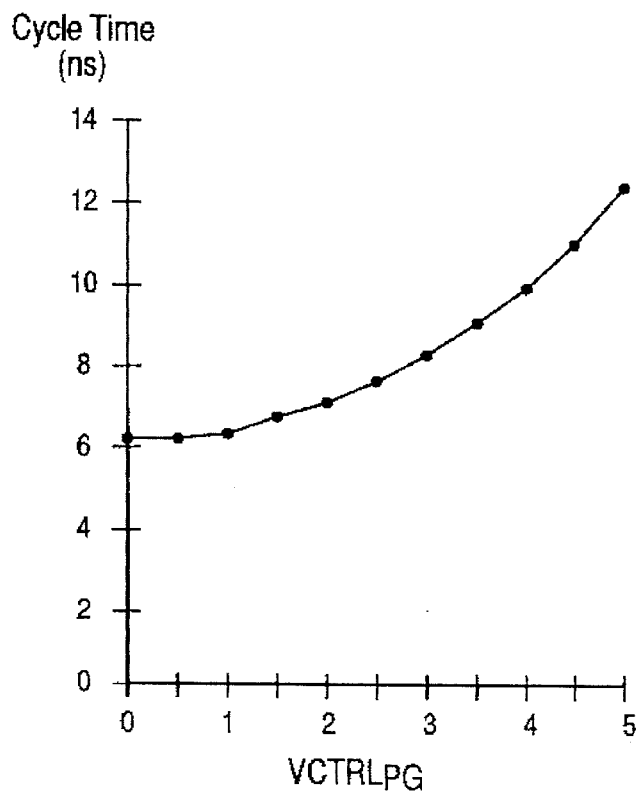

FIGS. 43a–b are graphs of KNOB variability on tracking cell cycle times and pulse generator output pulse, respectively. The addition of voltage controlled variable loads to the clock generator delay elements transforms these delay elements into voltage controlled delay elements (VCDEs). The minimum delays of these elements substantially match the targeted functional operations. If an error occurs during the propagation delay analysis, the propagation delay is modified at the module or board level by modifying the KNOB control voltage.

Two external signals are used, namely VCTRLA/B and VCTRLPG. VCTRLA/B controls the adder, branch, and first-level cache tracking cell delays, and VCTRLPG controls the pulse generator delay. With the KNOB control signals set at 0 V, the clock generator elements operate at their substantially optimum speed.

The shunt transistors have substantially minimum size for minimizing the additional load presented to the logic elements when the KNOB is turned "OFF". The transistor size of the load capacitors is 60/2 for the 2.0 um CMOS process and 20/0.8 um for the 0.8 um CMOS process. The load capacitors are sized so that the maximum load does not adversely affect the internal signal quality. A KNOB is not used for the external interface tracking cell, because the external interface tracking cell's period is externally controlled.

A variable capacitor is located at each internal node of the tracking cells. This additional load has relatively little impact on nodes with large drivers and large loads. Most of the internal tracking cell nodes are driven by minimum size gates with a fanout less than four.

FIG. 43a shows the tracking cell variability provided by the KNOB. FIG. 43a shows the clock period in 2.0 um CMOS varying in response to the KNOB control-input signal. The KNOB achieves a variability of approximately 50% over the minimum tracking cell delay. In FIG. 43a, both the adder tracking cell and the branch tracking cell vary at substantially equal rates, maintaining a delay differential of approximately 30%.

More variability is achieved if each load capacitor is sized relative to the driver capability of each node. The ability to increase the tracking cell delay by 50% is sufficient for most implementations. If an implementation is more than 50% over target, its performance is likely inadequate to support the target system environment.

FIG. 43b shows the pulse generator output variation in response to the KNOB control signal. The plot of FIG. 43b has essentially the same shape as the plots of FIG. 43a. Since the series of inverters for the pulse generator delay element are lightly loaded, a pulse width variability of approximately 100% is achieved over the minimum period. This provides sufficient variability to compensate for almost any miscalculation in the select feedback path or minimum latchable clock pulse width. Notably, the maximum φ1 period is always less than the minimum clock cycle time. Also, the minimum φ2 period is maintained at a practical length, approximately 3 ns.

FIG. 44 is a schematic electrical circuit diagram of a 4-input pseudo-dynamic C-element 350. All transistors of FIG. 44 are 4 x minimum size unless otherwise specified. In dynamic clocking of the preferred embodiment, a single C-element 350 is used for control of the processor 400 pipelined C-element 350 is included in dynamic clock generator 402 and combines outputs from the tracking cells.

C-element 350 signals the pulse generator after all tracking elements have transitioned their respective outputs. By using C-element 350 in this manner, a selected tracking cell with the slowest propagation delay is able to control the cycle period for the next pipeline operation. C-element 350 is important for the accuracy and performance of dynamic clock generator 402.

The output of C-element 350 remains in the same logic state until all its inputs change to the opposite logic state. A primary C-element input constraint restricts each input signal to a single transition (monotonic operation) for each output transition. TABLE 9 is a state-table describing the operation of C-element 350.

TABLE 9

C-element State-Table

| INPUTS | | | | Previous | Resulting |
|---|---|---|---|---|---|
| A | B | C | D | Output State | Output State |
| 0 | 0 | 0 | 0 | x | 0 |
| 0 | x | x | x | 0 | 0 |
| x | 0 | x | x | 0 | 0 |
| x | x | 0 | x | 0 | 0 |
| x | x | x | 0 | 0 | 0 |
| 1 | 1 | 1 | 1 | x | 1 |
| 1 | x | x | x | 1 | 1 |
| x | 1 | x | x | 1 | 1 |
| x | x | 1 | x | 1 | 1 |
| x | x | x | 1 | 1 | 1 |

If the tracking cells substantially match the propagation delays of selected pipelined operations, then the delay of C-element 350 adds overhead to the optimum sequencing period of the pipeline. By optimizing the performance of C-element 350, this overhead is substantially minimized. Advantageously, the C-element delay can provide a level of guard-banding for dynamic clock generator 402. Circuit design guard-banding ensures proper operation under conditions unforeseen during the development process. In the preferred embodiment, the operating characteristics and performance of C-element 350 substantially match the needs of dynamic clock generator 402.

The discussion immediately hereinbelow describes features of C-element 350 in consideration of dynamic clock generator 402.

1. Performance—The nominal propagation delay of C-element 350 is as small as practical. The smaller the delay, the less the need for delay compensation in the tracking cells.

2. Number of Inputs—Since the pipeline structure of processor 400 has four operations to be tracked, C-element 350 is able to input four tracking cell outputs. C-element 350 also has a reset input for initialization. For proper operation of the reset feature, the inputs to C-element 350 are set to the same logic level before the reset input is released. Dynamic clock generator 402 adheres to this condition.

3. Drive Capability—C-element 350 is able to drive 16 standard loads. A standard load is equivalent to the fan-in of a minimum size inverter. As a general rule, a logic gate can have a maximum fan-out of four. Accordingly, the output drive transistors of C-element 350 are four times the size of those in a standard size gate.

4. Fan-in per Input—To substantially minimize the impact of output loading on the total tracking cell delay, C-element 350 fan-in per input is limited to four.

5. Symmetric Output Transitions—The propagation delay for rising and falling output transitions are equal. This condition applies for each input, separately. The propagation delays among different inputs need not be the same. Symmetry is important for minimizing the clock period variation between "like" pipeline operations. By comparison, asymmetry reduces the sequencing accuracy of dynamic clock generator 402, thereby reducing the processor's optimum performance.

6. Reliable Operation—C-element 350 operates reliably under worst-case conditions for supply voltage, temperature, process, and all noise sources. C-element 350 can be implemented with dynamic nodes, so that charge-sharing among series stacked transistors can be a problem. Charge-sharing within C-element 350 can significantly reduce its noise margin and reduce reliable operation.

7. Dynamic Storage—STRiP's logic implementation and analysis assume the use of dynamic latches. This implies a minimum rate for pipeline sequencing. Due to this structure, C-element 350 can also use internal dynamic storage between state changes.

8. Power Consumption—Static power consumption is zero.

In the discussion hereinbelow concerning the C-element, the process parameters used during SPICE simulations were from a MOSIS 2.0 um CMOS process. All schematic electrical circuit diagrams give device sizes in 1. For a 2.0 um process, l=1 u.

In addition to pseudo-dynamic C-element 350 of FIG. 44, alternative C-element implementations include: cross-coupled NOR gates, a majority function gate, a pseudo-NMOS design, a 4-input dynamic C-element, a 4-input dynamic C-element with charge-sharing reduction logic, and a tree of 2-input dynamic C-elements. The schematic electrical circuit diagrams for these implementations are provided hereinbelow in APPENDIX E.

The cross-coupled NOR and majority function implementations are fully-static logic structures. The dynamic C-element implementations have internal dynamic nodes with outputs which are always actively driven. Charge-sharing reduction logic can be added to the 4-input dynamic implementation to improve its operating characteristics.

Pseudo-dynamic C-element 350 fully supports dynamic clock generator 402. Pseudo-dynamic C-element 350 takes advantage of the monotonic input operating condition and achieves a C-element function by using only NMOS transistor stacks. By using only NMOS stacks, the performance of the gate is substantially optimized.

This optimization results from the NMOS switching characteristics and the reduced capacitive load on primary internal nodes. Charge-sharing reduction circuitry is included in the pseudo-dynamic C-element 350 gate to improve reliability. The number of devices in the implementation of C-element 350 is relative large, but does not significantly affect the overall element performance.

The preferred embodiment includes pseudo-dynamic C-element 350. The C-element alternatives were compared to determine which implementation achieves the best operating characteristics and highest performance. Each C-element alternative was analyzed using a SPICE simulator and 2.0 um MOSIS CMOS process models. All measurements were taken at nominal supply voltage levels and temperature, 5 V and 25° C. Operation was checked at worst-case conditions, 4 V and 125° C., to ensure correct behavior but not to check propagation delay. The inputs were connected so that, if series transistor stack exist in the C-element, then input A drives the transistors connected to the deepest internal node and input D drives the transistors connected to the supply nodes.

To study the propagation delay of each C-element alternative, three input transition patterns were used. These input patterns included: (a) inputs BCD change state first (simultaneously) and then input A changes, (b) inputs ABC change state first (simultaneously) and then input D changes, and (c) all inputs change simultaneously. Input pattern (a) provides an understanding of the propagation delay from the minimum delay input. Pattern (b) gives the propagation delay for the worst-case input and also yields the worst-case charge sharing effects. Pattern (c) yields the worst-case propagation delay of the C-element. Another input pattern, inputs ABD changing state first and then input C changing, was also tested to better understand the extent of charge-sharing effects.

TABLES 10, 11 and 12 give results of the performance analysis.

TABLE 10

C-element propagation delay from A to Q with a fanout of 16. Technology = 2.0um CMOS (MOSIS)

| C-element Design | C-element Output Delay from input A | |
|---|---|---|
| | tPLH (ns) | tPHL (ns) |
| pseudo-dynamic | 1.47 | 1.27 |
| dynamic | 2.05 | 1.56 |
| dynamic w/charge-sharing reduction | 2.07 | 1.59 |
| dynamic tree | 2.25 | 2.05 |
| pseudo-NMOS | 2.42 | 1.99 |
| cross-coupled NOR | 3.21 | 2.45 |
| majority function | 3.70 | 3.05 |

TABLE 11

C-element propagation delay from ABCD switched simultaneously to Q with a fanout of 16. Technology = 2.0um CMOS (MOSIS)

| C-element Design | C-element Output Delay from input ABCD switched simultaneously | |
|---|---|---|
| | tPLH (ns) | tPHL (ns) |
| pseudo-dynamic | 2.07 | 2.08 |
| dynamic | 2.12 | 1.89 |

TABLE 11-continued

C-element propagation delay from ABCD switched simultaneously to Q with a fanout of 16. Technology = 2.0um CMOS (MOSIS)

| C-element Design | C-element Output Delay from input ABCD switched simultaneously | |
|---|---|---|
| | tPLH (ns) | tPHL (ns) |
| dynamic w/charge-sharing reduction | 2.40 | 2.45 |
| dynamic tree | 2.60 | 2.45 |
| pseudo-NMOS | 2.65 | 2.45 |
| cross-coupled NOR | 3.83 | 3.05 |
| majority function | 3.84 | 3.57 |

TABLE 12

C-element propagation delay from D to Q with a fanout of 16.

| C-element Design | C-element Output Delay from input D | |
|---|---|---|
| | tPLH (ns) | tPHL (ns) |
| pseudo-dynamic | 2.07 | 2.08 |
| dynamic | failed due to charge sharing | |
| dynamic w/charge-sharing reduction | 2.46 | 2.73 |
| dynamic tree | 2.75 | 2.70 |
| pseudo-NMOS | 2.71 | 2.02 |
| cross-coupled NOR | 3.53 | 2.95 |
| majority function | 3.76 | 3.67 |

Pseudo-dynamic C-element 350 achieves the fastest and most symmetric operating characteristics of all the C-element alternatives. Its propagation delay from the minimum delay input, A, is well below the target criteria with an output transition asymmetry of approximately 15%. The symmetry is further improved by reducing the size of the A input inverter which drives the output transistor stack. This modification increases the tPHL delay to match the tPLH delay.

The SPICE simulation also showed how the charge-sharing reduction circuit bootstraps the output by 0.25 V when inputs BCD change state. The bootstrapping does not affect the reliable operation of the C-element. When all inputs are switched simultaneously, pseudo-dynamic C-element 350 achieves the best operating characteristics. Pseudo-dynamic C-element 350 is approximately 25% faster than the other C-element alternatives for all input patterns.

Charge-sharing was most evident when input D was switched after inputs ABC had changed state. The 4-input dynamic C-element implementation without the charge-sharing circuitry failed with this input sequence. Charge sharing changed the internal node voltage by more than 2.5 V. This was enough to cause the output to switch prematurely. By adding the charge-sharing reduction circuitry to the dynamic design, the negative charge-sharing affects were significantly reduced.

Figure 45:
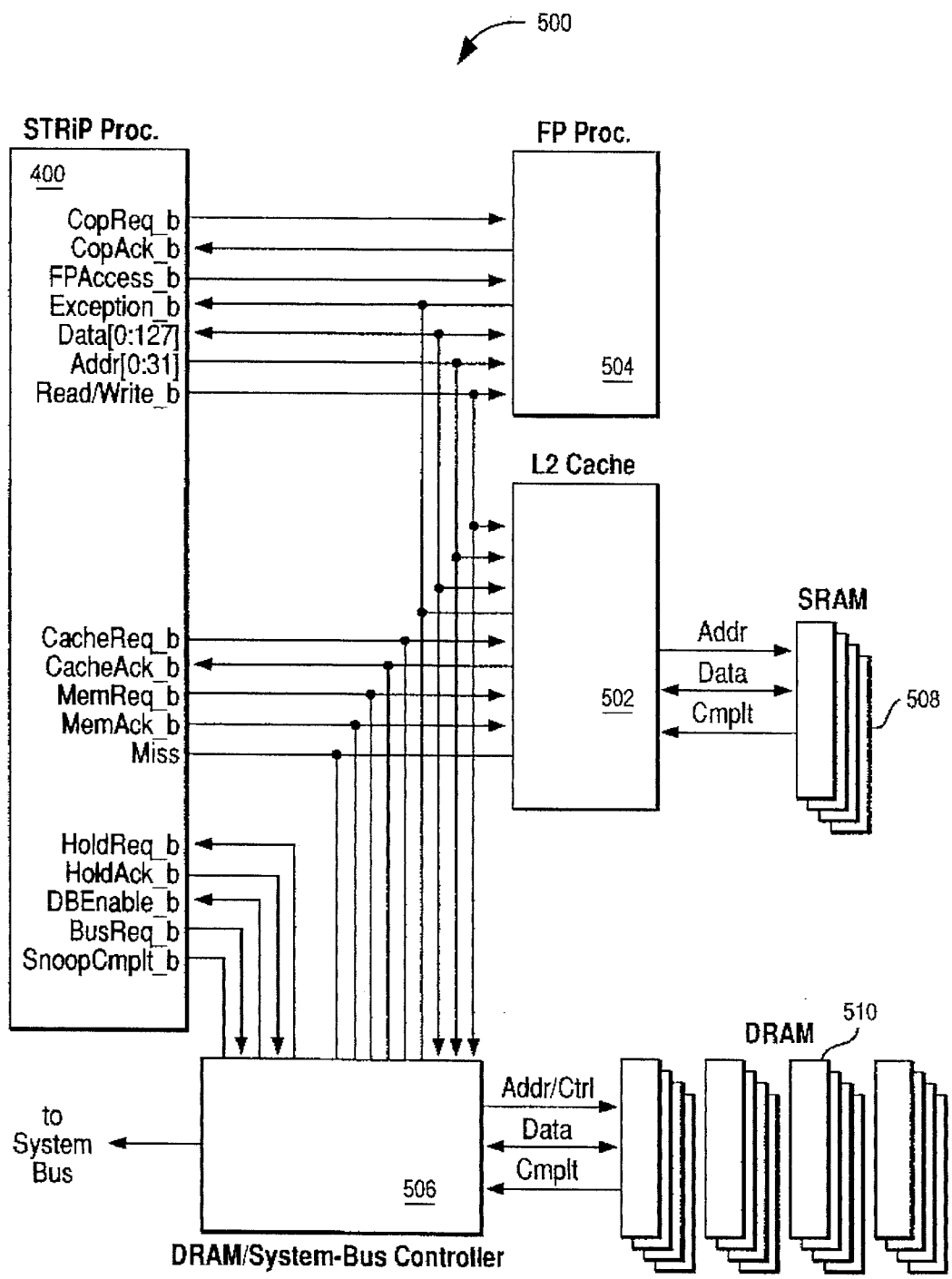
FIG. 45 is a block diagram of a processor subsystem.

FIG. 45 is a block diagram of a processor subsystem 500 including STRiP 400. The connection of STRiP 400 to external devices is achieved by the bus interface unit (BIU) 422 (FIG. 27). BIU 422 substantially minimizes the overhead for external data transfers. All external data transfers with second-level (L2) cache 502, floating point coprocessor 504, and DRAM/system-bus controller 506 use a fully asynchronous handshaking protocol.

This type of interface allows devices and subsystems of different operating speeds to communicate readily and efficiently through a common bus. The processing and data transfer rate of STRiP 400 can differ from an external memory device s data access time and transfer rate. By comparison, a synchronous interface inserts extra delay (cycles) to synchronize communication between two dissimilar devices. With dynamic clocking of the preferred embodiment, the internal clock of STRiP 400 stops during an external transfer until the external device signals completion. This reduces the synchronization overhead and potential metastable conditions common in synchronous interfaces.

The external interface supports an optional second-level copy-back cache 502. For cache coherency, interface signals allow snoop operations to the internal caches. Second-level cache 502 is fully inclusive of the internal first-level cache. Accordingly, the external cache is snooped first, so that snoop bandwidth is reduced to the internal caches.

STRiP 400 has an external communication protocol. Detailed signal descriptions are given in Appendix F.

Many external data transfers are to or from the external memory system. For example, the external memory system can include L2 cache 502 having SRAMs 508 and main system memory having DRAMs 510. External memory transfers result from an internal first-level cache miss, a sequential prefetch, or a first-level data cache copy-back cycle. External read transfers resulting from an internal miss occur while the pipeline is stalled. Prefetch and copy-back cycles can occur in parallel with normal pipeline sequencing. The generic read and write protocol for the asynchronous interface of STRiP 400 is discussed hereinbelow. Notably, the signalling is the same independent of the request type (cache or main memory).

Figure 46:
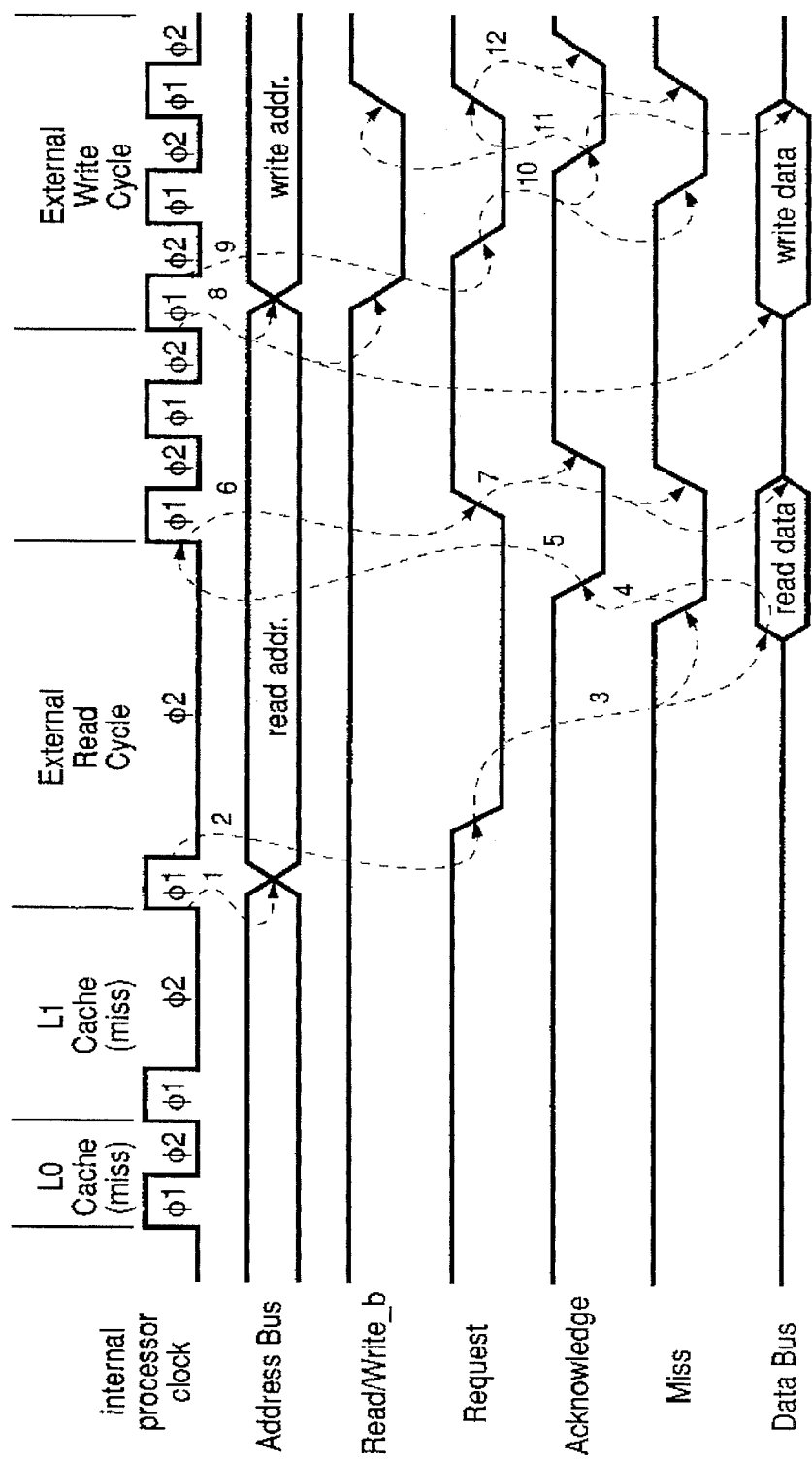
FIG. 46 is a timing diagram showing generic, external read and write cycle signalling.

FIG. 46 is a timing diagram showing generic, external read and write cycle signalling for STRiP 400. FIG. 46 shows the external signal timing supporting an external read (resulting from an internal cache miss), followed by an external write (resulting from a copy-back request). The following discussion describes relative signal transitions (labeled in FIG. 46) to support these transfers.

At point 1, BIU 422 drives the miss address onto the Address Bus at the beginning of φ1. Read/Write_b is also driven high to indicate a read cycle.

At point 2, BIU 422 drives Request active at the beginning of φ2. Address Bus and Read/Write_b setup to Request active is 0 ns (min.).

At point 3, in response to Request, an external memory system access occurs. The requested memory system device drives the accessed location onto the Data Bus. If the accessed location is available, Miss is also driven inactive.

At point 4, after valid data are driven to the Data Bus, the external device drives Acknowledge active. The Data Bus and Miss setup to Acknowledge active is 0 ns (min.).

At point 5, the Data Bus is driven on-chip and latched into the internal caches and target register in response to the rising edge of the internal processor clock. Miss is also sampled to determine if the data are valid. The internal pipeline continues operation, independent of the external cycling of BIU 422.

At point 6, the end of the external read cycle results in BIU 422 driving Request inactive.

At point 7, the external memory system releases the Data Bus, drives Miss high and Acknowledge inactive, indicating that the external bus has been released. Data Bus released and Miss setup to Acknowledge inactive is 0 ns (min.).

At point 8, after BIU 422 recognizes the external data bus has been released, the write-back address and data are driven to the bus, and Read/Write_b is driven low.

At point 9, at the beginning of the next φ2 clock phase, Request is driven active, starting a write cycle. Address Bus, Data Bus, and Read/Write_b valid to Request active is 0 ns (min.).

At point 10, after the external memory system successfully completes the write access, it drives Miss low and Acknowledge active. Miss setup to Acknowledge active is 0 ns (min.).

At point 11, BIU 422 drives Read/Write_b high, tri-states the Data Bus, and drives Request inactive. Read/Write_b high and Data Bus tri-state setup to Request inactive is 0 ns (min.)

At point 12, the external device completes the protocol by driving Miss and Acknowledge high. Miss high to Acknowledge inactive is 0 ns (min.).

Although the full protocol is based on a 4-phase asynchronous handshaking protocol, the read latency presented to processor 400 is comparable to a 2-phase protocol. Accordingly, the transfer latency is primarily a function of the external device's access time, because most of the communication overhead is eliminated. BIU 422 uses fundamental mode logic structures to handle the asynchronous signalling between parallel processor requests and external device handshaking. This is because the end of the read-cycle handshaking and the entire write cycle occur in parallel with the internal-pipeline sequencing of subsequent instructions.

Notably, only signal setup times are specified, relative to Request and Acknowledge. All setup times are 0 ns (min) and are enforced by the device driving the control signals. Hold times are automatically enforced by the asynchronous protocol. The protocol operates properly independent of the connected devices' processing rates. Since the interconnection of asynchronous devices is correct-by-design, very little timing analysis is necessary by a system designer.

To ensure reliable operation, the Request and Acknowledge wire delays and loads are greater than or equal to the other interface signals (e.g. Address Bus, Data Bus). This ensures the setup times as presented to the receiving device. Synchronous interfaces can readily mask mismatches in control signal loading, but asynchronous interfaces rely heavily on the control of these circuit board delays. Conventional synchronization logic is used for handling input signals which occur asynchronous to the pipeline sequencing (external interrupts or bus requests).

Dynamic clocking of the preferred embodiment supports a fully asynchronous interface without synchronization overheads resulting from mismatches in device operating rates. The ability to stop the clock during external stall cycles is an efficient technique for communications without metastable conditions. Asynchronous interrupt inputs and bus-request signals are handled in a manner comparable to that of synchronous processors, but these signals are not in the critical processing path of processor 400. Accordingly, the external interface of STRiP 400 interconnects devices independent of their processing rates, without imposing synchronization overheads or 4-phase latencies.

To support precise exceptions, STRiP 400 delays processor state changes until the final pipeline stage (WB). Data/instruction transfers to external processors (coprocessors and floating-point processors) are also delayed until the final pipeline cycle. Instructions executed by the pipeline are issued and retired in order. Accordingly, after an exception occurs, all instructions in the pipeline are restartable. Due to this feature, STRiP 400 does not allow instructions in the pipeline to complete after an exception is received. This is true independent of which instruction caused the exception.

Floating point operations are issued and retired in order of their occurrence. Nevertheless, since the external floating point processor operates asynchronously, relative to the scalar pipeline, floating point operations are retired out-oforder, relative to the scalar instruction stream. Software interlocks can be used to ensure ordering where necessary. Such interlocks are not preferred, because they restrict parallel processing of the scalar and floating point operations.

To handle floating point exceptions, the floating point processor stores the issued chain of encoded operations which have not been retired (not instruction addresses such as the PC Chain). The floating point processor halts its pipeline sequencing after a floating point exception is detected, and the floating point processor remains idle until the scalar processor services the exception. Accordingly, the floating point exceptions are not precise relative to the scalar instruction stream, but are precise relative to the issue order of floating point operations.

In response to an exception, the pipeline is halted, and the PC is set to zero (exception vector address). The PC Chain is preserved so that the addresses of the instructions in the RF, ALU, and MEM pipe stages can be saved. The PSWcurrent bits are saved into PSWother, interrupts are turned off, and the machine is placed into system mode. The exception handler saves the PC Chain and PSWother values before enabling interrupts and PC Chain shifting. After the exception is resolved, the PC values are restored in the PC Chain, and three jumps are executed using the contents of the PC Chain (jpcrs and two jpc instructions). Since exceptions occur infrequently, little performance is sacrificed by not completing instructions in the pipeline before the exception point.

Exceptions also result from external data transfer errors or internal computation faults. External exceptions such as interrupts and page-faults are asynchronous events. An interrupt input provides a maskable processor interrupt input for I/O devices requesting service by the processor. The interrupt input is normally driven independent of any external processor transfer cycle. The interrupt input is synchronized with the dynamic clock sequencing signal of STRiP 400. STRiP 400 uses the same techniques used to synchronize asynchronous inputs to a synchronous processor clock. Since a synchronous processor does not respond to an interrupt input during a stall condition or external transfer, the stopping of the dynamic clock of STRiP 400 during external cycles does not reduce the response time to an interrupt.

The non-maskable interrupt signal supports error detection based on an external memory system transfer. This exception can result from errors including page-faults (detected by the TLB), and parity checks and ECC errors (detected by the memory system controllers). The non-maskable interrupt has a setup time of 0 ns (same as for data) to the acknowledge signal driven by the communicating device. This allows processor 400 to begin exception handling during the next cycle and avoid irreparable changes to the processor's state. Accordingly, the non-maskable interrupt does not need synchronization, because by definition it is synchronous with the end of an external transfer. Data are discarded on prefetch cycles which cause a non-maskable interrupt, and the interrupt is ignored. Memory faults resulting from alternate bus masters (e.g. DMA) are handled through a non-maskable asynchronous interrupt input.

Internal exceptions result from overflow operations (trap-on-overflow) and trap instructions. They occur synchronous to the pipeline sequencing. This allows internal exceptions to be accepted and serviced before the processor s state is irreparably changed. The trap-on-overflow interrupt is maskable by setting a bit in the processor status word register. When a trap-on-overflow occurs, another bit is set in the PSW. The exception handling routine checks this bit to determine whether the exception resulted from an overflow.

Trap instructions operate in a manner unchanged from the MIPS-X implementation. The trap instructions are unconditional software interrupts which vector the processor to a system space routine in low system memory. The trap instructions have all 8-bit vector number which provides 256 possible trap addresses. These vectors, when shifted by three bits, are addresses of the vector routines in low system memory. By separating the vector addresses by eight instructions, a short routine provides a jump to an appropriate trap handler.

Figure 47:
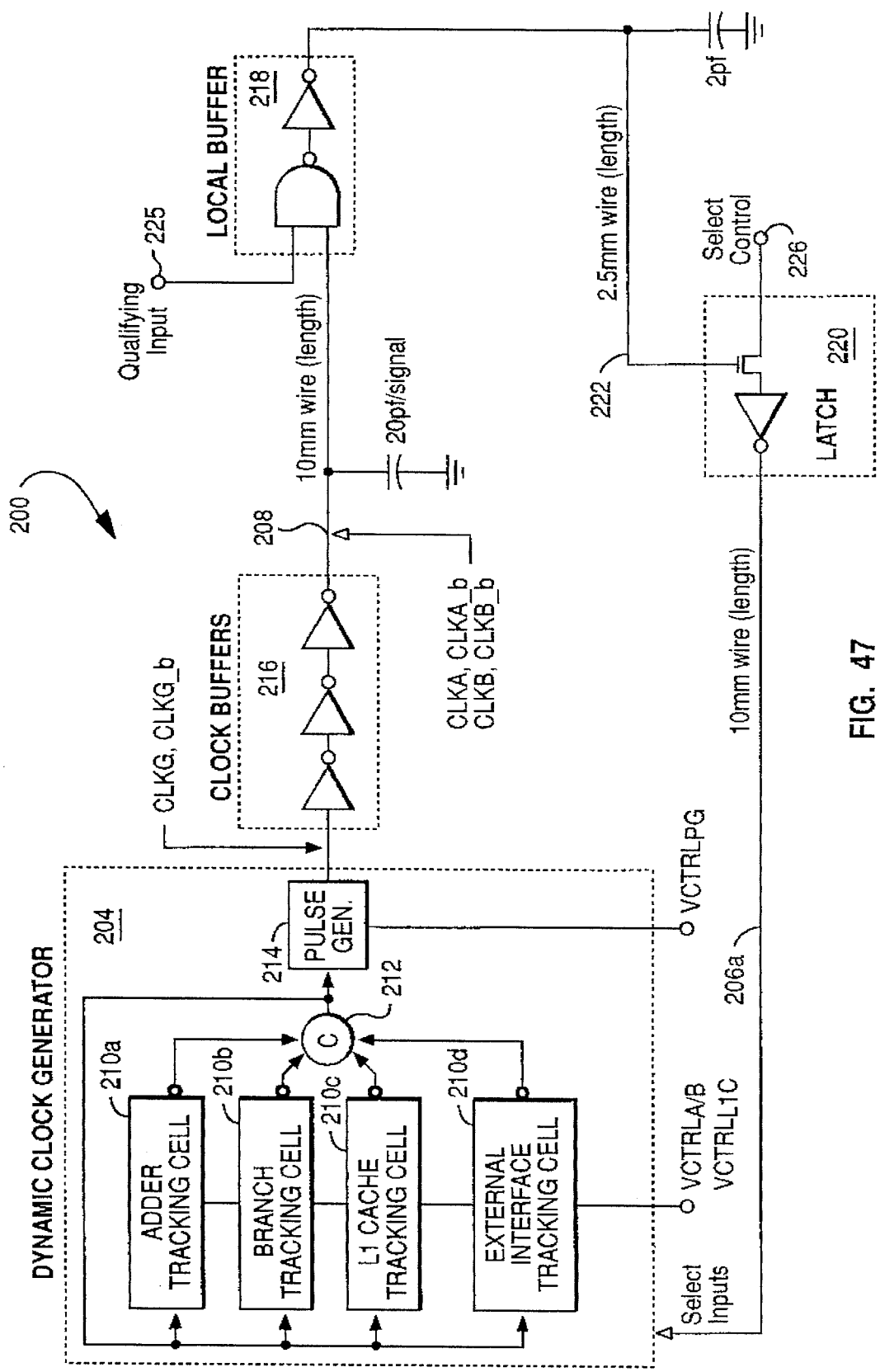
FIG. 47 is a block diagram of a dynamic clocking digital system used for a SPICE simulation.

FIG. 47 is a block diagram of a dynamic clocking digital system 200 used for a SPICE simulation. Referring also to FIGS. 10 and 27, to analyze the functionality and performance of the dynamic clocking structure of STRiP 400, a SPICE model was generated to match the physical layout characteristics of the clock distribution network. MIPS-X clock distribution network parameters were used as a model for analyzing the feasibility of a dynamically clocked RISC pipeline.

All clock network loads and wire lengths were based on the layout results of the MIPS-X pipeline. Signal quality, tracking cell selectability and performance, cycle-to-cycle symmetry and stability, clock skew, select feedback delay, and performance under worst-case conditions were a few key parameters analyzed. The select feedback signals were sequenced to provide a mix of cycle lengths, testing cycle-to-cycle interactions. The majority of the analysis used a MOSIS 2.0 um CMOS process model, but 0.8 um CMOS and BiCMOS process models were used to analyze the scalability and potential performance of a dynamic clocking structure.

Throughout the simulation analysis, no adverse affects resulted from dynamic clocking structure 200. TABLE 13 is a summary of the key parameters measured during the simulation.

TABLE 13

Performance parameters measured during SPICE simulation of dynamic clocking structure.

| Measured Parameters | 2.0um CMOS | | 0.8um CMOS | | 0.8um BiCMOS typical |
| --- | --- | --- | --- | --- | --- |
| | typical | worse case* | typical | worse case* | |
| Gate delay, inverter with fanout = 4, (ns) | 0.9 | 1.75 | 0.45 | 0.80 | 0.35 |
| Minimum cycle time (ns) | 15.0 | 27.0 | 7.5 | 14.5 | 5.5 |
| Branch cycle time | 21.0 | 35.5 | 10.5 | 19.0 | 8.0 |

TABLE 13-continued

Performance parameters measured during SPICE simulation of dynamic clocking structure.

| Measured Parameters | 2.0um CMOS typical | 2.0um CMOS worse case* | 0.8um CMOS typical | 0.8um CMOS worse case* | 0.8um BiCMOS typical |
|---|---|---|---|---|---|
| L1 Cache cycle time (ns) | 40.0 | 72.0 | 18.5 | 32.5 | 15.0 |
| φ1 period (ns) | 7.0 | 12.6 | 3.5 | 6.3 | 3.0 |
| Clock Gen. to selects (ns) | 6.5 | 11.8 | 3.0 | 5.4 | 3.0 |
| Clock startup time (ns) | 7.0 | 12.6 | 3.5 | 6.5 | 2.5 |
| C-element delay, min., (ns) | 1.47 | | 0.68 | | 0.53 |
| High level output voltage | 5 | 4 | 5 | 4 | 4.25 |
| Low level output voltage | 0 | 0 | 0 | 0 | 0.75 |
| Effective clock rate (MHz) | 63 | 35 | 120 | 65 | 175 |

*Worse case conditions -- Vcc = 4.0V, Temperature = 125° C., Process = nominal

The worst-case conditions of Vcc=4.0 V and Temp.=125° C. were chosen to analyze the tracking characteristics and functionality of dynamic clocking under extreme operating conditions. Dynamic clock generator 204 drives clock distribution network 208 in a manner comparable to that of a MIPS-X synchronous, static-frequency clock generator. However, a significant difference in dynamic clock generator 204 is the manner in which the clock sequencing signal is generated, as discussed further hereinabove in connection with FIGS. 10–15.

The drivers for driving the global and local clock signals are structurally unchanged from MIPS-X (except in the BiCMOS situation). Accordingly, the global-clock and local-clock signal quality, and the response characteristics, are very comparable to those of the MIPS-X implementation. Dynamic clocking does not adversely affect the drive quality of the clock signals.

Advantageously, dynamic clocking allows the processor operating rate to be substantially as fast as the semiconductor technology is able to support. This capability allows a dynamically clocked processor to operate approximately 100% faster than a corresponding synchronous processor implementation. A normal operating rate for STRiP 400 is approximately three times faster than that achieved by MIPS-X with the same 2.0 um CMOS process.

TABLE 14 lists elements of STRiP 400 which achieve performance benefits relative to the MIPS-X implementation, together with the amount of performance benefit achieved.

TABLE 14

Estimated performance improvement, over MIPS-X, attributed to dynamic clocking and the use of high speed functional units.

| PERCENT | CONTRIBUTING ATTRIBUTE |
|---|---|
| 75% | Not requiring worse-case operating frequencies under nominal operating conditions. |
| 25% | Matching the required pipeline period to the pending operations. |

TABLE 14-continued

Estimated performance improvement, over MIPS-X, attributed to dynamic clocking and the use of high speed functional units.

| PERCENT | CONTRIBUTING ATTRIBUTE |
|---|---|
| 50% (peak) | Using an asynchronous external interface. |
| 125% | Using the high-speed static adder, 3-port register file, and fully-addressable prefetch buffer. |

Implementation of a dynamically clocked processor can involve more detailed analysis than for a corresponding synchronous processor design. Three primary considerations should be addressed during the development process. A first consideration is to ensure that the propagation delays of the tracking cells substantially match the processing delays of their respectively associated functional operations. If the tracking cells are implemented according to the discussion hereinabove, their accuracies should not be a serious problem.

A second consideration is the determination of which critical logic paths are most frequently used and dominate the data processing patterns in the processor pipeline. This determination impacts the decision of which logical operations to track. Commercially available simulation and diagnostic tools can assist this analysis. Some RISC processors might be suited for a different set of tracking cells in a dynamically clocked implementation than those discussed hereinabove in connection with MIPS-X.

A third consideration is the response time of the functional units that operate the select inputs. This response time determines the width of the φ1 period. Preferably, the response time is less than half the minimum cycle time of the pipeline. Since the response time is a function of the clock distribution network, all parameters affecting the select signals should be fully evaluated. For existing systems, such parameters can be readily determined.

Figure 48:
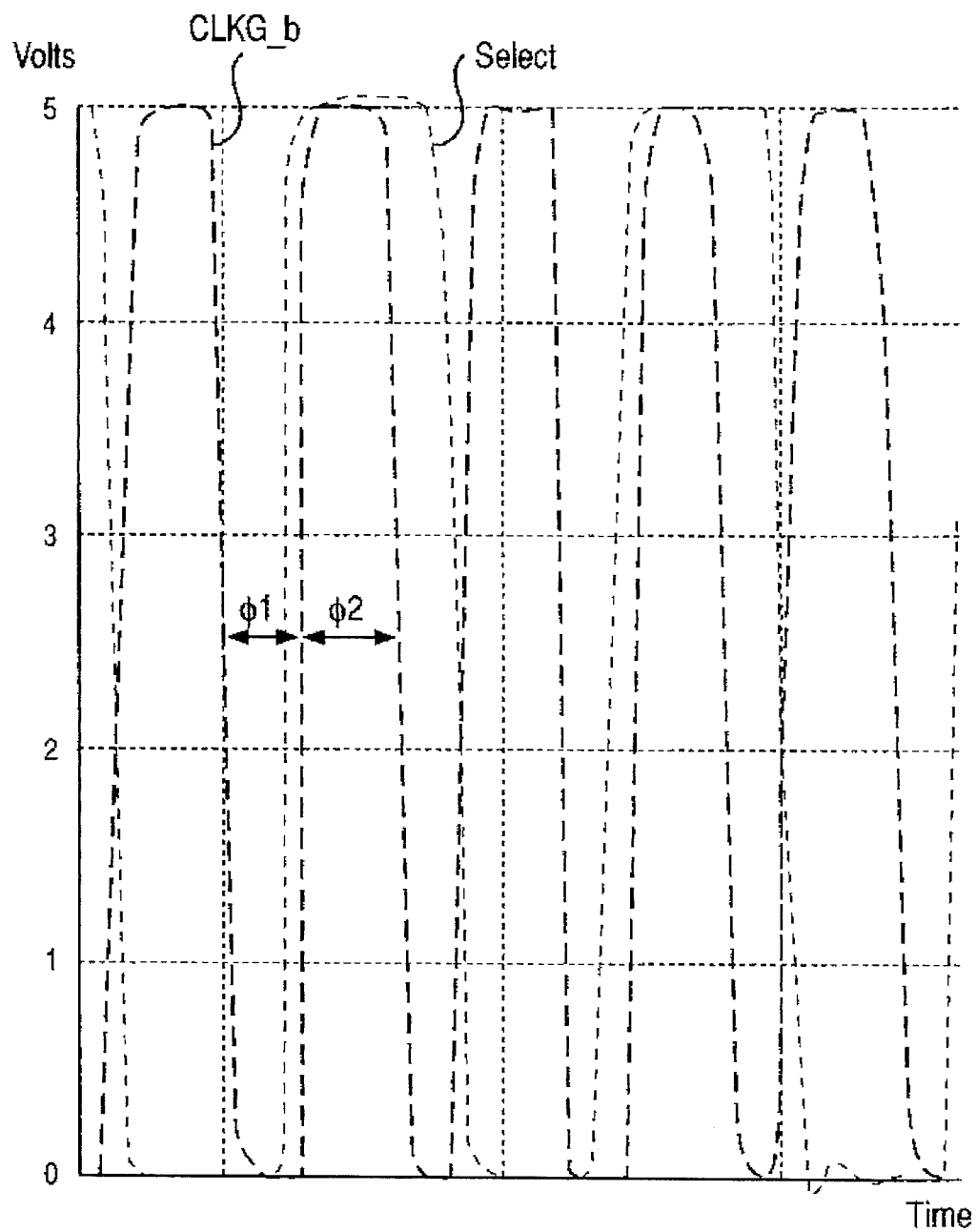
FIG. 48 is a graph of clock generator output and select feedback delay.

FIG. 48 is a graph of clock generator output and select feedback delay. FIG. 48 shows the relationship between the output of clock generator 204 and select input 206a according to the simulation model. The plot of FIG. 48 is representative of the select signal response for all technologies simulated. Notably, the select setup time to the rising edge of the clock is approximately 0.5 ns. This is sufficient for achieving reliable clock generator operation under all possible conditions.

Relative to MIPS-X, dynamic clocking fully uses the available semiconductor performance without substantially reducing the system reliability and without substantially increasing the processor s complexity. Dynamic clocking also supports a fully asynchronous external interface, achieving efficient data transfer independent of the processing rates of the communicating devices. By varying the processor's cycle time according to process, voltage, temperature, and pipeline operations, approximately 100% more performance is achievable under normal operating conditions.

Since synchronous structures are sequenced based on worst-case operating conditions, they use only approximately 50% of the available semiconductor performance under nominal operating conditions. The complexity of conventional asynchronous implementations is increased by dual-rail encoding of logic variables to provide completion detection. This complexity, together with sequencing overheads resulting from completion signalling, significantly reduce the performance and increase the design time of a conventional asynchronous structure.

By comparison, dynamic clocking of the preferred embodiment achieves adaptive lock-step sequencing of the processor's pipeline and a fully asynchronous external interface. According to the preferred embodiment, lock-step operation of a processor's pipeline is efficient, and the cycle-by-cycle sequencing adapts to present environmental conditions, process parameters, and pipeline operations. Moreover, a fully asynchronous external interface allows the interconnection of devices independent of their processing rate. The logic structures of a dynamically clocked pipeline are compatible with synchronous logic structures, substantially avoiding the complexities of conventional asynchronous structures. The fully asynchronous external interface of the preferred embodiment is supported by the ability to quickly start and stop the clock, without synchronization overheads or metastable conditions.

STRiP 400 is compatible with conventional functional unit implementations. Further, STRiP 400 includes zero-level caches and predictive prefetching. Zero-level caching with predictive prefetching reduces the memory system's average access time by more than 50%, thereby removing the memory system from the pipeline's critical logic paths. Moreover, zero-level caches substantially avoid increasing the processor's CPI rating. In a 0.8 um CMOS process, STRiP 400 achieves an average sequencing rate of at least 120 MHz. In a 0.8 um BiCMOS process, STRiP 400 achieves an average sequencing rate of at least 175 MHz.

An alternative embodiment includes interactive multiple on-chip dynamically-clocked devices. For example, a dynamically-clocked processor can interact with a dynamically-clocked floating-point unit, both operating asynchronously to each other. Concerning predictive prefetching, an alternative embodiment stores and uses a history of data reference strides to predict future data references. In combination with the data reference history, stride prediction could significantly reduce the average access time for data references.

Although an exemplary embodiment of the present invention and its advantages have been described in detail hereinabove, they have been described as example and not as limitation. Various changes, substitutions and alterations can be made in the exemplary embodiment without departing from the breadth, scope and spirit of the present invention. The breadth, scope and spirit of the present invention should not be limited by the exemplary embodiment, but should be defined only in accordance with the following claims and equivalents thereof.

APPENDIX A

Memory System Terminology

Internal and External:

According to the preferred embodiment, internal refers to a logic structure which resides on the processor chip. External refers to a logic structure which is implemented off the processor chip or whose interface crosses the processor chip's interface pins.

Word:

According to the preferred embodiment, a word is 32-bits or 4-bytes.

Cache:

According to the preferred embodiment, a cache is a small memory subsystem that at any one time can hold the contents of a fraction of the overall memory of the machine. A primary function of a cache is to provide a fast local storage of most recently and most frequently accessed data and instruction references.

Zero-Level Cache:

According to the preferred embodiment, a zero-level cache is a fully-addressable prefetch buffer located between the CPU and the first-level cache. A zero-level cache of the preferred embodiment is very small (less than 64 words), fully associative, and uses a prefetch strategy to substantially minimize its miss rate. STRiP 400 includes a zero-level instruction cache and a zero-level data cache.

First-Level Cache:

According to the preferred embodiment, a first-level cache is also called the primary cache. In conventional system structures, the first-level cache is the first storage layer in the memory system hierarchy. Many advanced processor chips include internal first-level caches which range in size from 1K words to 4K words. By comparison, in the STRiP architecture of the preferred embodiment, the first-level instruction and data caches are the second layer in the memory hierarchy.

Second-Level Cache:

In a multi-level cache hierarchy, the second-level cache is located beyond the first-level cache. In the preferred embodiment, the second-level cache ranges in size from 16K words to 512K words. Second-level caches are normally formed by discrete SRAMs. Second-level caches are also refererred to as secondary caches.

Main Memory:

According to the preferred embodiment, main memory is the memory subsystem located beyond any cache in the system. Main memory is frequently considered the last level in the memory hierarchy (if the magnetic media storage is not counted as a level). Normally, the main memory is formed by DRAMs and ranges in size from 256K words to 256M words.

Block:

A block is also referred to as a line. A block of the preferred embodiment is the minimum unit of information directly addressable in the cache. Each block has an address tag. In the preferred embodiment, the block size can range from one word to 32 words. A block can be divided into sub-blocks if the cache fetch size is smaller than the block size.

Tag:

According to the preferred embodiment, a cache tag is a unit of storage for defining the main memory address of a stored unit of data. The tag indicates which portion or block of main memory is currently occupying a cache block.

Fetch and Prefetch Size:

According to the preferred embodiment, fetch and prefetch size are the amount of memory fetched or prefetched from the next level in the memory hierarchy. In the preferred embodiment, a data fetch occurs only in response to a request by the CPU, and a data prefetch is generated independent of the CPU's operation and attempts to fetch data in advance of a CPU's request. Fetch size is also known as the transfer size and sub-block size.

Fetch and Prefetch Strategy:

Fetch and prefetch strategy is the technique for determining when a fetch of data from the next level in the memory hierarchy is to be initiated, which address is to be fetched, and which word or group of words is to be returned first.

Replacement Strategy:

Replacement strategy is the technique for choosing which block will receive a newly fetched block of data. Common replacement strategies are Random and Least Recently Used (LRU).

Set-Associativity:

According to the preferred embodiment, a set is a collection of two or more blocks which are addressed and checked in parallel. If there are n blocks in a set, the cache is referred to as n-way set-associative. If there is one block per set (each block has only one place it can appear in the cache) the cache is referred to as direct-mapped. The cache is fully associative if the cache is formed by only one set (a block can be placed anywhere in the cache).

Hit or Miss:

According to the preferred embodiment, a hit occurs when the requested memory address is found in a cache. A miss occurs when the requested memory address is not found in the cache.

Write Strategy:

Write strategy is a collection of details concerning the handling of writes in a cache. Two write-hit options are: (1) a write-through policy where the information is written to both the cache block and the next level in the memory hierarchy and (2) a copy-back or write-back policy where the information is written only to the cache block. Two write-miss options are: (1) a write-allocate policy where the block is loaded from the next level in the memory hierarchy followed by performance of the write-hit policy and (2) a no-write-allocate policy where the cache is not modified on a write miss and where the data are only written to the next level in the memory hierarchy. The write-hit and write-miss strategies combine to form the cache's write policy. Common write policies are copy-back write-allocate (CBWA) and write-through no-write-allocate (WTNWA).

Spatial Locality:

Spatial locality is a property where, given a memory location referenced by a program, there is a high probability that neighboring locations will be referenced during the program's execution.

Temporal Locality:

Temporal locality is a property where, given a memory location referenced by a program, there is a high probability that it will be referenced again during the program's execution.

Instruction Sequentiality:

Instruction sequentiality is a property where, given an instruction reference to memory location n, there is a high probability that the next instruction reference will be to memory location n+1. This is a subset of the spatial locality property and contributes significantly to the effectiveness of prefetch strategies of the preferred embodiment.

APPENDIX B

Signal Naming Convention

The naming convention for STRiP's signal names is unchanged from that of MIPS-X. A primary purpose of a naming convention is to ensure consistency in signal labels throughout the implementation procedure.

In the preferred embodiment, a signal name includes three portions, the signal's functional name, its active sense, and the signal type. The format of the signal name is Signal-Function_Sense_Type. The signal's functional name provides information concerning the control/data conducted by the signal wire (e.g. TakeBranch, ReadWordLine, ResultBus). If a signal is active "high", the "_Sense" portion of the signal name is omitted. An active "low" signal, or a signal which has been complemented, has a "_b" in the "_Sense" portion of the signal name. An example of this is ResultBus_b. The "_Type" portion of the signal name is described as follows:

| | |
|---|---|
| _s1 | Stable $\phi 1$ |
| _s2 | Stable $\phi 2$ |
| _v1 | Valid $\phi 1$ |
| _v2 | Valid $\phi 2$ |
| _q1 | Qualified $\phi 1$ |
| _q2 | Qualified $\phi 2$ |
| _dc | DC signal |
| _w1 | Weird $\phi 1$ (all signal types occurring during $\phi 1$ which are not described by one of the above $\phi 1$ signal types) |
| _w2 | Weird $\phi 2$ (all signal types occurring during $\phi 2$ which are not described by one of the above $\phi 2$ signal types) |
| _w | Weird (all signal types occurring asynchronously to the phases of the clock) |

By definition, a stable signal is constant throughout the specified phase. A valid signal can change state during the specified phase but is constant before and during the falling edge of that phase. A qualified signal is formed by logically ANDing a signal with a clock, which is active high on the specified phase. If a signal can be associated with a pipeline stage, a letter is appended to the end of the signal type:

| | |
|---|---|
| i | IF pipeline stage |
| r | RF pipeline stage |
| a | ALU pipeline stage |
| m | MEM pipeline stage |
| w | WB pipeline stage |

Exemplary signal names are: TakeBranch_b_s2a, ResultBus_b_v2a, and IncDrvResBus_q2.

APPENDIX C

SPICE Parameters

The following SPICE model cards were used during STRiP simulations. They are representative of semiconductor processes for manufacturing commercial microprocessors. Normal environmental conditions for simulation were Vcc=5.0 V and Temp.=25° C. Worse case environmental conditions for simulation were Vcc=4.0 V and Temp.=125° C.

SPICE model cards for NMOS and PMOS transistors representing a 2.0 um MOSIS CMOS process (typical).

```
*
*
.MODEL NT NMOS (LEVEL=2
+LAMBDA=1.991479e-2        LD=0.115U          TOX=423E-10
+NSUB=1.0125225E+16        VTO=0.822163       KP=4.893760E-5
       GAMMA=0.47
+UEXP=5.324966E-3          PHI=0.6            UO=599.496
       CRIT=12714.2
+DELTA=3.39718E-5          VMAX=65466.1       .XJ=0.55U   RSH=O
+NFS=5.666758E+11          NEFF=1.0010E-2     NSS=0.0   TPG=1.00
+CGSO=0.9388E-10           CGDO=0.9388E-10    CJ=1.4563E-4
+MJ=0.6                    CJSW=6.617E-10     MJSW=0.31)
*
.MODEL PT PMOS (LEVEL=2
+LAMBDA=4.921086E-2        LD=0.18U           TOX=423E-10
+NSUB=1.421645E+15         VTO=-0.776658      KP=1.916950E-5
       GAMMA=0.52
+UEXP=0.142293             PHI=0.6            UO=234.831
       UCRIT=20967
+DELTA=1.0E-6              VMAX=34600.2       XJ=0.50U   RSH=0
+NFS=4.744781E+11          NEFF=1.0010E-2     NSS=0.0
       TPG=-1.00
+CGSO=1.469E-10            CGDO=1.469E-10     CJ=2.4E-4
+MJ=0.5                    CJSW=3.62E-10      MJSW=0.29)
*
*
```

SPICE model cards for NMOS and PMOS transistors representing a 0.8 um CMOS or BiCMOS process (typical).

```
*
*
.MODEL NT NMOS (LEVEL=3
+ VTO=0.77       TOX=1.65E-8     UO=570          GAMMA=0.80
+ VMAX=2.7E5     THETA=0.404     ETA=0.04        KAPPA=1.2
+ PHI=0.90       NSUB=8.8E16     NFS=4E11        XJ=0.2U
+ CJ=6.24E-4     MJ=0.389        CJSW=3.10E-10   MJSW=0.26
+ PB=0.80        CGSO=2.1E-10    CGDO=2.1E-10    DELTA=0.0
+ LD=0.0001U     RSH=0.50)
*
.MODEL PT PMOS( LEVEL=3
+ VTO=-0.87      TOX=1.65E-8     UO=145          GAMMA=0.73
+ VMAX=0.00      THETA=0.223     ETA=0.028       KAPPA=0.04
+ PHI=0.90       NSUB=9E16       NFS=4E11        XJ=0.2U
+ CJ=6.5E-4      MJ=0.42         CJSW=4.0E-10    MJSW=0.31
+ PB=0.80        CGSO=2.7E-10    CGDO=2.7E-10    DELTA=0.0
+ LD=0.0001U     RSH=0.50)
*
*
```

SPICE model cards for bipolar transistors representing a 0.8 um BiCMOS process (typical).

```
*
*
MODEL b1.6 NPN
+is=1e-18      ikf=4ma     bf=100      br=20       Vaf=25      Var=3V
+Rc=50         Rc=400      Rb=800
+tf=15ps       tr=400ps
+Cje=8fF       Vje=0.9     mje=0.3
+Cjc=8fF       Vjc=0.5     mjc=0.2
+Cjs=30fF      Vjs=0.5     mjs=0.3
+nf=1.0        Eg=1.20     nc=1.5      xcjc=0.5    fc=0.5
*
*
```

APPENDIX D

STRiP's Instruction Set

STRiP 400 has a 32-bit data flow between datapath units and uses a relatively streamlined instruction set. Instructions are grouped into four instruction formats.

FIG. 49 is an illustration of the STRiP (MIPS-X) instruction formats. FIG. 49 shows the bit-fields used in each instruction format. There are 10 memory instructions (including coprocessor/floating-point (FP) processor transfer instructions), 12 branch instructions, 17 compute instructions, and seven compute immediate instructions.

TABLES 15 and 16 list the STRiP (MIPS-X) instructions.

TABLE 15

STRiP (MIPS-X) Memory and Branch instructions.

| Instruction | Operands | Operation | Comments |
|---|---|---|---|
| *Memory Instructions (including coprocessor/FP processor transfers)* | | | |
| ld | X[SRC1],DEST | DEST: M[X + SRC1] | Load |
| st | X[SRC1],SRC2 | M[X + SRC1]: SRC2 | Store |
| ldf | X[SRC1],FDEST | FDEST: M[X + SRC1] | Load floating-point |
| stf | X[SRC1],FSRC2 | M[X + SRC1]: FSRC2 | Store floating-point |
| ldt caches | X[SRC1],DFST | DFST: M[X + SRC1] | Load through - bypass |
| stt caches | X[SRC1],SRC2 | M[X + SRC1]: SRC2 | Store through - bypass |
| movfre | CopInstr,DEST | DEST: CopReg | Move from coprocessor |
| movtoe | CopInstr,SRC2 | CopReg: SRC2 | Move to coprocessor |
| aluc instr. | CopInstr | Cop execute CopInstr | Send/Exe. coprocessor |
| aluf instr. | FPInstr | FP Unit executeFPInstr | Send/Exe. floating-point |
| *Branch Instructions* | | | |
| beq,beqsq | SRC1,SRC2,Displ. | PC: PC + Displ. if SRC1 = SRC2 | Branch if equal |
| bge,bgesq | SRC1,SRC2,Displ. | PC:=PC + Displ. if SRC1 $\geq$ SRC2 | Branch if greater or equal |
| bhs,bhssq | SRC1,SRC2,Displ. | PC:=PC + Displ. if SRC1 $\geq$ SRC2 | Unsigned branch if higher or same |
| blo,blosq | SRC1,SRC2,Displ. | PC:=PC + Displ. if SRC1 < SRC2 | Unsighed branch if lower |
| blt,bltsq | SRC1,SRC2,Displ. | PC:=PC + Displ. if SRC1 < SRC2 | Branch if less |
| bne,bnesq | SRC1,SRC2,Displ. | PC:=PC + Displ. if SRC1 $\neq$ SRC2 | Branch if not equal |

TABLE 16

STRiP (MIPS-X) Compute instructions.

| Instruction | Operands | Operation | Comments |
| --- | --- | --- | --- |
| Compute Instructions | | | |
| add | SRC1,SRC2,DEST | DEST:=SRC1 + SRC2 | Integer add |
| dstep restoring | SRC1,SRC2,DEST | | One step of 1-bit divide technique |
| mstart and add multiplication | SRC2,DEST | | First step of 1-bit shift |
| mstep and add multiplication | SRC1,SRC2,DEST | | One step of 1-bit shift |
| sub | SRC1,SRC2,DEST | DEST:=SRC1 − SRC2 | Integer subtraction |
| subnc | SRC1,SRC2,DEST | DEST:=SRC1 + SRC2_b | Subtract with no carry in |
| and | SRC1,SRC2,DEST | DEST:=SRC1 ∧ SRC2 | Logical AND |
| bic | SRC1,SRC2,DEST | DEST:=SRC1_b ⌐ SRC2 | Bit clear |
| not | SRC1,DEST | DEST:=SRC1_b | Logical INVERT |
| or | SRC1,SRC2,DEST | DEST:=SRC1 ∨ SRC2 | Logical OR |
| xor | SRC1,SRC2,DEST | DEST:=SRC1 + SRC2 | Logical Exclusive-OR |
| mov | SRC1,DEST | DEST:=SRC1 | Really just "add SRC1,r0,DEST" |
| asr | SRC1,DEST,#N | DEST:=SRC1 shifted right N positions | Arithmetic shift right |
| rotlb SRC2[30:31]bytes | SRC1,SRC2,DEST | DEST:=SRC1 byte rotated left | Rotate left by |
| rotleb complement of | SRC1,SRC2,DEST | DEST:=SRC1 byte rotated left | Rotate left by SRC2[30:31]bytes |
| sh | SRC1,SRC2, DEST,#N | DEST:=SRC2[32-N:31]∥ SRC1[0:32-N-1] | Funnel shift |
| nop just "add r0,r0,r0" | | r0=r0 + r0 | No operation. Really |
| Compute Immediate Instructions | | | |
| addi sign extended | SRC1,#N,DEST | DEST:=N + SRC1 | Add immediate 17-bit |
| jpc Chain. Used to return from exception | | | Jump using value in PC handler. |
| jpcrs and restore state. Used | | | Jump from PC Chain to return from exception handler. |
| jspci | SRC1,#N,DEST | DEST:=PC + 1, PC:=SRC1 + N | Jump indexed, save PC |
| movfrs register | SpecReg.DEST | DEST:=SpecReg | Move from special (PSW, PC-4, PC-1, MD) |
| movtos (PSW, PC-4, PC-1, | SRC1,SpecReg | SpecReg:=SRC1 | Move to special register MD) |
| trap vector addresses, eight | Vector | | Trap to vector (256 words per vertor, located in low memory) |

The use of streamlined, small, and accordingly fast hardware structures substantially optimizes the pipeline's performance while providing more area for other features which increase the performance of the processor (e.g. caches).

STRiP 400 uses a five-stage pipeline. Results generated during the ALU processing stage are not written to the Register File until the final pipeline cycle (WB), thereby streamlining exception handling. Bypassing is used to provide result data to instructions occurring before WB. The results of a load instruction are not bypassed to the ALU stage of the next sequential instruction, and a load delay of one cycle occurs between a load instruction and the next instruction using that load data. Software fills the load-delay slot (the next sequential instruction after a load instruction) with an instruction independent of the load data.

The result of a branch-instruction comparison is not available until the end of the ALU pipeline cycle. Before the resulting branch operation is known (taken or not-taken), two more instructions are fetched and are in their RF and ALU pipeline stages. These instructions reside in the branch-delay slots for that branch instruction. To increase the probability of finding useful instructions to fill STRiP's two branch-delay slots, squashing versions of the branch instructions are provided (beqsq, bgesq, bhssq, blosq, bltsq, and bnesq). These branch instructions make it possible to statically predict that the branch will be taken. If the branch is not taken, the instructions in the delay slots are squashed or cancelled. Since the ALU is used to compute jump addresses, the jump instruction also has two delay slots.

Data moves to external coprocessors, or floating-point processors, occur during the WB pipeline cycle (unlike other memory store operations which occur during the MEM pipeline cycle). The instructions included in this group are movtoc, aluc, ldf, and aluf. By deferring the data transfer until the write-back cycle, the MEM stage of the ldf instruction is able to access the internal memory system. Data moves from external processors (movfrc and stf) use the ALU pipeline stage to execute the external transfer. This allows use of the MEM and WB pipeline stages for the data store and register write-back operations. Since the external processors execute asynchronously to STRiP's pipeline sequencing, performance of external processor transfers in this manner helps ensure precise exception handling for the scalar pipeline.

Multiplication is performed according to a 1-bit shift and add technique, except that the computation begins from the most significant bit rather than the least significant bit of the multiplier. An mstep instruction implements one step of the technique. For signed multiplication, the first step is different from the remaining steps. If the most-significant-bit of the multiplier is 1, the multiplicand is subtracted from 0. An mstart instruction is provided for this purpose. Division is performed 1-bit at a time according to a restoring division technique. Both operands are positive numbers.

STRiP's memory space is unchanged from MIPS-X. The addressing is consistently Big Endjan. The memory space includes 32-bit words. Load/store addresses are manipulated as 32-bit byte addresses, but only words are read from memory. Only the most significant 30 bits are sent to the internal memory system. Since byte data are not directly accessed, an instruction sequence inserts or extracts bytes from a word. Instructions that affect the program counter (branches and jumps) generate word addresses. Offsets for calculating load/store addresses are byte offsets, while displacements for branches and jumps are word displacements.

FIG. 50 is an illustration of the Processor Status Word (PSW). The PSW includes two set of bits, PSWcurrent and PSWother. In response to an exception or trap, the current machine state (PSWcurrent) is copied to PSWother so that it can be saved. Interrupts, PC shifting, and overflow exceptions are disabled, and processor 400 is placed in system state. In response to a jpcrs instruction (jump PC and restore state), PSWother is copied back to PSWcurrent, thereby restoring the machine state to its pre-exception values.

The PSW bits are defined as follows:

| | |
|---|---|
| I,i | This bit is set to 0 when there is an interrupt request; otherwise, it is a 1. |
| M,m | Interrupt mask bit. When set to a 1, the processor interrupt is masked. |
| U,u | Processor state bit. When 1, the processor is in user state; when 0, the processor is in system state. It is changed only by a system process, interrupt or trap instruction. |
| S,s | When set to 1, shifting of the PC Chain is enabled. |
| e | Cleared when doing an exception or trap return sequence. Used to determine whether state should be saved if another exception occurs before the completion of the return sequence (three jump instructions). |
| E | The E bits forms a shift chain that is used to determine whether the e bit is to be cleared in response to an exception. |
| V,v | The overflow mask bit. When set, trap on overflows is masked. |
| O,o | This bit is set in response to an overflow exception and is cleared on all other exceptions. |
| F,f | The internal instruction cache enable bit. When set, the internal instruction caches are disabled. This bit is changed only by a system process. |
| D,d | The internal data cache enable bit. When set, the internal data caches are disabled. This bit is changed only by a system process. |

The PSW bit assignments are unchanged from those of MIPS-X. The upper case bits correspond to the PSWcurrent data bits, and the lower case bits correspond to the PSWother data bits.

Appendix E

Figure 51:
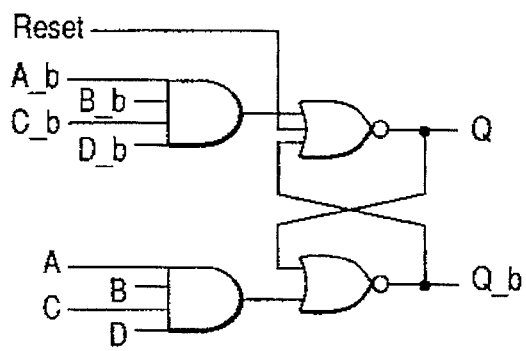
FIG. 51 is a schematic electrical circuit diagram of a 4-input C-element using cross-coupled NORs.
Figure 52A:
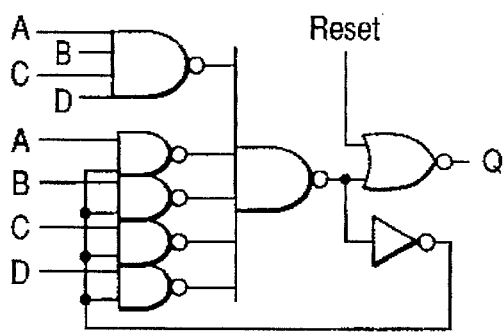
FIGS. 52a–b are schematic electrical circuit diagrams of 4-input C-elements using majority function circuits.
Figure 52B:
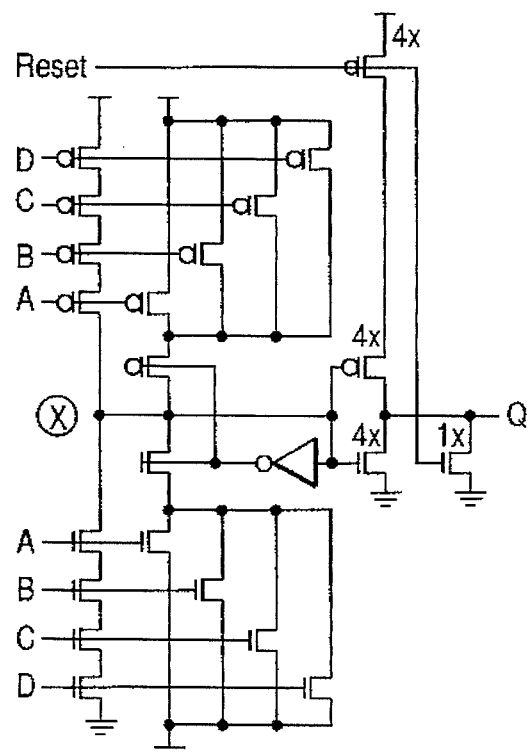

FIGS. 51–56 are C-element logic diagrams. More particularly, FIG. 51 is a schematic electrical circuit diagram of a 4-input C-element using cross-coupled NORs. FIGS. 52a–b are schematic electrical circuit diagrams of 4-input C-elements using majority function circuits. In FIG. 52b, all transistors are 2 x minimum size unless otherwise specified.

Figure 53:
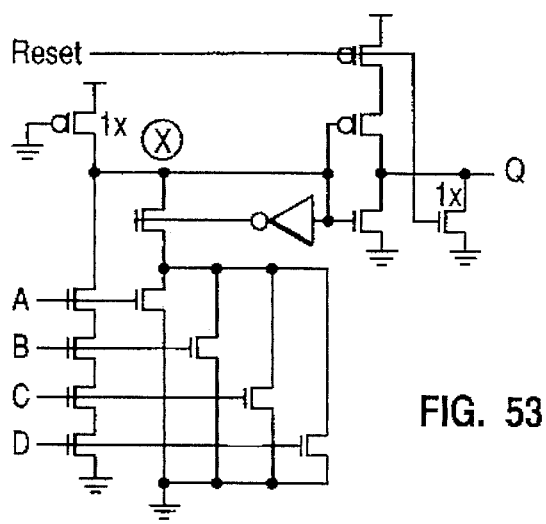
FIG. 53 is a schematic electrical circuit diagram of a 4-input C-element using pseudo-NMOS logic structure.
Figure 54:
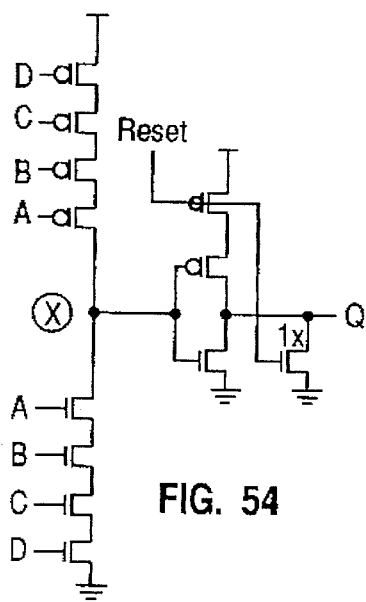
FIG. 54 is a schematic electrical circuit diagram of a 4-input dynamic C-element.
Figure 55:
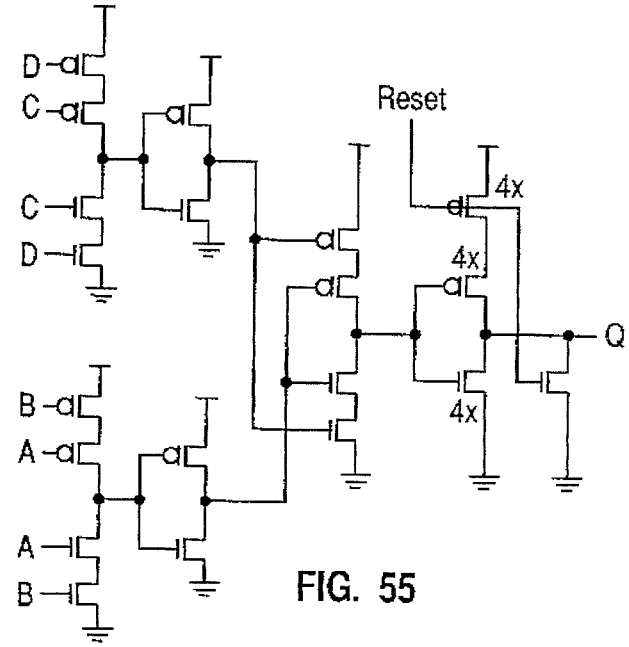
FIG. 55 is a schematic electrical circuit diagram of a 4-input dynamic C-element tree using 2-input dynamic C-elements.

Moreover, FIG. 53 is a schematic electrical circuit diagram of a 4-input C-element using pseudo-NMOS logic structure. FIG. 54 is a schematic electrical circuit diagram of a 4-input dynamic C-element. In FIGS. 53 and 54, all transistors are 4 x minimum size unless otherwise specified. Further, FIG. 55 is a schematic electrical circuit diagram of a 4-input dynamic C-element tree using 2-input dynamic C-elements. Finally, FIG. 56 is a schematic electrical circuit diagram of a 4-input dynamic C-element with charge-sharing reduction circuitry. In FIG. 56, all transistors are 4 x minimum size unless otherwise specified.

APPENDIX F

External Interface Signal Descriptions

Cost, size, and availability are key factors for determining a number of interface signals. For STRiP 400, the target module configuration is a Quad Flat Pack (QFP) (plastic or metal) having 240 pins. The QFP modules are less expensive and achieve more efficient use of board space relative to Pin Grid Array (PGA) modules used for many microprocessors. The use of the plastic (PQFP) or metal (MQUAD) QFP depends on the projected power dissipation and the amount of cooling for increasing performance. For STRiP 400, 25% of the pins are used for power and ground. The remaining pins are used for communication, testing, and configuration signals. Following is a a brief functional description of STRiP's module pins.

Power and Ground:

Vcc (27 pins)—3.3 V or 5.0 V nominal (depending on the technology)

GND (27 pins)—Ground

Processor Address and Data Buses:

Address[0–31]—The processor's address bus includes 32 tri-state output signals. HoldAck_b low tri-states the address bus to allow other bus masters to drive the bus (supports snooping and local shared memory MP). STRiP transfers information word or quad-word (cache line) aligned. Since the internal data cache is copy-back, writes to external system memory are a cache-line wide (128-bits). The least significant address bits, Address[28–31], are encoded to indicate the targeted memory address and transfer size. TABLE 17 shows the encoding scheme.

TABLE 17

Encoding of least significant address bits to support word and quad-word transfers

| Address[28–31] | Requested transfer size | Active Data Bus Signals |
|---|---|---|
| 1110 | word | Data[96–127] |
| 1101 | word | Data[64–95] |
| 1011 | word | Data[32–63] |
| 0111 | word | Data[0–31] |
| 0000 | quad-word | Data[0–127] |

The address bus is also used to transfer coprocessor selects for movtoc, movfrc, and aluc instructions, and floating-point register selects during ldf, stf, and aluf instructions. Address0, along with Read/Write_b and FPAccess_b, are used to distinguish between the different coprocessor transfers. TABLES 18a–b show the encoding for each coprocessor and processor transfer.

TABLE 18a

Processor signal encoding during external data transfers.

| MemReq b | CacheReq b | CopReq b | Tranfser Type |
|---|---|---|---|
| ↓ | 1 | 1 | Non-Cachable Memory Write |
| ↓ | 1 | 1 | Non-Cachable Memory Read |
| 1 | ↓ | 1 | Cachable Memory Write |
| 1 | ↓ | 1 | Cachable Memory Read |
| ↓ | 0 | 1 | *Cachable Memory Read/Write, L2 Cache Miss |
| 1 | 1 | ↓ | movtoc instr. |
| 1 | 1 | ↓ | aluc instr. |
| 1 | 1 | ↓ | movfrc instr. |
| 1 | 1 | ↓ | (unused code) |
| 1 | 1 | ↓ | ldf instr. |
| 1 | 1 | ↓ | **aluf instr. |
| 1 | 1 | ↓ | stf instr. |
| 1 | 1 | ↓ | (unused code) |

*Assumes a copy-back L2 cache. L2 cache does not indicate a miss on a 128-bit write cycle.
**New floating-point transfer instruction. Not provided in MIPS-X.

TABLE 18b

Processor signal encoding during external data transfers.

| FPAccess b | Read/Write b | Address0 | Transfer Type |
|---|---|---|---|
| 1 | 0 | X | Non-Cachable Memory Write |
| 1 | 1 | X | Non-Cachable Memory Read |
| 1 | 0 | X | Cachable Memory Write |
| 1 | 1 | X | Cachable Memory Read |
| 1 | 1 | X | *Cachable Memory Read/Write, L2 Cache Miss |
| 1 | 0 | 1 | movtoc instr. |
| 1 | 0 | 0 | aluc instr. |
| 1 | 1 | 1 | movfrc instr. |
| 1 | 1 | 0 | (unused code) |
| 0 | 0 | 1 | ldf instr. |
| 0 | 0 | 0 | **aluf instr. |
| 0 | 1 | 1 | stf instr. |
| 0 | 1 | 0 | (unused code) |

*Assumes a copy-back L2 cache. L2 cache does not indicate a miss on a 128-bit write cycle.
**New floating-point transfer instruction. Not provided in MIPS-X.

Data[0–127]—STRiP's data bus supports cache line transfers, coprocessor instruction/data transfers, and the capability of two double-precision floating-point data transfers in a single cycle. A 128-bit data bus achieves significant interface performance, while supporting a low cost package. Data[0–127] are outputs during write transfers from the processor and inputs during processor read cycles. The data bus is tri-stated when HoldAck_b is active and DBEnable_b is inactive. STRiP 400 uses the data bus, when DBEnable_b is active during an external processor cycle, to provide dirty-line data during memory transfer cycles from other system processors (HoldReq_b, HoldAck_b, MemReq_b, MemAck_b, Miss, Read/Write_b, and DBEnable_b are low, indicating a write-snoop-hit of an internal dirty-cache-line).

Memory Control:

MemReq_b—MemReq_b is an I/O signal which allows processor 400 to transfer data to/from memory devices and maintain internal caches coherent. The processor drives MemReq_b when the BIU has a pending load/store operation to non-cachable system-memory space or to cachable-memory space not present in the second-level cache. As an input, when HoldAck_b is active, the processor monitors MemReq_b along with Read/Write_b to determine the type of system memory transfer generated by another system processor. This allows STRiP 400 to snoop its internal cache to maintain memory coherency.

MemAck_b—MemAck_b is an input signal that indicates when the externally addressed device has driven valid data on the data bus (read) or has accepted data from the data bus (write). After MemAck_b is received, the processor's pipeline is released (if stalled due to data dependencies).

Read/Write_b—Read/Write_b is an output when the processor controls the bus (HoldAck_b inactive) and an input during external processor cycles (HoldAck_b active). This signal indicates the memory transfer type and sets the data bus direction. Read/Write_b also designates the direction of a coprocessor transfer (see TABLE 9).

CacheReq_b—When the processor is transferring data to/from cachable memory space, it drives CacheReq_b to request access to any external cache subsystems (normally a second-level cache). If the external cache indicates a hit (CacheAck_b active and Miss inactive), the processor continues processing. In response to an external cache-read-miss (CacheAck_b and Miss active), the BIU generates a memory request to transfer the data from memory. With the internal data cache in copy-back mode, all external transfers to cachable memory space are 128-bits wide. Accordingly, a second-level-cache write miss cycle can immediately write the new line data into the cache (displaced dirty lines are written back on subsequent cycles). CacheReq_b, along with CacheAck_b and Miss, allows straightforward support of an optional second-level cache.

CacheAck_b—CacheAck_b is an input and indicates when the external second-level cache has driven the data bus with valid data (read) or has latched the data from the data bus (write).

Miss—Miss is an input, driven by the second-level-cache, and indicates the results of the second-level-cache access. If Miss is active when CacheAck_b is driven active, the second-level cache does not contain the data-address requested. In response to a read-miss, STRiP's BIU generates a MemReq_b to request the data from system memory. In response to a write-miss, the second-level cache removes the data from the data-bus before driving CacheAck_b active. The processor ignores Miss during write-miss cycles, since no further action is needed. With the first-level-caches in copy-back mode, a write to cachable memory space occurs only when a dirty-line is being written-back.

If Miss is high when Reset transitions from active to inactive (high-to-low transition), this indicates to the BIU that a second-level-cache does not exist. With no second-level-cache, the BIU does not drive CacheReq_b and does drive MemReq_b for all memory system transfers (cachable or non-cachable). If Miss is high when MemAck_b transitions low (indicating data available/accepted), the memory address is non-cachable and is not stored in the internal or second-level caches.

SnoopCmplt_b—Processor 400 uses SnoopCmplt_b to indicate the completion of an internal snoop cycle. A snoop operation occurs when an external processor owns the local bus (HoldReq_b and HoldAck_b active) and performs a memory transfer (MemReq_b active). The processor snoops the contents of its internal caches, invalidates entries on a write-hit, and provides data on a hit to a dirty cache-line (DBEnable_b active).

TABLE 19 shows the signal encoding for each snoop response.

TABLE 19

Signal encoding for response to internal cache snoop operation.

HoldReq_b, HoldAck_b, MemReq_b are active (low)

| Read/Write_b | Miss | SnoopCmplt_b | response |
|---|---|---|---|
| (input) | (output) | (output) | description |
| 0 | 1 | ↓ | write-snoop-miss or write-snoop-hit to clean cache line |
| 0 | 0 | ↓ | * write-snoop-hit to dirty cache line |
| 1 | 1 | ↓ | read-snoop-miss or read-snoop-hit to clean cache line |
| 1 | 0 | ↓ | * read-snoop-hit to dirty cache line |

* External processor drives DBEnable_b low to receive dirty-line data from processor.

Exception Control:

Reset—Reset is an input and resets the processor to a known initial state. The internal caches are disabled and invalidated, and the reset vector is placed on the address bus (Address[0–31]=0x7fffff80). Since the caches are disabled, the processor issues an external memory-read request to this address after Reset goes inactive.

Interrupt—Interrupt is a maskable interrupt input signal. When an interrupt is taken, the processor saves the PCs of all instructions currently executing, allowing restarting after the interrupt is serviced. Since there is a branch delay of two, three PCs (instructions in RF, ALU and MEM stages) are saved in the PC Chain.

Exception_b—Exception_b provides a non-maskable interrupt function to support external events which need immediate attention (e.g. memory errors or bus time-out). Exception_b has priority over Interrupt and internal trap instructions.

Coprocessor Control:

CopReq_b—CopReq_b is an output signal which, when active, indicates a transfer request to/from a connected coprocessor or floating-point processor. During a coprocessor cycle, the address bus contains the coprocessor selects or floating-point register selects, while the least significant data bus signals (Data[64–127]) provide the medium for instruction/data transfer. If FPAccess_b is active when CopReq_b transitions to an active state (high-to-low transition), the transfer is between the processor and floating-point processor. Read/Write_b and Address0 indicate the type of coprocessor transfer (see TABLE 9).

CopAck_b—CopAck_b is an input signal, driven by the attached coprocessors, which indicates the completion of a coprocessor data transfer. During a write to a coprocessor (ldf, aluf, movtoc, or aluc instructions), the coprocessor drives CopAck_b active to indicate data have been latched from the data bus. During coprocessor read operations (stf or movfrc), the coprocessor drives the same signal, indicating valid data on the data bus.

FPAccess_b—This signal replaces the MIPS-X coprocessor signals FPReq[1–4] and the use of MemCycle during coprocessor transfers. For STRiP 400, floating-point data transfer occurs through the internal first-level cache. Accordingly, the floating-point instructions ldf and stf transfer data between the first-level data cache and floating-point processor. The floating-point register address is driven on the least significant address bus bits (Addressφ27–31] to support 32 floating point registers). FPAccess_b is also driven active during the aluf instruction, with the data bus containing the floating-point instruction. Moreover, for STRiP's coprocessor interface, the transfer-too coprocessor cycles (ldf, aluf, movtoc, and aluc) are not sent to the BIU until the WB pipeline cycle. This avoids the need for the WBEnable signal to ensure precise interrupts. The BIU also allows the processor to continue processing, in parallel with the coprocessor transfer. Transfer-from coprocessor transfers (stf and movfrc) occur during the ALU pipeline cycle and stall the pipeline until the transfer is completed.

Bus Control/Access:

HoldReq_b—HoldReq_b is an input signal, driven active by other system processors when they need to access devices directly connected to STRiP's external interface. In response to this signal, STRiP's BIU tri-states the address and data buses, and Read/Write_b signal when the BIU does not need the external bus. HoldAck_b is driven active after the BIU releases the external interface. HoldReq_b allows external processors to access processor complex devices, and it provides a mechanism for snooping the internal first-level caches and external second-level cache.

HoldAck_b—After the BIU receives a HoldReq_b active signal, HoldAck_b is driven active after the external interface signals (Address[0–31], Data[0–127], and Read/Write_b) are tri-stated.

DBEnable_b—The Data Bus Enable signal (DBEnable_b) signals the processor to drive the external data bus during an external processor cycle to a local bus device (HoldReq_b and HoldAck_b active). If a snoop cycle hits a dirty cache-line, STRiP can be requested to provide that dirty data. When DBEnable_b is driven active, the dirty cache-line is driven onto the external data bus.

BusReq_b—BusReq_b is driven by the BIU during external hold cycles (HoldReq_b and HoldAck_b active) to indicate that the processor requests control of the external interface. This signal provides a mechanism for processor sharing on the local bus according to the immediate needs of each connected processor. BusReq_b can support a "fairness" protocol, providing equal access to all requesting processors.

Test Signals:

TestClk—TestClk is an input signal which can be used to sequence STRiP's pipeline when the dynamic clock generator is disabled (DynClkReset_b is active).

ScanClk—This clock input is used to scan test data to and from STRiP's internal functional units when Reset is active.

DynClkReset—This input signal allows external test hardware to disable the dynamic clock generator, providing a mechanism for sequencing STRiP's pipeline through an external test clock (TestClk).

ScanDataIn—ScanDataIn is an input signal which enables test information to be scanned into internal functional units (through ScanClk). ScanDataIn is driven synchronously relative to ScanClk.

ScanDataOut—ScanDataOut allows test results from scanned input data to be evaluated by external hardware. ScanDataOut is driven synchronously by the processor relative to ScanClk.

KNOB Control:

TCKNOB—This input is the control voltage for the tracking cell KNOB. TCKNOB=0 V allows the tracking cells to operate at their designed optimum delay. As TCKNOB increases in voltage, the tracking cells increase in delay. TCKNOB=5 V increases the tracking cell delays to approximately 1.5 × their designed optimum delays.

PGKNOB—This input is the control voltage for the pulse generator KNOB. PGKNOB=0 V allows the pulse generator to generate φ1 periods at their designed optimum width. As PGKNOB increases in voltage, the pulse generator output increases the width of φ1. TCKNOB=5 V increases the φ1 period to approximately twice its designed optimum width.

What is claimed is:

1. A system for prefetching information in a processing system, comprising:
   a first memory for storing first and second information;
   a second memory for selectively storing said first and second information; and
   circuitry for:
      determining whether said second memory stores said first information;
      accessing said first information in said second memory only if said second memory stores said first information, otherwise said first information being accessed in said first memory;
      determining whether said second memory stores said second information;
      after accessing said first information, accessing said second information in said second memory only if said second memory stores said second information, otherwise said second information being accessed in said first memory;
      in response to accessing said second information, modifying said first information in said first memory to include an indication of said second information in said first memory; and
   in response to accessing said first information, prefetching said second information from said first memory to said second memory ill response to said indication.

2. The system of claim 1 wherein said circuitry modifies said first information in said first memory to include said indication in response to said accessing of said second information being a first accessing of information after said accessing of said first information.

3. The system of claim 1 wherein said circuitry modifies said first information in said first memory to include said indication in response to said accessing of said second information being a second accessing of information after said accessing of said first information, wherein said second accessing results from a miss operation in said second memory, and wherein a first accessing of information after said accessing of said first information results from a prefetch operation in said second memory.

4. The system of claim 1 wherein said second memory is a zero-level cache memory.

5. The system of claim 4 wherein said zero-level cache memory is a fully-associative cache memory.

6. The system of claim 5 wherein said zero-level cache memory is a zero-level data cache memory.

7. The system of claim 6 wherein said first memory is a first-level data cache memory.

8. The system of claim 1 and further comprising a processing unit, wherein said second memory is integral with said processing unit.

9. The system of claim 8 wherein said first memory is integral with said processing unit.

10. The system of claim 1 wherein said circuitry prefetches said second information in response to an accessing of said first information in said first memory.

11. The system of claim 10 wherein said circuitry prefetches said second information in response to a cache miss in said second memory, said cache miss resulting in said accessing of said first information in said first memory.

12. The system of claim 11 wherein said cache miss indicates said accessing of said first information.

13. The system of claim 1 wherein said circuitry prefetches said second information in response to a cache prefetch operation resulting from an accessing of said first information in said second memory.

14. A method of prefetching information in a processing system, comprising the steps of:
   storing first and second information in a first memory;
   selectively storing said first and second information in a second memory;
   determining whether said second memory stores said first information;
   accessing said first information in said second memory only if said second memory stores said first information, otherwise said first information being accessed in said first memory;
   determining whether said second memory stores said second information;
   after accessing said first information, accessing said second information in said second memory only if said second memory stores said second information, otherwise said second information being accessed in said first memory;
   in response to accessing said second information, modifying said first information in said first memory to include an indication of said second information in said first memory; and
   in response to accessing said first information, prefetching said second information from said first memory to said second memory in response to said indication.

15. The method of claim 14 wherein said modifying step comprises the step of modifying said first information in said first memory to include said indication in response to said accessing of said second information being a first accessing of information after said accessing of said first information.

16. The method of claim 14 wherein said modifying step comprises the step of modifying said first information in said first memory to include said indication in response to said accessing of said second information being a second accessing of information after said accessing of said first information, wherein said second accessing results from a miss operation in said second memory, and wherein a first accessing of information after said accessing of said first information results from a prefetch operation in said second memory.

17. The method of claim 14 wherein said prefetching step comprises the step of prefetching said second information in response to an accessing of said first information in said first memory.

18. The method of claim 17 wherein said prefetching step comprises the step of prefetching said second information in response to a cache miss in said second memory, said cache miss resulting in said accessing of said first information in said first memory.

19. The method of claim 18 wherein said prefetching step comprises the step of prefetching said second information in response to said cache miss in said second memory, said cache miss indicating said accessing of said first information.

20. The method of claim 14 wherein said prefetching step comprises the step of prefetching said second information in response to a cache prefetch operation resulting from an accessing of said first information in said second memory.

* * * * *